(12) United States Patent
Yeh et al.

(10) Patent No.: US 12,078,787 B2
(45) Date of Patent: Sep. 3, 2024

(54) OPTICAL IMAGE LENS ASSEMBLY AND ELECTRONIC DEVICE

(71) Applicant: LARGAN PRECISION CO., LTD., Taichung (TW)

(72) Inventors: Kuan-Ting Yeh, Taichung (TW); Hsin-Hsuan Huang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 787 days.

(21) Appl. No.: 17/206,078

(22) Filed: Mar. 18, 2021

(65) Prior Publication Data
US 2022/0187578 A1 Jun. 16, 2022

(30) Foreign Application Priority Data

Dec. 11, 2020 (TW) ................ 109143932

(51) Int. Cl.
*G02B 13/00* (2006.01)
*G02B 9/60* (2006.01)
*G03B 17/17* (2021.01)

(52) U.S. Cl.
CPC .......... *G02B 13/0065* (2013.01); *G02B 9/60* (2013.01); *G02B 13/0045* (2013.01); *G03B 17/17* (2013.01)

(58) Field of Classification Search
CPC .. G02B 13/0065; G02B 9/60; G02B 13/0045; G03B 17/17
See application file for complete search history.

(56) References Cited

U.S. PATENT DOCUMENTS

| 2,694,959 | A | 11/1954 | Baker |
| 2,906,173 | A | 9/1959 | Gunter et al. |
| 5,875,060 | A | 2/1999 | Umeda |
| 7,301,709 | B2 | 11/2007 | Shinohara et al. |
| 9,128,266 | B2 | 9/2015 | Chen |

(Continued)

FOREIGN PATENT DOCUMENTS

| CN | 109298514 A | 2/2019 |
| CN | 110068910 A | 7/2019 |

(Continued)

OTHER PUBLICATIONS

Chinese Office Action dated Dec. 14, 2022 as received in application No. 202110021974.8.

(Continued)

*Primary Examiner* — Stephone B Allen
*Assistant Examiner* — Leonidas Boutsikaris
(74) *Attorney, Agent, or Firm* — Maschoff Brennan

(57) ABSTRACT

An optical image lens assembly includes five lens elements which are, in order from an object side to an image side along an optical path: a first lens element, a second lens element, a third lens element, a fourth lens element and a fifth lens element. Each of the five lens elements has an object-side surface facing toward the object side and an image-side surface facing toward the image side. The object-side surface of the first lens element is convex in a paraxial region thereof. The image-side surface of the third lens element is concave in a paraxial region thereof. The object-side surface of the fourth lens element is concave in a paraxial region thereof, and the image-side surface of the fourth lens element is convex in a paraxial region thereof.

30 Claims, 33 Drawing Sheets

(56) References Cited

U.S. PATENT DOCUMENTS

| | | | |
|---|---|---|---|
| 9,250,420 | B2 | 2/2016 | Hsu et al. |
| 9,759,892 | B2 * | 9/2017 | Hsu ........................ G02B 13/06 |
| 10,802,251 | B2 | 10/2020 | Lin |
| 10,877,250 | B2 | 12/2020 | Wang |
| 2012/0162769 | A1 | 6/2012 | Suzuki et al. |
| 2015/0185440 | A1 * | 7/2015 | Chen ....................... H04N 25/00 348/294 |
| 2018/0059376 | A1 * | 3/2018 | Lin .................... G02B 13/0045 |
| 2018/0164552 | A1 * | 6/2018 | Lin .......................... G02B 9/60 |
| 2018/0341086 | A1 * | 11/2018 | Tseng ...................... G02B 9/60 |
| 2019/0227285 | A1 | 7/2019 | Wang |
| 2020/0183058 | A1 * | 6/2020 | Shinohara ........ B29D 11/00009 |
| 2020/0201004 | A1 * | 6/2020 | Kim ..................... G02B 13/008 |
| 2020/0409036 | A1 | 12/2020 | Wang et al. |
| 2022/0091373 | A1 * | 3/2022 | Saiga ...................... G02B 13/02 |
| 2022/0236530 | A1 * | 7/2022 | Lin .......................... G02B 9/60 |

FOREIGN PATENT DOCUMENTS

| | | |
|---|---|---|
| CN | 110174752 A | 8/2019 |
| CN | 111399173 A | 7/2020 |
| CN | 111399181 A | 7/2020 |
| JP | H08-234102 A | 9/1996 |
| JP | 2006-126740 A | 5/2006 |
| TW | 201932897 A | 8/2019 |
| WO | 2009-001300 | 12/2008 |
| WO | 2022035134 A1 | 2/2022 |

OTHER PUBLICATIONS

Indian Search Report dated Jun. 22, 2022 as received in application No. 202134022733.

* cited by examiner

OPTICAL IMAGE LENS ASSEMBLY AND ELECTRONIC DEVICE

RELATED APPLICATIONS

This application claims priority to Taiwan Application 109143932, filed on Dec. 11, 2020, which is incorporated by reference herein in its entirety.

BACKGROUND

Technical Field

The present disclosure relates to an optical image lens assembly and an electronic device, more particularly to an optical image lens assembly applicable to an electronic device.

Description of Related Art

With the development of semiconductor manufacturing technology, the performance of image sensors has improved, and the pixel size thereof has been scaled down. Therefore, featuring high image quality becomes one of the indispensable features of an optical system nowadays.

Furthermore, due to the rapid changes in technology, electronic devices equipped with optical systems are trending towards multi-functionality for various applications, and therefore the functionality requirements for the optical systems have been increasing. However, it is difficult for a conventional optical system to obtain a balance among the requirements such as high image quality, low sensitivity, a proper aperture size, compactness and a desirable field of view.

SUMMARY

According to one aspect of the present disclosure, an optical image lens assembly includes five lens elements. The five lens elements are, in order from an object side to an image side along an optical path, a first lens element, a second lens element, a third lens element, a fourth lens element and a fifth lens element. Each of the five lens elements has an object-side surface facing toward the object side and an image-side surface facing toward the image side.

The object-side surface of the first lens element is convex in a paraxial region thereof. The image-side surface of the third lens element is concave in a paraxial region thereof. The object-side surface of the fourth lens element is concave in a paraxial region thereof, and the image-side surface of the fourth lens element is convex in a paraxial region thereof.

When a distance along an optical axis between the image-side surface of the fifth lens element and an image surface is BL, a distance along the optical axis between the object-side surface of the first lens element and the image-side surface of the fifth lens element is TD, an Abbe number of the fifth lens element is V5, a focal length of the optical image lens assembly is f, a focal length of the first lens element is f1, and a focal length of the second lens element is f2, the following conditions are satisfied:

$0.85 < BL/TD < 5.0$;
$8.0 < V5 < 28.0$;
$-2.0 < f/f1 < 2.50$; and
$-0.90 < f/f2 < 1.85$.

According to another aspect of the present disclosure, an optical image lens assembly includes five lens elements. The five lens elements are, in order from an object side to an image side along an optical path, a first lens element, a second lens element, a third lens element, a fourth lens element and a fifth lens element. Each of the five lens elements has an object-side surface facing toward the object side and an image-side surface facing toward the image side.

The object-side surface of the first lens element is convex in a paraxial region thereof. The second lens element has positive refractive power. The image-side surface of the fifth lens element is concave in a paraxial region thereof, and the image-side surface of the fifth lens element has at least one convex shape in an off-axial region thereof.

When a distance along an optical axis between the image-side surface of the fifth lens element and an image surface is BL, a distance along the optical axis between the object-side surface of the first lens element and the image-side surface of the fifth lens element is TD, and an Abbe number of the fifth lens element is V5, the following conditions are satisfied:

$0.85 < BL/TD < 5.0$; and
$8.0 < V5 < 28.0$.

According to another aspect of the present disclosure, an optical image lens assembly includes five lens elements. The five lens elements are, in order from an object side to an image side along an optical path, a first lens element, a second lens element, a third lens element, a fourth lens element and a fifth lens element. Each of the five lens elements has an object-side surface facing toward the object side and an image-side surface facing toward the image side.

The first lens element has positive refractive power. The second lens element has positive refractive power. The third lens element has negative refractive power. The fourth lens element has positive refractive power. The fifth lens element has positive refractive power, the object-side surface of the fifth lens element is convex in a paraxial region thereof, the image-side surface of the fifth lens element is concave in a paraxial region thereof, and the image-side surface of the fifth lens element has at least one convex shape in an off-axial region thereof.

When a distance along an optical axis between the image-side surface of the fifth lens element and an image surface is BL, and a distance along the optical axis between the object-side surface of the first lens element and the image-side surface of the fifth lens element is TD, the following conditions are satisfied:

$0.75 < BL/TD < 5.0$.

According to another aspect of the present disclosure, an electronic device includes at least two image capturing units which face the same side. The at least two image capturing units include a first image capturing unit and a second image capturing unit. The first image capturing unit includes one of the aforementioned optical image lens assemblies and an image sensor that is disposed on the image surface of the optical image lens assembly. The second image capturing unit includes an optical lens assembly and an image sensor that is disposed on an image surface of the optical lens assembly. A maximum field of view of the first image capturing unit and a maximum field of view of the second image capturing unit differ by at least 35 degrees.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
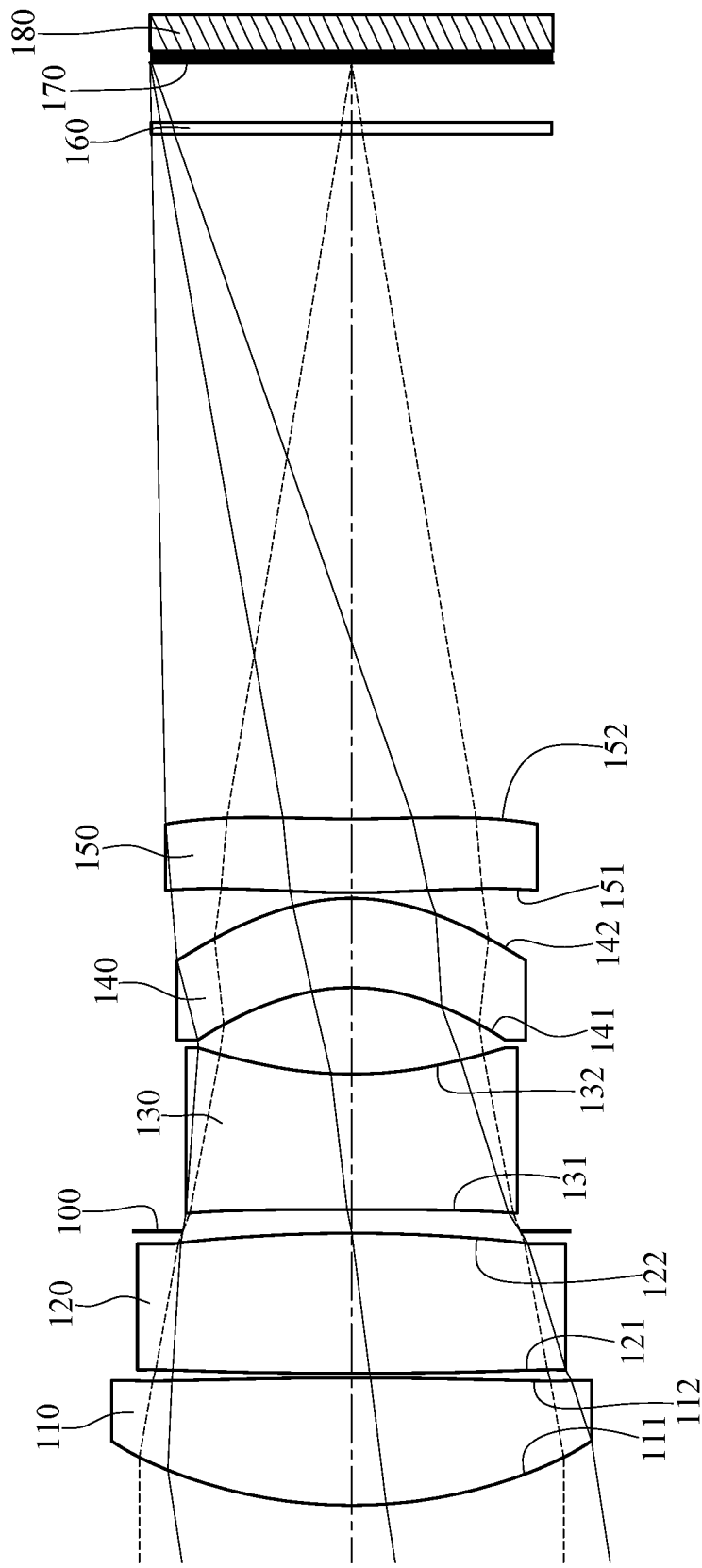
FIG. 1 is a schematic view of an image capturing unit according to the 1st embodiment of the present disclosure.

An optical image lens assembly includes five lens elements. The five lens elements are, in order from an object side to an image side along an optical path, a first lens element, a second lens element, a third lens element, a fourth lens element and a fifth lens element. Each of the five lens elements has an object-side surface facing toward the object side and an image-side surface facing toward the image side.

There can be an air gap along an optical axis between each of all adjacent lens elements of the optical image lens assembly. Therefore, it is favorable for reducing the difficulty of assembling the optical image lens assembly so as to increase the yield rate. In detail, each of the first through fifth lens elements can be a single and non-cemented lens element. The manufacturing process of cemented lenses is more complex than the non-cemented lenses, particularly when an image-side surface of one lens element and an object-side surface of the following lens element need to have accurate curvatures to ensure both lenses being properly cemented. In addition, during the cementing process, those two lens elements might not be well cemented due to misalignment, which is not favorable for the image quality. Therefore, having an air gap in a paraxial region between each of all adjacent lens elements of the optical image lens assembly in the present disclosure is favorable for avoiding the problems of the cemented lens elements so as to increase flexibility in designing the surface shapes of lens elements, thereby reducing the size of the optical image lens assembly and correcting aberrations.

The first lens element can have positive refractive power. Therefore, it is favorable for providing significant light convergence so as to effectively reduce the size of the optical image lens assembly for the compactness requirement thereof. The object-side surface of the first lens element can be convex in a paraxial region thereof. Therefore, it is favorable for controlling the angle between light rays and the lens surface so as to prevent total reflection.

The second lens element can have positive refractive power. Therefore, it is favorable for balancing the refractive power of the first lens element so as to prevent generating excessive aberrations due to overly large refractive power of any single lens element. The object-side surface of the second lens element can be convex in a paraxial region thereof. Therefore, it is favorable for correcting aberrations generated by the first lens element.

The third lens element can have negative refractive power. Therefore, it is favorable for correcting chromatic aberration of the optical image lens assembly. The image-side surface of the third lens element can be concave in a paraxial region thereof. Therefore, it is favorable for correcting spherical aberration and chromatic aberration.

The fourth lens element can have positive refractive power. Therefore, it is favorable for effectively controlling the incident angle on an image surface so as to prevent vignetting on the image. The object-side surface of the fourth lens element can be concave in a paraxial region thereof, and the image-side surface of the fourth lens element can be convex in a paraxial region thereof. Therefore, it is favorable for correcting astigmatism and coma.

The fifth lens element can have positive refractive power. Therefore, it is favorable for ensuring a sufficient back focal length of the optical image lens assembly so as to properly arrange optical elements. The object-side surface of the fifth lens element can be convex in a paraxial region thereof. Therefore, it is favorable for obtaining a balance between the field of view and the size of the optical image lens assembly so as to satisfy various product specifications. The image-side surface of the fifth lens element can be concave in a paraxial region thereof, and the image-side surface of the fifth lens element can have at least one convex shape in an off-region thereof. Therefore, it is favorable for correcting field curvature so as to feature compactness and flatten the Petzval surface.

Figure 25:
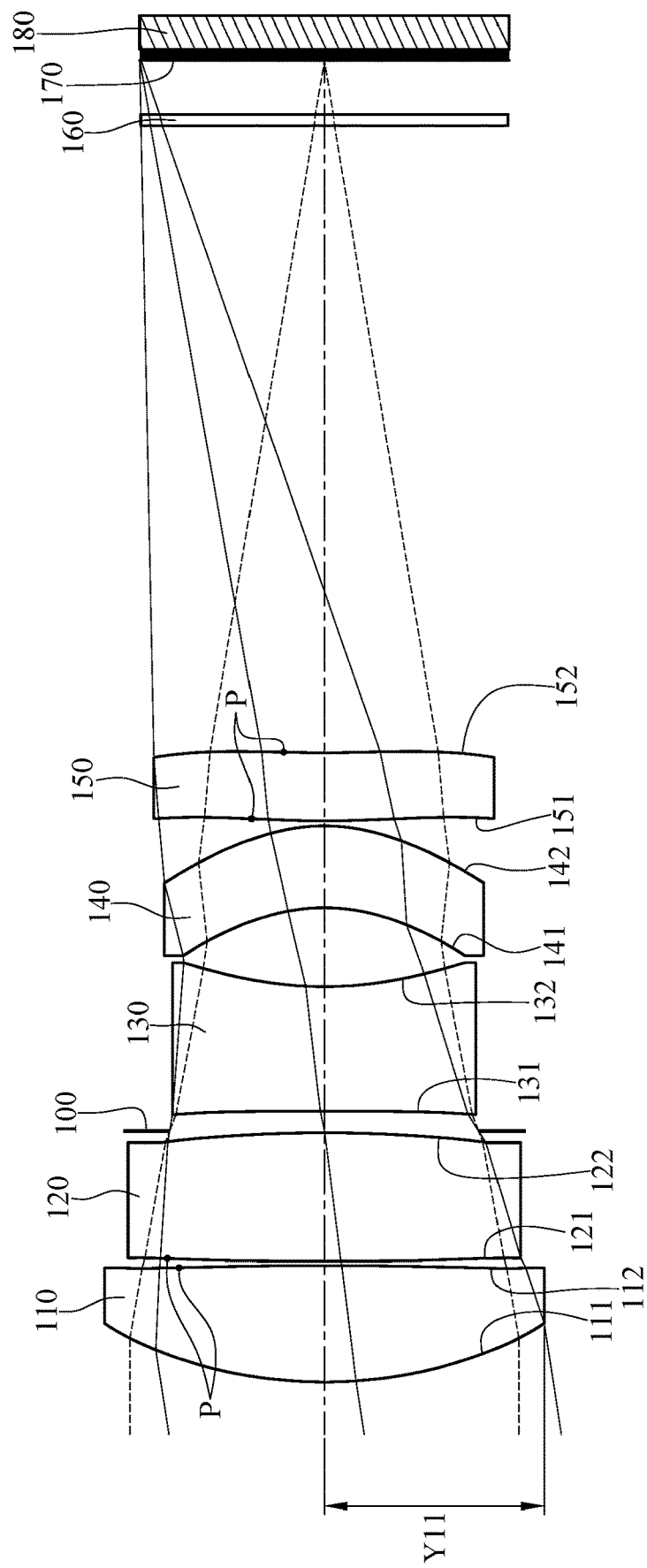
FIG. 25 shows a schematic view of Y11 and several inflection points of the lens elements according to the 1st embodiment of the present disclosure.

According to the present disclosure, at least one of the object-side surface and the image-side surface of at least one lens element of the optical image lens assembly can have at least one inflection point. Therefore, it is favorable for correcting off-axis aberrations and reducing the size of the optical image lens assembly. Moreover, at least one of the object-side surface of the fifth lens element and the image-side surface of the fifth lens element can have at least one inflection point. Please refer to FIG. 25, which shows a schematic view of several inflection points P on the image-side surface 112 of the first lens element 110, the object-side surface 121 of the second lens element 120, the object-side surface 151 of the fifth lens element 150 and the image-side surface 152 of the fifth lens element 150 according to the 1st embodiment of the present disclosure. The inflection points of the first lens element, the second lens element and the fifth lens element in FIG. 25 are only exemplary. In each embodiment of the present disclosure, the other lens elements may also have one or more inflection points.

According to the present disclosure, an absolute value of a focal length of the third lens element can be a minimum value among absolute values of focal lengths of all lens elements of the optical image lens assembly. Therefore, it is favorable for controlling the optical path by the third lens element so as to increase the symmetry of the optical image lens assembly, thereby improving image quality.

According to the present disclosure, the first lens element has a maximum effective radius of the object-side surface and a maximum effective radius of the image-side surface thereof, and one of the maximum effective radii of the first lens element can be a maximum value among maximum effective radii on the object-side surfaces and the image-side surfaces of all lens elements of the optical image lens assembly. Therefore, it is favorable for ensuring a proper aperture size of the optical image lens assembly so as to receive sufficient light and control the field of view, thereby providing a telephoto imaging function.

When a distance along the optical axis between the image-side surface of the fifth lens element and the image surface is BL, and a distance along the optical axis between the object-side surface of the first lens element and the image-side surface of the fifth lens element is TD, the following condition is satisfied: 0.75<BL/TD<5.0. Therefore, it is favorable for reducing the height of the lens barrel of the optical image lens assembly so as to enhance lens assembling and its yield rate, and it is also favorable for providing a proper back focal length of the optical image lens assembly so as to reduce the incident angle on the image surface. Moreover, the following condition can also be satisfied: 0.85<BL/TD<5.0. Moreover, the following condition can also be satisfied: 1.0<BL/TD<4.0. Moreover, the following condition can also be satisfied: 1.30<BL/TD<3.50.

When an Abbe number of the fifth lens element is V5, the following condition can be satisfied: 8.0<V5<28.0. Therefore, it is favorable for enhancing density difference between the fifth lens element and air so as to properly control the optical path within a limited space. Moreover, the following condition can also be satisfied: 8.0<V5<21.0.

When a focal length of the optical image lens assembly is f, and a focal length of the first lens element is f1, the following condition can be satisfied: −2.0<f/f1<2.50. Therefore, it is favorable for the refractive power distribution of the optical image lens assembly so as to provide good image quality. Moreover, the following condition can also be satisfied: −0.80<f/f1<2.0. Moreover, the following condition can also be satisfied: 0.50<f/f1<1.80.

When the focal length of the optical image lens assembly is f, and a focal length of the second lens element is f2, the following condition can be satisfied: −0.90<f/f2<1.85. Therefore, it is favorable for balancing refractive power of the optical image lens assembly by the second lens element so as to prevent excessive aberrations. Moreover, the following condition can also be satisfied: −0.90<f/f2<1.80. Moreover, the following condition can also be satisfied: −0.30<f/f2<1.0.

When a minimum value among Abbe numbers of all lens elements of the optical image lens assembly is Vdmin, the following condition can be satisfied: 10.0<Vdmin<21.0. Therefore, it is favorable for controlling the optical path of the optical image lens assembly and balancing light refractions of different wavelengths so as to correct aberrations. Moreover, the following condition can also be satisfied: 10.0<Vdmin<20.0.

When an Abbe number of the second lens element is V2, and the Abbe number of the fifth lens element is V5, the following condition can be satisfied: 1.50<V2/V5<5.0. Therefore, it is favorable for better controlling the optical path by the fifth lens element than that of the second lens element, thereby facilitating a telephoto imaging system configuration. Moreover, the following condition can also be satisfied: 2.30<V2/V5<4.0.

When the focal length of the optical image lens assembly is f, and the focal length of the third lens element is f3, the following condition can be satisfied: −3.50<f/f3<−1.50. Therefore, it is favorable for the third lens element to become the significant divergent lens element while increasing the symmetry of the optical image lens assembly so as to provide better image quality.

When a focal length of the fourth lens element is f4, and a focal length of the fifth lens element is f5, the following condition can be satisfied: 0<f4/f5. Therefore, it is favorable for distributing refractive power between the fourth lens element and the fifth lens element so as to prevent generating excessive aberrations.

When the focal length of the optical image lens assembly is f, and the focal length of the fourth lens element is f4, the following condition can be satisfied: $-0.30<f/f4<0.60$. Therefore, it is favorable for correcting aberrations by the fourth lens element so as to improve image quality of the optical image lens assembly.

When the focal length of the optical image lens assembly is f, and the focal length of the fifth lens element is f5, the following condition can be satisfied: $-0.70<f/f5<0.70$. Therefore, it is favorable for balancing the refractive power distribution of the optical image lens assembly so as to provide aberration correction by the lens elements at the image side thereof. Moreover, the following condition can also be satisfied: $-0.70<f/f5<0.60$. Moreover, the following condition can also be satisfied: $-0.30<f/f5<0.40$.

When a curvature radius of the object-side surface of the fourth lens element is R7, and a curvature radius of the image-side surface of the fourth lens element is R8, the following condition can be satisfied: $-0.30<(R7-R8)/(R7+R8)<0.30$. Therefore, it is favorable for correcting coma and distortion. Moreover, the following condition can also be satisfied: $-0.10<(R7-R8)/(R7+R8)<0.20$.

When the distance along the optical axis between the image-side surface of the fifth lens element and the image surface is BL, and a maximum image height of the optical image lens assembly (which can be half of a diagonal length of an effective photosensitive area of the image sensor) is ImgH, the following condition can be satisfied: $3.0<BL/ImgH<5.5$. Therefore, it is favorable for providing a proper back focal length of the optical image lens assembly so as to place additional optical elements, and it is also favorable for controlling the incident angle on the image surface so as to ensure sufficient peripheral image brightness.

When the focal length of the optical image lens assembly is f, and the maximum image height of the optical image lens assembly is ImgH, the following condition can be satisfied: $4.0<f/ImgH<8.0$. Therefore, it is favorable for providing a proper field of view of the optical image lens assembly so as to enable telephoto photography with capturing images from afar.

When a distance along the optical axis between the object-side surface of the first lens element and the image surface is TL, and the focal length of the optical image lens assembly is f, the following condition can be satisfied: $0.70<TL/f<1.30$. Therefore, it is favorable for controlling the total track length and the field of view of the optical image lens assembly so as to meet product specifications for various applications.

When an entrance pupil diameter of the optical image lens assembly is EPD, and the maximum effective radius of the object-side surface of the first lens element is Y11, the following condition can be satisfied: $1.60<EPD/Y11<2.10$. Therefore, it is favorable for controlling the ratio between the incident light range of the optical image lens assembly and the maximum effective radius of the object-side surface of the first lens element so as to increase the overall quantity of incident light thereof. Please refer to FIG. 25, which shows a schematic view of Y11 according to the 1st embodiment of the present disclosure.

When a thickness along the optical axis of the third lens element is CT3, and a thickness along the optical axis of the fifth lens element is CT5, the following condition can be satisfied: $0.90<CT3/CT5<3.50$. Therefore, it is favorable for controlling the central thicknesses of the third lens element and the fifth lens element so as to ensure proper lens molding quality and stability.

When the focal length of the second lens element is f2, and the focal length of the third lens element is f3, the following condition can be satisfied: $-0.80<f3/f2<0$. Therefore, it is favorable for balancing the refractive power ratio of the second lens element to the third lens element so as to enhance aberration corrections. Moreover, the following condition can also be satisfied: $-0.60<f3/f2<0$.

When a distance along the optical axis between the first lens element and the second lens element is T12, a distance along the optical axis between the second lens element and the third lens element is T23, a distance along the optical axis between the third lens element and the fourth lens element is T34, and a distance along the optical axis between the fourth lens element and the fifth lens element is T45, the following condition can be satisfied: $0<(T12+T23+T45)/T34<1.0$. Therefore, it is favorable for balancing axial distances among lens elements so as to reduce the sensitivity in lens assembling of the optical image lens assembly and enhance its yield rate. Moreover, the following condition can also be satisfied: $0<(T12+T23+T45)/T34<0.50$.

When a maximum value among maximum effective radii on the object-side surfaces and the image-side surfaces of all lens elements of the optical image lens assembly is Ymax, and a minimum value among maximum effective radii on the object-side surfaces and the image-side surfaces of all lens elements of the optical image lens assembly is Ymin, the following condition can be satisfied: $1.0<Ymax/Ymin<1.70$. Therefore, it is favorable for balancing among different sizes of lens elements and reducing the sensitivity of the optical image lens assembly so as to properly control the dimensional tolerance in molding the lens elements.

When the Abbe number of the second lens element is V2, and an Abbe number of the third lens element is V3, the following condition can be satisfied: $1.10<V2/V3<3.50$. Therefore, it is favorable for correcting chromatic aberration by the third lens element while being coupled with the second lens element. Moreover, the following condition can also be satisfied: $2.0<V2/V3<3.50$.

According to the present disclosure, at least one lens element of the optical image lens assembly can be a non-circular lens element. When a minimum distance from a center to an outer edge of the non-circular lens element is Dmin, and a maximum distance from the center to the outer edge of the non-circular lens element is Dmax, the following condition can be satisfied: $Dmin/Dmax<0.80$. Therefore, it is favorable for effectively reducing the size of an imaging module with the optical image lens assembly so as to provide a smaller footprint in mobile devices, thereby meeting the market requirements of compactness. Moreover, at least two lens elements of the optical image lens assembly can also be non-circular lens elements and can also satisfy the following condition: $Dmin/Dmax<0.80$. Moreover, at least three lens elements of the optical image lens assembly can also be non-circular lens elements and can also satisfy the following condition: $Dmin/Dmax<0.80$. Please refer to FIG. 27, which shows a schematic view of Dmin and Dmax according to the 1st embodiment of the present disclosure.

According to the present disclosure, the optical image lens assembly can include a light-blocking element that is a non-circular light-blocking element. Therefore, it is favorable for effectively reducing the size of the imaging module coupled with the abovementioned non-circular lens element. Please refer to FIG. 28, which shows a schematic view of the non-circular light-blocking element 1195 according to one embodiment of the present disclosure. Moreover, the non-circular light-blocking element can have a non-circular opening. Therefore, it is favorable for controlling light in the abovementioned non-circular lens element. Please refer to FIG. 29, which shows the non-circular opening OP12 of the non-circular light blocking 1295 according to one embodiment of the present disclosure.

When an Abbe number of the fourth lens element is V4, and the Abbe number of the fifth lens element is V5, the following condition can be satisfied: 1.50<V4/V5<4.50. Therefore, it is favorable for controlling materials of lens elements at the image side of the optical image lens assembly so as to optimize image quality. Moreover, the following condition can also be satisfied: 2.40<V4/V5<4.0.

When the maximum effective radius of the object-side surface of the first lens element is Y11, and the maximum image height of the optical image lens assembly is ImgH, the following condition can be satisfied: 0.80<Y11/ImgH<1.50. Therefore, it is favorable for ensuring proper ranges of incident light and image surface in the optical image lens assembly so as to provide sufficient image brightness and enhance the symmetry of the optical image lens assembly with improved image quality.

When a curvature radius of the image-side surface of the third lens element is R6, and the curvature radius of the object-side surface of the fourth lens element is R7, the following condition can be satisfied: −0.50<(R6+R7)/(R6−R7)<0.50. Therefore, it is favorable for controlling the lens surfaces between the third lens element and the fourth lens element so as to balance the optical path and correct aberrations. Moreover, the following condition can also be satisfied: −0.20<(R6+R7)/(R6−R7)<0.40.

When half of a maximum field of view of the optical image lens assembly is HFOV, the following condition can be satisfied: 5.0 [deg.]<HFOV<15.0 [deg.]. Therefore, it is favorable for effectively controlling the field of view of the optical image lens assembly, thereby facilitating to capture detailed images from afar.

When the focal length of the optical image lens assembly is f, and the entrance pupil diameter of the optical image lens assembly is EPD, the following condition can be satisfied: 2.40<f/EPD<4.50. Therefore, it is favorable for ensuring sufficient image brightness while preventing a corresponding electronic device being overly large so as to meet the market requirements.

When the focal length of the optical image lens assembly is f, the following condition can be satisfied: 18.0 [mm] <f<30.0 [mm]. Therefore, it is favorable for providing a proper field of view so as to achieve a telephoto configuration.

According to the present disclosure, the aforementioned features and conditions can be utilized in numerous combinations so as to achieve corresponding effects.

According to the present disclosure, the lens elements of the optical image lens assembly can be made of either glass or plastic material. When the lens elements are made of glass material, the refractive power distribution of the optical image lens assembly may be more flexible, and the influence on imaging caused by external environment temperature change may be reduced. The glass lens element can either be made by grinding or molding. When the lens elements are made of plastic material, the manufacturing costs can be effectively reduced. Furthermore, surfaces of each lens element can be arranged to be spherical or aspheric. Spherical lens elements are simple in manufacture. Aspheric lens element design allows more control variables for eliminating aberrations thereof and reducing the required number of lens elements, and the total track length of the optical image lens assembly can therefore be effectively shortened. Additionally, the aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally include an additive which generates light absorption and interference effects and alters the lens elements' transmittance in a specific range of wavelength for a reduction in unwanted stray light or color deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding. In addition, the additive may also be coated on the lens surfaces so as to provide abovementioned effects.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa.

According to the present disclosure, the image surface of the optical image lens assembly, based on the corresponding image sensor, can be flat or curved, especially a curved surface being concave facing towards the object side of the optical image lens assembly.

According to the present disclosure, an image correction unit, such as a field flattener, can be optionally disposed between the lens element closest to the image side of the optical image lens assembly along the optical path and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of the image capturing unit. In general, a preferable image correction unit is, for example, a thin transparent element having a concave object-side surface and a planar image-side surface, and the thin transparent element is disposed near the image surface.

Figure 30:
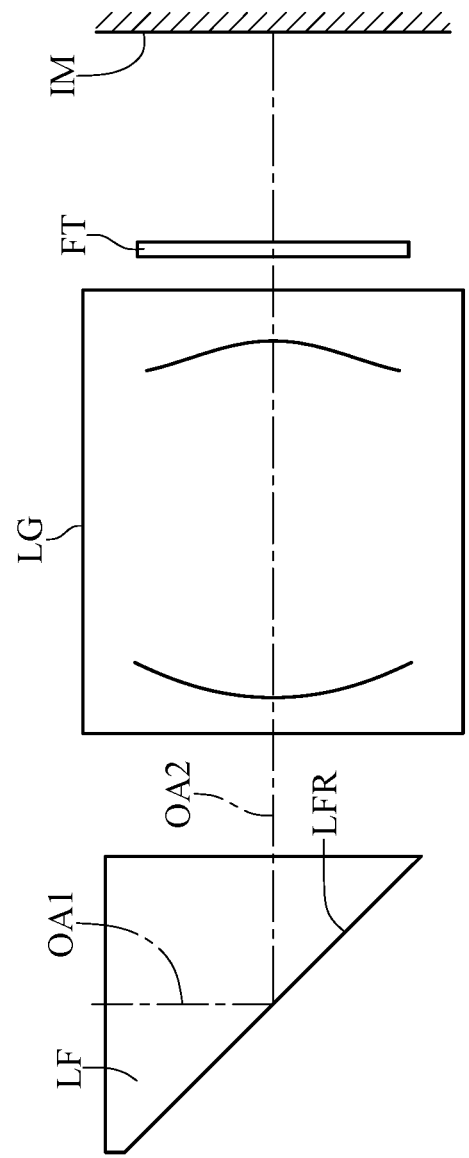
FIG. 30 shows a schematic view of a configuration of a reflective element in an optical image lens assembly according to one embodiment of the present disclosure.
Figure 31:
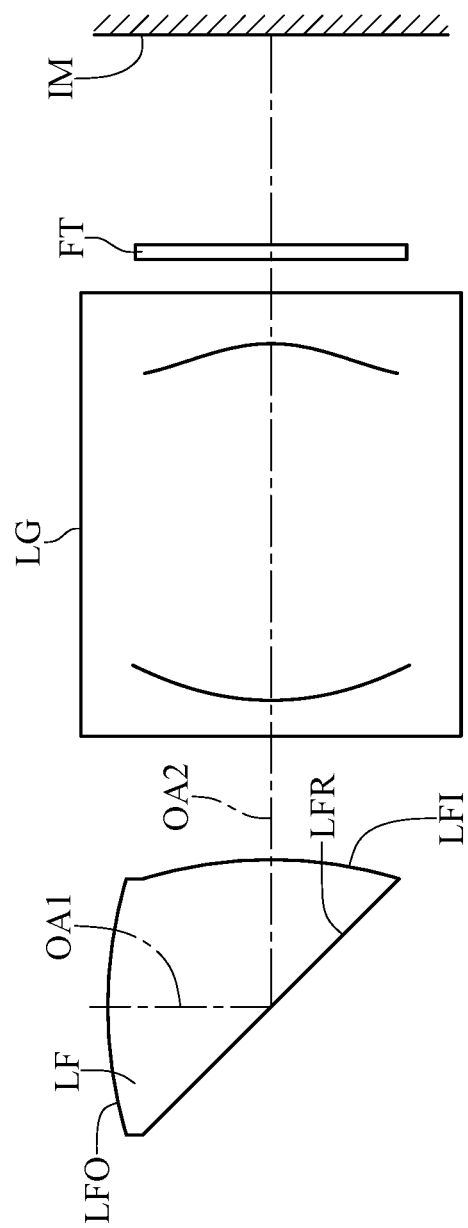
FIG. 31 shows a schematic view of another configuration of a reflective element in an optical image lens assembly according to one embodiment of the present disclosure.
Figure 32:
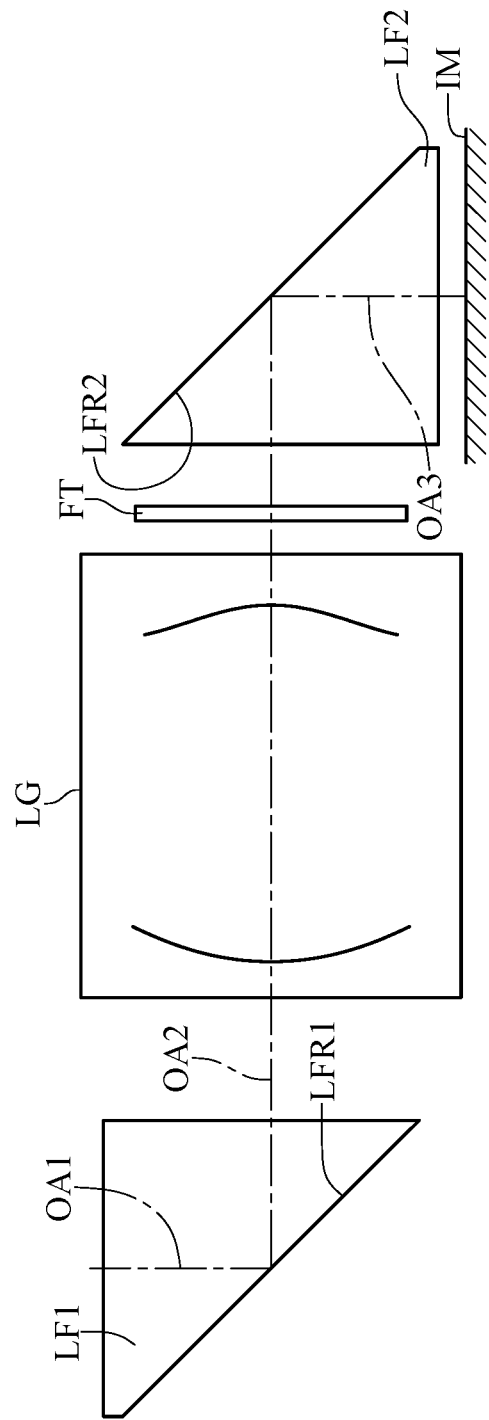
FIG. 32 shows a schematic view of a configuration of two reflective elements in an optical image lens assembly according to one embodiment of the present disclosure.
Figure 33:
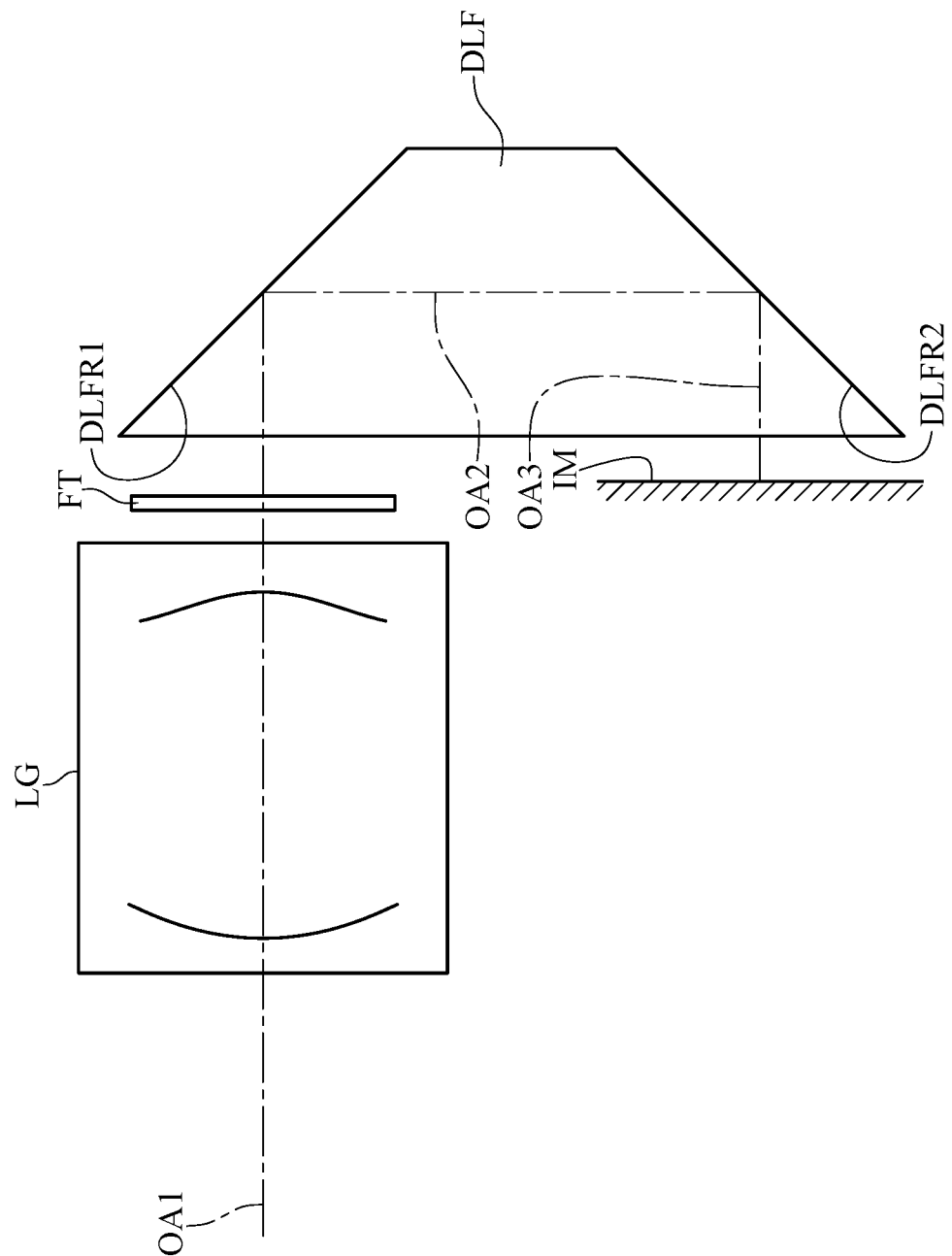
FIG. 33 shows a schematic view of still another configuration of a reflective element in an optical image lens assembly according to one embodiment of the present disclosure.

According to the present disclosure, at least one reflective element, such as a prism or a mirror, can be optionally disposed between an imaged object and the image surface on the imaging optical path, such that the optical image lens assembly can have a deflected light path and can be more flexible in space arrangement, and therefore the dimensions of an electronic device is not restricted by the total track length of the optical image lens assembly, thereby achieving various specification requirements. Please refer to FIG. 30, which shows a schematic view of a configuration of a reflective element in an optical image lens assembly according to one embodiment of the present disclosure. As shown in FIG. 30, in order from an imaged object (not shown in the figures) to an image surface IM of the optical image lens assembly, an optical path can enter a reflective element LF along a first optical axis OA1, deflect off a reflective surface LFR of the reflective element LF, and then pass through a lens group LG and a filter FT along a second optical axis OA2. The reflective element LF is a prism disposed between the imaged object and the lens group LG of the optical image lens assembly. However, the present disclosure is not limited thereto. In some other embodiments, the reflective element can also be disposed between the lens group and the image surface of the optical image lens assembly. Moreover, in the aspect that the reflective element is a prism, the reflective element can have an object-side surface being convex in a paraxial region thereof. Therefore, it is favorable for giving the optical image lens assembly additional refractive power so as to reduce the size of the optical image lens assembly and improve image quality while making the overall appearance to have a three-dimensional visual effect. Please refer to FIG. 31, which shows a schematic view of another configuration of a reflective element in an optical image lens assembly according to one embodiment of the present disclosure. As shown in FIG. 31, in order from an imaged object (not shown in the figures) to an image surface IM of the optical image lens assembly, an optical path can enter a reflective element LF via an object-side surface LFO of the reflective element LF along a first optical axis OA1, deflect off a reflective surface LFR of the reflective element LF, and then pass through an image-side surface LFI of the reflective element LF, a lens group LG and a filter FT along a second optical axis OA2. The object-side surface LFO of the reflective element LF is convex towards the imaged object in a paraxial region thereof, and the image-side surface LFI of the reflective element LF is convex towards the lens group LG in a paraxial region thereof. In addition, at least two reflective elements can also be optionally disposed between an imaged object and the image surface on the imaging optical path pf the optical image lens assembly. Please refer to FIG. 32, which shows a schematic view of a configuration of two reflective elements in an optical image lens assembly according to one embodiment of the present disclosure. As shown in FIG. 32, in order from an imaged object (not shown in the figures) to an image surface IM of the optical image lens assembly, an optical path can enter a first reflective element LF1 along a first optical axis OA1, deflect off a reflective surface LFR1 of the first reflective element LF1, pass through a lens group LG and a filter FT along a second optical axis OA2, enter a second reflective element LF2 to deflect off a reflective surface LFR2 of the second reflective element LF2, and then extend onto the image surface IM along a third optical axis OA3. The first reflective element LF1 is disposed between the imaged object and the lens group LG of the optical image lens assembly, the second reflective element LF2 is disposed between the lens group LG and the image surface IM of the optical image lens assembly, and the travelling direction of light on the first optical axis OA1 can be the same direction as the travelling direction of light on the third optical axis OA3 as shown in FIG. 32. The optical image lens assembly can be optionally provided with three or more reflective elements, and the present disclosure is not limited to the type, amount and position of the reflective elements of the embodiments disclosed in the aforementioned figures. In addition, the optical path can deflect once, twice, thrice or more in a single reflective element. Please refer to FIG. 33, which shows a schematic view of still another configuration of a reflective element in an optical image lens assembly according to one embodiment of the present disclosure. As shown in FIG. 33, in order from an imaged object (not shown in the figures) to an image surface IM of the optical image lens assembly, an optical path can pass through a lens group LG and a filter FT along a first optical axis OA1, enter a double-reflective element DLF to deflect off a first reflective surface DLFR1 of the double-reflective element DLF, extend along a second optical axis OA2 to deflect off a second reflective surface DLFR2 of the double-reflective element DLF, and then extend onto the image surface IM along a third optical axis OA3. The double-reflective element DLF is disposed between lens group LG and the image surface IM of the optical image lens assembly, and the travelling direction of light on the first optical axis OA1 can be the same direction as the travelling direction of light on the third optical axis OA3 as shown in FIG. 33.

The reflective element can be a plastic prism; when an Abbe number of the reflective element is Vr, and a refractive index of the reflective element is Nr, the following condition can be satisfied: $30.0 < Vr/Nr < 40.0$. Therefore, it is favorable for manufacturing the reflective element at lower costs and time with good flatness.

According to the present disclosure, the optical image lens assembly can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the optical image lens assembly and the image surface to produce a telecentric effect, and thereby improves the image-sensing efficiency of an image sensor (for example, CCD or CMOS). A middle stop disposed between the first lens element and the image surface is favorable for enlarging the viewing angle of the optical image lens assembly and thereby provides a wider field of view for the same.

According to the present disclosure, the optical image lens assembly can include an aperture control unit. The aperture control unit may be a mechanical component or a light modulator, which can control the size and shape of the aperture through electricity or electrical signals. The mechanical component can include a movable member, such as a blade assembly or a light shielding sheet. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the above description of the present disclosure, the following specific embodiments are provided for further explanation.

1st Embodiment

Figure 2:
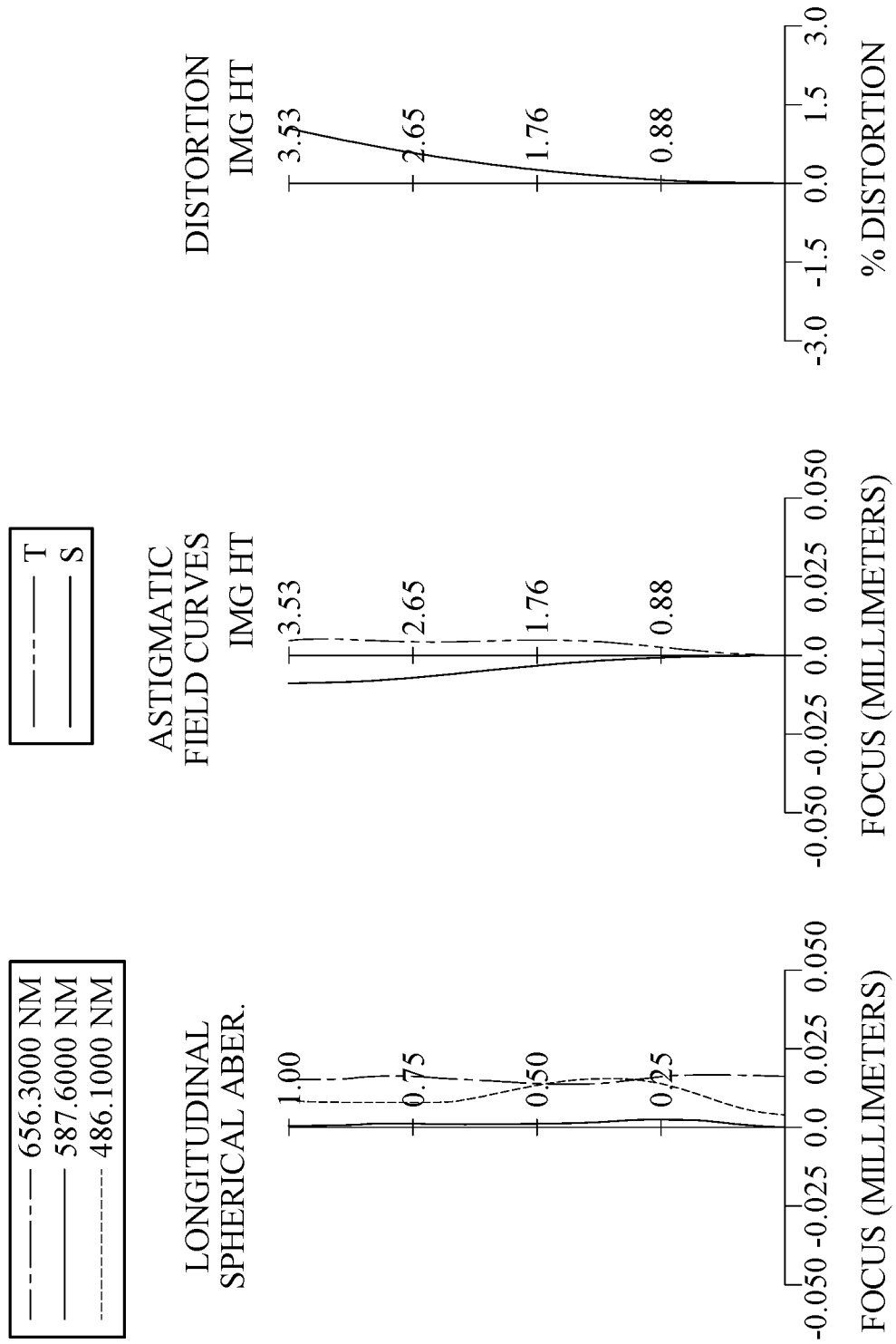
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the optical image lens assembly (its reference numeral is omitted) of the present disclosure and an image sensor 180. The optical image lens assembly includes, in order from an object side to an image side along an optical path, a first lens element 110, a second lens element 120, an aperture stop 100, a third lens element 130, a fourth lens element 140, a fifth lens element 150, a filter 160 and an image surface 170. The optical image lens assembly includes five lens elements (110, 120, 130, 140 and 150) with no additional lens element disposed between each of the adjacent five lens elements, wherein there is an air gap along an optical axis between each of all adjacent lens elements. In this embodiment, an air gap along the optical axis between two adjacent lens elements means the two adjacent lens elements are two non-cemented lens elements in paraxial regions thereof.

The first lens element 110 with positive refractive power has an object-side surface 111 being convex in a paraxial region thereof and an image-side surface 112 being convex in a paraxial region thereof. The first lens element 110 is made of plastic material and has the object-side surface 111 and the image-side surface 112 being both aspheric. The image-side surface 112 of the first lens element 110 has at least one inflection point.

The second lens element 120 with positive refractive power has an object-side surface 121 being convex in a paraxial region thereof and an image-side surface 122 being convex in a paraxial region thereof. The second lens element 120 is made of plastic material and has the object-side surface 121 and the image-side surface 122 being both aspheric. The object-side surface 121 of the second lens element 120 has at least one inflection point.

The third lens element 130 with negative refractive power has an object-side surface 131 being concave in a paraxial region thereof and an image-side surface 132 being concave in a paraxial region thereof. The third lens element 130 is made of plastic material and has the object-side surface 131 and the image-side surface 132 being both aspheric.

The fourth lens element 140 with positive refractive power has an object-side surface 141 being concave in a paraxial region thereof and an image-side surface 142 being convex in a paraxial region thereof. The fourth lens element 140 is made of plastic material and has the object-side surface 141 and the image-side surface 142 being both aspheric.

The fifth lens element 150 with positive refractive power has an object-side surface 151 being convex in a paraxial region thereof and an image-side surface 152 being concave in a paraxial region thereof. The fifth lens element 150 is made of plastic material and has the object-side surface 151 and the image-side surface 152 being both aspheric. The object-side surface 151 of the fifth lens element 150 has at least one inflection point. The image-side surface 152 of the fifth lens element 150 has at least one inflection point. The image-side surface 152 of the fifth lens element 150 has at least one convex shape in an off-axial region thereof.

The filter 160 is made of glass material and located between the fifth lens element 150 and the image surface 170, and will not affect the focal length of the optical image lens assembly. The image sensor 180 is disposed on or near the image surface 170 of the optical image lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,
X is the displacement in parallel with an optical axis from the intersection point of the aspheric surface and the optical axis to a point at a distance of Y from the optical axis on the aspheric surface;
Y is the vertical distance from the point on the aspheric surface to the optical axis;
R is the curvature radius;
k is the conic coefficient; and
Ai is the i-th aspheric coefficient, and in the embodiments, i may be, but is not limited to, 4, 6, 8, 10, 12 and 14.

In the optical image lens assembly of the image capturing unit according to the 1st embodiment, when a focal length of the optical image lens assembly is f, an f-number of the optical image lens assembly is Fno, and half of a maximum field of view of the optical image lens assembly is HFOV, these parameters have the following values: f=22.71 millimeters (mm), Fno=3.06, HFOV=8.7 degrees (deg.).

When a minimum value among Abbe numbers of all lens elements of the optical image lens assembly is Vdmin, the following condition is satisfied: Vdmin=20.4. In this embodiment, among the first through fifth lens elements (110-150), an Abbe number of the fifth lens element 150 is smaller than Abbe numbers of the other lens elements, and Vdmin is equal to the Abbe number of the fifth lens element 150.

When an Abbe number of the fifth lens element 150 is V5, the following condition is satisfied: V5=20.4.

When an Abbe number of the second lens element 120 is V2, and an Abbe number of the third lens element 130 is V3, the following condition is satisfied: V2/V3=2.38.

When the Abbe number of the second lens element 120 is V2, and the Abbe number of the fifth lens element 150 is V5, the following condition is satisfied: V2/V5=2.75.

When an Abbe number of the fourth lens element 140 is V4, and the Abbe number of the fifth lens element 150 is V5, the following condition is satisfied: V4/V5=2.75.

When a thickness along the optical axis of the third lens element 130 is CT3, and a thickness along the optical axis of the fifth lens element 150 is CT5, the following condition is satisfied: CT3/CT5=1.83. In this embodiment, a thickness along the optical axis of single lens element is a central thickness of the single lens element in a paraxial region thereof.

When a distance along the optical axis between the first lens element 110 and the second lens element 120 is T12, a distance along the optical axis between the second lens element 120 and the third lens element 130 is T23, a distance along the optical axis between the third lens element 130 and the fourth lens element 140 is T34, and a distance along the optical axis between the fourth lens element 140 and the fifth lens element 150 is T45, the following condition is satisfied: (T12+T23+T45)/T34=0.39. In this embodiment, a distance along the optical axis between two optical surfaces or elements is a distance in a paraxial region between any two of a lens surface, an aperture stop, a stop, an image surface, etc.

When a curvature radius of the image-side surface 132 of the third lens element 130 is R6, and a curvature radius of the object-side surface 141 of the fourth lens element 140 is R7, the following condition is satisfied: (R6+R7)/(R6−R7)= 0.34.

When the curvature radius of the object-side surface 141 of the fourth lens element 140 is R7, and a curvature radius of the image-side surface 142 of the fourth lens element 140 is R8, the following condition is satisfied: (R7−R8)/(R7+R8)=−0.02.

When the focal length of the optical image lens assembly is f, and a focal length of the first lens element 110 is f1, the following condition is satisfied: f/f1=1.54.

When the focal length of the optical image lens assembly is f, and a focal length of the second lens element 120 is f2, the following condition is satisfied: f/f2=0.60.

When the focal length of the optical image lens assembly is f, and a focal length of the third lens element 130 is f3, the following condition is satisfied: f/f3=−2.09.

When the focal length of the optical image lens assembly is f, and a focal length of the fourth lens element 140 is f4, the following condition is satisfied: f/f4=0.42.

When the focal length of the optical image lens assembly is f, and a focal length of the fifth lens element 150 is f5, the following condition is satisfied: f/f5=0.19.

When the focal length of the second lens element 120 is f2, and the focal length of the third lens element 130 is f3, the following condition is satisfied: f3/f2=−0.29.

When the focal length of the fourth lens element 140 is f4, and the focal length of the fifth lens element 150 is f5, the following condition is satisfied: f4/f5=0.45.

When the focal length of the optical image lens assembly is f, and an entrance pupil diameter of the optical image lens assembly is EPD, the following condition is satisfied: f/EPD=3.06.

When a distance along the optical axis between the image-side surface 152 of the fifth lens element 150 and the image surface 170 is BL, and a distance along the optical axis between the object-side surface 111 of the first lens element 110 and the image-side surface 152 of the fifth lens element 150 is TD, the following condition is satisfied: BL/TD=1.10.

When the distance along the optical axis between the image-side surface 152 of the fifth lens element 150 and the image surface 170 is BL, and a maximum image height of the optical image lens assembly is ImgH, the following condition is satisfied: BL/ImgH=3.76.

When the focal length of the optical image lens assembly is f, and the maximum image height of the optical image lens assembly is ImgH, the following condition is satisfied: f/ImgH=6.44.

When a maximum effective radius of the object-side surface 111 of the first lens element 110 is Y11, and the maximum image height of the optical image lens assembly is ImgH, the following condition is satisfied: Y11/ImgH=1.19.

When the entrance pupil diameter of the optical image lens assembly is EPD, and the maximum effective radius of the object-side surface 111 of the first lens element 110 is Y11, the following condition is satisfied: EPD/Y11=1.77.

When a maximum value among maximum effective radii on the object-side surfaces and the image-side surfaces of all lens elements of the optical image lens assembly is Ymax, and a minimum value among maximum effective radii on the object-side surfaces and the image-side surfaces of all lens elements of the optical image lens assembly is Ymin, the following condition is satisfied: Ymax/Ymin=1.57.

When a distance along the optical axis between the object-side surface 111 of the first lens element 110 and the image surface 170 is TL, and the focal length of the optical image lens assembly is f, the following condition is satisfied: TL/f=1.11.

The detailed optical data of the 1st embodiment are shown in Table 1 and the aspheric surface data are shown in Table 2 below.

TABLE 1

1st Embodiment
f = 22.71 mm, Fno = 3.06, HFOV = 8.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 8.703 | (ASP) | 2.231 | Plastic | 1.545 | 56.1 | 14.75 |
| 2 | | −95.402 | (ASP) | 0.080 | | | | |
| 3 | Lens 2 | 78.004 | (ASP) | 2.457 | Plastic | 1.544 | 56.0 | 37.96 |
| 4 | | −27.780 | (ASP) | 0.030 | | | | |
| 5 | Ape. Stop | Plano | | 0.387 | | | | |
| 6 | Lens 3 | −313.761 | (ASP) | 2.372 | Plastic | 1.639 | 23.5 | −10.86 |
| 7 | | 7.113 | (ASP) | 1.516 | | | | |
| 8 | Lens 4 | −3.495 | (ASP) | 1.564 | Plastic | 1.544 | 56.0 | 53.60 |
| 9 | | −3.613 | (ASP) | 0.100 | | | | |
| 10 | Lens 5 | 18.770 | (ASP) | 1.294 | Plastic | 1.660 | 20.4 | 119.47 |
| 11 | | 23.959 | (ASP) | 12.000 | | | | |
| 12 | Filter | Plano | | 0.210 | Glass | 1.517 | 64.2 | — |
| 13 | | Plano | | 1.039 | | | | |
| 14 | Image | Plano | | — | | | | |

Note:
Reference wavelength is 587.6 nm (d-line).

TABLE 2

| Aspheric Coefficients | | | | | |
|---|---|---|---|---|---|
| Surface # | 1 | 2 | 3 | 4 | 6 |
| k = | −3.6678E−01 | −9.9000E+01 | −4.4461E+00 | −1.9072E+01 | 5.0000E+01 |
| A4 = | 7.3603E−05 | −6.0280E−04 | −8.7379E−04 | −1.9691E−03 | −2.5989E−03 |
| A6 = | −1.1731E−06 | 1.2844E−04 | 1.9540E−04 | 9.5060E−04 | 1.0569E−03 |
| A8 = | −1.0120E−06 | −4.1275E−06 | −5.9162E−06 | −1.9048E−04 | −2.5625E−04 |
| A10 = | 2.1810E−07 | −8.2529E−07 | −1.6707E−06 | 1.8871E−05 | 3.1174E−05 |
| A12 = | −1.3861E−08 | 7.4193E−08 | 1.4912E−07 | −9.4955E−07 | −1.8605E−06 |
| A14 = | 3.7793E−10 | −1.6156E−09 | −3.7160E−09 | 1.8997E−08 | 4.3294E−08 |
| Surface # | 7 | 8 | 9 | 10 | 11 |
| k = | −1.2611E−01 | 2.6855E−02 | −2.1460E+00 | 2.4743E+01 | 1.1381E+01 |
| A4 = | −1.1620E−03 | 8.2801E−03 | 1.6109E−03 | −3.7776E−03 | −5.9684E−03 |
| A6 = | 4.2648E−04 | −2.2769E−04 | −2.9285E−04 | 2.0065E−04 | 7.6609E−04 |
| A8 = | −2.1010E−04 | −1.3108E−04 | −1.0431E−05 | −1.0395E−05 | −9.4807E−05 |
| A10 = | 3.5777E−05 | 3.4564E−05 | 6.5781E−06 | −1.7282E−06 | 7.4811E−06 |
| A12 = | −2.4842E−06 | −2.8836E−06 | −6.2864E−07 | 2.3611E−07 | −3.3277E−07 |
| A14 = | 5.4012E−08 | 9.3400E−08 | 2.2029E−08 | −8.6889E−09 | 6.5053E−09 |

In Table 1, the curvature radius, the thickness and the focal length are shown in millimeters (mm). Surface numbers 0-14 represent the surfaces sequentially arranged from the object side to the image side along the optical axis. In Table 2, k represents the conic coefficient of the equation of the aspheric surface profiles. A4-A14 represent the aspheric coefficients ranging from the 4th order to the 14th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
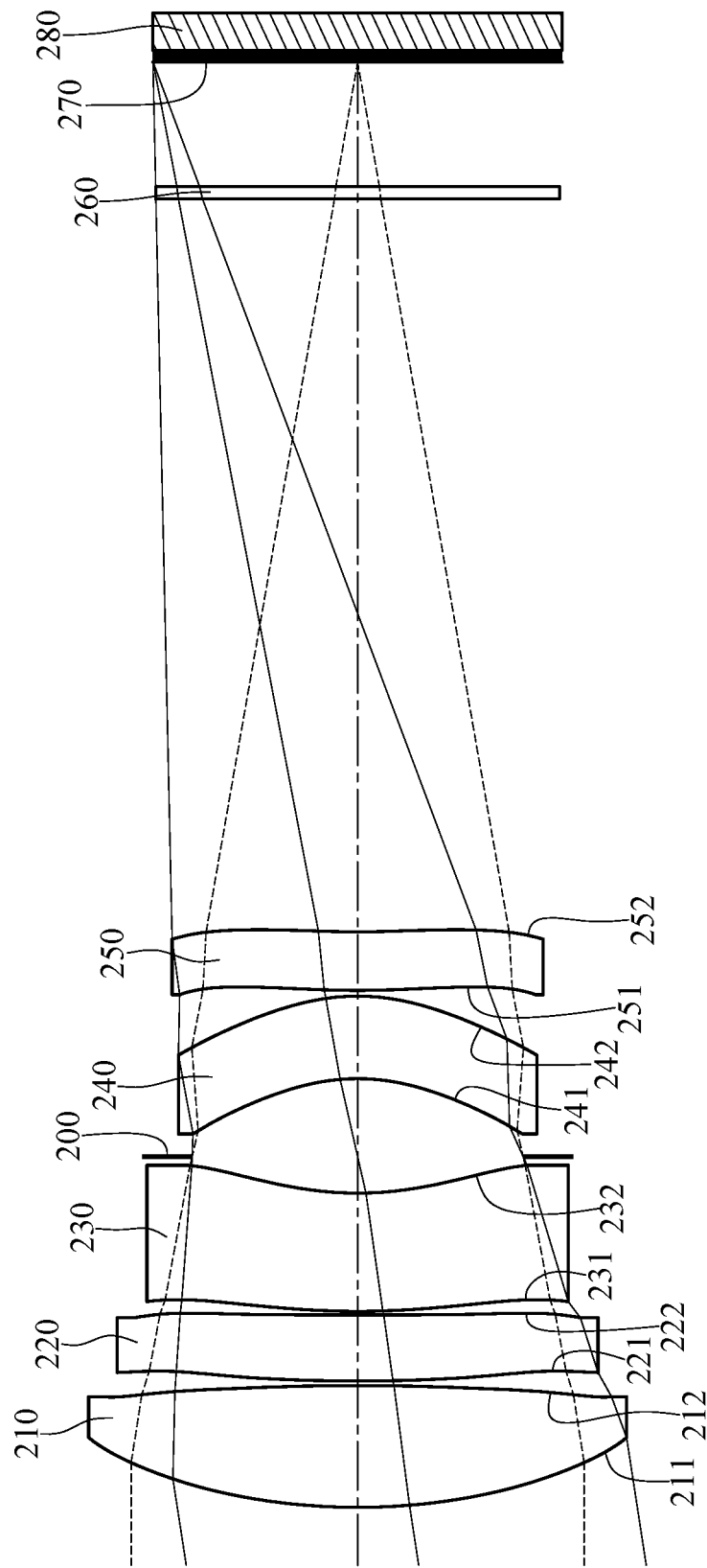
FIG. 3 is a schematic view of an image capturing unit according to the 2nd embodiment of the present disclosure.
Figure 4:
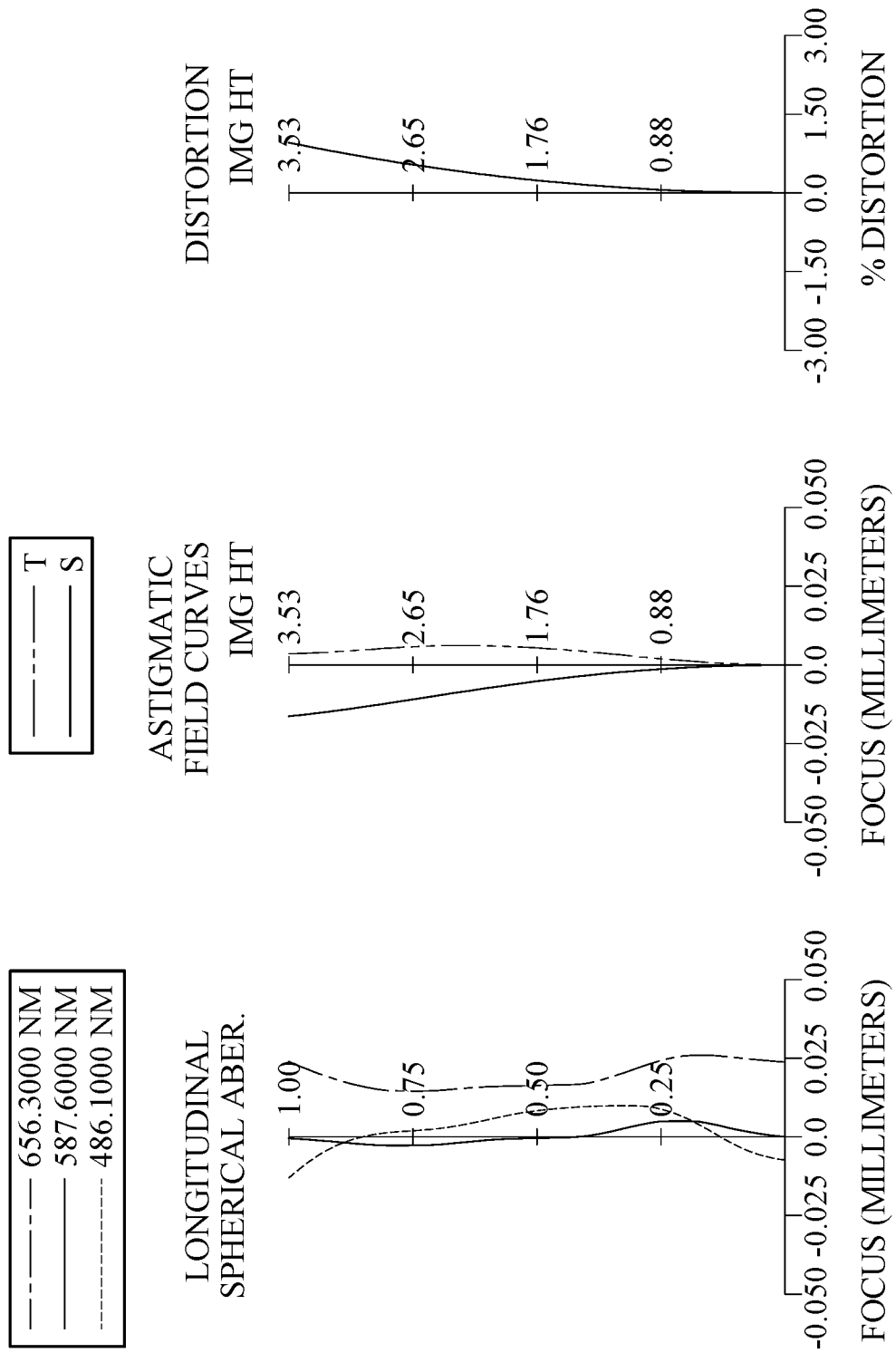
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the optical image lens assembly (its reference numeral is omitted) of the present disclosure and an image sensor 280. The optical image lens assembly includes, in order from an object side to an image side along an optical path, a first lens element 210, a second lens element 220, a third lens element 230, an aperture stop 200, a fourth lens element 240, a fifth lens element 250, a filter 260 and an image surface 270. The optical image lens assembly includes five lens elements (210, 220, 230, 240 and 250) with no additional lens element disposed between each of the adjacent five lens elements, wherein there is an air gap along an optical axis between each of all adjacent lens elements.

The first lens element 210 with positive refractive power has an object-side surface 211 being convex in a paraxial region thereof and an image-side surface 212 being convex in a paraxial region thereof. The first lens element 210 is made of plastic material and has the object-side surface 211 and the image-side surface 212 being both aspheric. The image-side surface 212 of the first lens element 210 has at least one inflection point.

The second lens element 220 with positive refractive power has an object-side surface 221 being convex in a paraxial region thereof and an image-side surface 222 being concave in a paraxial region thereof. The second lens element 220 is made of plastic material and has the object-side surface 221 and the image-side surface 222 being both aspheric. The object-side surface 221 of the second lens element 220 has at least one inflection point. The image-side surface 222 of the second lens element 220 has at least one inflection point.

The third lens element 230 with negative refractive power has an object-side surface 231 being convex in a paraxial region thereof and an image-side surface 232 being concave in a paraxial region thereof. The third lens element 230 is made of plastic material and has the object-side surface 231 and the image-side surface 232 being both aspheric. The object-side surface 231 of the third lens element 230 has at least one inflection point. The image-side surface 232 of the third lens element 230 has at least one inflection point.

The fourth lens element 240 with positive refractive power has an object-side surface 241 being concave in a paraxial region thereof and an image-side surface 242 being convex in a paraxial region thereof. The fourth lens element 240 is made of plastic material and has the object-side surface 241 and the image-side surface 242 being both aspheric.

The fifth lens element 250 with positive refractive power has an object-side surface 251 being convex in a paraxial region thereof and an image-side surface 252 being concave in a paraxial region thereof. The fifth lens element 250 is made of plastic material and has the object-side surface 251 and the image-side surface 252 being both aspheric. The object-side surface 251 of the fifth lens element 250 has at least one inflection point. The image-side surface 252 of the fifth lens element 250 has at least one inflection point. The image-side surface 252 of the fifth lens element 250 has at least one convex shape in an off-axial region thereof.

The filter 260 is made of glass material and located between the fifth lens element 250 and the image surface 270, and will not affect the focal length of the optical image lens assembly. The image sensor 280 is disposed on or near the image surface 270 of the optical image lens assembly.

The detailed optical data of the 2nd embodiment are shown in Table 3 and the aspheric surface data are shown in Table 4 below.

TABLE 3

2nd Embodiment
f = 22.65 mm, Fno = 2.90, HFOV = 8.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 10.931 | (ASP) | 2.100 | Plastic | 1.545 | 56.1 | 16.63 |
| 2 | | −49.501 | (ASP) | 0.080 | | | | |
| 3 | Lens 2 | 29.237 | (ASP) | 1.140 | Plastic | 1.544 | 56.0 | 54.02 |
| 4 | | 5532.410 | (ASP) | 0.061 | | | | |
| 5 | Lens 3 | 13.387 | (ASP) | 2.040 | Plastic | 1.669 | 19.5 | −16.87 |
| 6 | | 5.750 | (ASP) | 0.630 | | | | |
| 7 | Ape. Stop | Plano | | 1.346 | | | | |
| 8 | Lens 4 | −3.461 | (ASP) | 1.423 | Plastic | 1.544 | 56.0 | 88.21 |
| 9 | | −3.696 | (ASP) | 0.100 | | | | |
| 10 | Lens 5 | 15.929 | (ASP) | 1.011 | Plastic | 1.679 | 18.4 | 176.02 |
| 11 | | 17.906 | (ASP) | 12.644 | | | | |
| 12 | Filter | Plano | | 0.210 | Glass | 1.517 | 64.2 | — |
| 13 | | Plano | | 2.148 | | | | |
| 14 | Image | Plano | | — | | | | |

Note:
Reference wavelength is 587.6 nm (d-line).

TABLE 4

Aspheric Coefficients

| Surface # | 1 | 2 | 3 | 4 | 5 |
|---|---|---|---|---|---|
| k = | 7.1433E−01 | 5.0000E+01 | −1.4552E+01 | 9.9000E+01 | −3.6695E+01 |
| A4 = | −7.3747E−05 | −1.5804E−03 | −8.5282E−04 | 7.8630E−04 | −2.8090E−04 |
| A6 = | 1.5220E−05 | 5.5376E−04 | 3.9773E−04 | −5.6984E−05 | 3.2569E−05 |
| A8 = | 4.6101E−07 | −6.9842E−05 | −4.6094E−05 | 2.0659E−05 | −4.5307E−07 |
| A10 = | −3.1339E−08 | 4.0945E−06 | 1.3853E−06 | −4.0364E−06 | −2.4342E−06 |
| A12 = | −2.8240E−09 | −1.1814E−07 | 1.9122E−08 | 2.5206E−07 | 2.3804E−07 |
| A14 = | 1.5785E−10 | 1.4708E−09 | −1.0083E−09 | −5.2301E−09 | −6.7003E−09 |

| Surface # | 6 | 8 | 9 | 10 | 11 |
|---|---|---|---|---|---|
| k = | −1.5332E+00 | −5.2879E−02 | −2.5255E+00 | 6.2940E+00 | −2.1745E+01 |
| A4 = | −3.2375E−03 | 8.5702E−03 | 6.0099E−04 | −6.0479E−03 | −6.8521E−03 |
| A6 = | 3.1821E−04 | −9.6858E−05 | 2.7421E−04 | 6.1628E−04 | 8.1173E−04 |
| A8 = | −5.3124E−05 | −6.2750E−06 | −6.0222E−05 | −5.6190E−05 | −6.7211E−05 |
| A10 = | −1.3794E−06 | −4.3138E−06 | 3.8035E−06 | 5.8305E−07 | 1.0914E−06 |
| A12 = | 6.1168E−07 | 8.6704E−07 | −4.7167E−08 | 2.2792E−08 | 1.1745E−07 |
| A14 = | −2.7793E−08 | −3.2439E−08 | −2.4646E−09 | 1.5383E−09 | −4.3611E−09 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | |
|---|---|
| f [mm] | 22.65 |
| Fno | 2.90 |
| HFOV [deg.] | 8.8 |
| Vdmin | 18.4 |
| V5 | 18.4 |
| V2/V3 | 2.87 |
| V2/V5 | 3.04 |
| V4/V5 | 3.04 |
| CT3/CT5 | 2.02 |
| (T12 + T23 + T45)/T34 | 0.12 |

-continued

| 2nd Embodiment | |
|---|---|
| (R6 + R7)/(R6 − R7) | 0.25 |
| (R7 − R8)/(R7 + R8) | −0.03 |
| f/f1 | 1.36 |
| f/f2 | 0.42 |
| f/f3 | −1.34 |
| f/f4 | 0.26 |
| f/f5 | 0.13 |
| f3/f2 | −0.31 |
| f4/f5 | 0.50 |
| f/EPD | 2.90 |
| BL/TD | 1.51 |
| BL/ImgH | 4.25 |
| f/ImgH | 6.42 |
| Y11/ImgH | 1.31 |
| EPD/Y11 | 1.68 |
| Ymax/Ymin | 1.63 |
| TL/f | 1.10 |

3rd Embodiment

Figure 5:
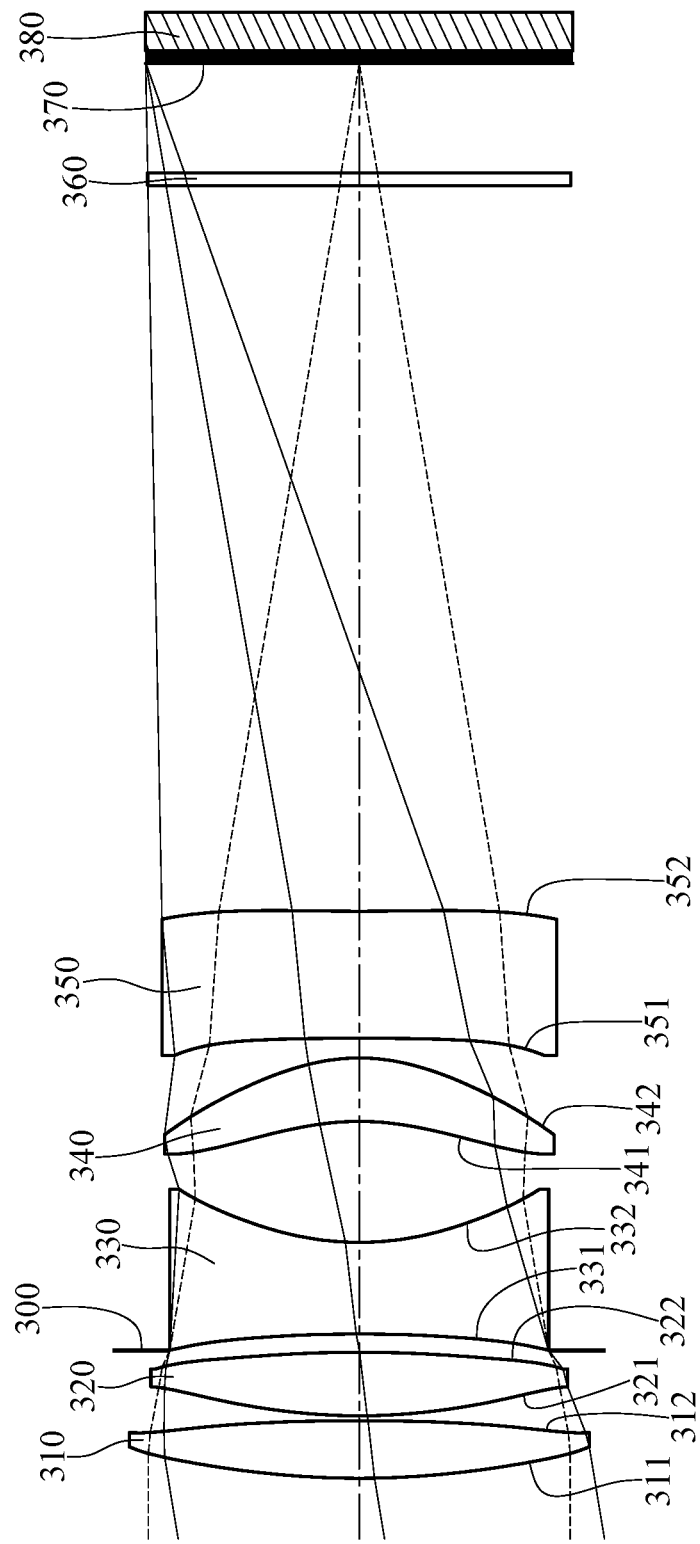
FIG. 5 is a schematic view of an image capturing unit according to the 3rd embodiment of the present disclosure.
Figure 6:
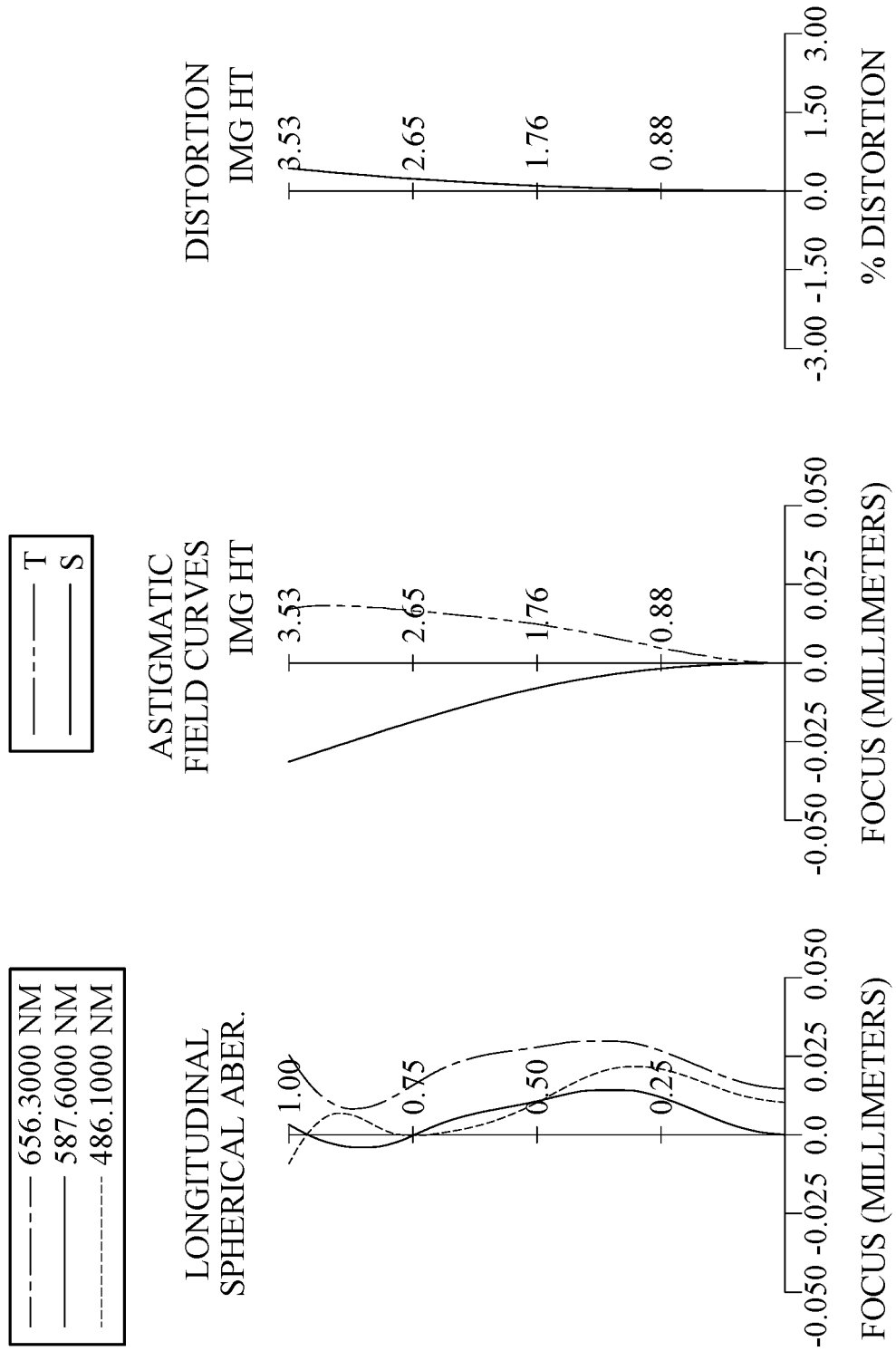
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the optical image lens assembly (its reference numeral is omitted) of the present disclosure and an image sensor 380. The optical image lens assembly includes, in order from an object side to an image side along an optical path, a first lens element 310, a second lens element 320, an aperture stop 300, a third lens element 330, a fourth lens element 340, a fifth lens element 350, a filter 360 and an image surface 370. The optical image lens assembly includes five lens elements (310, 320, 330, 340 and 350) with no additional lens element disposed between each of the adjacent five lens elements, wherein there is an air gap along an optical axis between each of all adjacent lens elements.

The first lens element 310 with positive refractive power has an object-side surface 311 being convex in a paraxial region thereof and an image-side surface 312 being convex in a paraxial region thereof. The first lens element 310 is made of plastic material and has the object-side surface 311 and the image-side surface 312 being both aspheric. The image-side surface 312 of the first lens element 310 has at least one inflection point.

The second lens element 320 with positive refractive power has an object-side surface 321 being convex in a paraxial region thereof and an image-side surface 322 being convex in a paraxial region thereof. The second lens element 320 is made of plastic material and has the object-side surface 321 and the image-side surface 322 being both aspheric.

The third lens element 330 with negative refractive power has an object-side surface 331 being concave in a paraxial region thereof and an image-side surface 332 being concave in a paraxial region thereof. The third lens element 330 is made of plastic material and has the object-side surface 331 and the image-side surface 332 being both aspheric.

The fourth lens element 340 with positive refractive power has an object-side surface 341 being concave in a paraxial region thereof and an image-side surface 342 being convex in a paraxial region thereof. The fourth lens element 340 is made of plastic material and has the object-side surface 341 and the image-side surface 342 being both aspheric. The object-side surface 341 of the fourth lens element 340 has at least one inflection point.

The fifth lens element 350 with negative refractive power has an object-side surface 351 being concave in a paraxial region thereof and an image-side surface 352 being concave in a paraxial region thereof. The fifth lens element 350 is made of plastic material and has the object-side surface 351 and the image-side surface 352 being both aspheric. The image-side surface 352 of the fifth lens element 350 has at least one inflection point. The image-side surface 352 of the fifth lens element 350 has at least one convex shape in an off-axial region thereof.

The filter 360 is made of glass material and located between the fifth lens element 350 and the image surface 370, and will not affect the focal length of the optical image lens assembly. The image sensor 380 is disposed on or near the image surface 370 of the optical image lens assembly.

The detailed optical data of the 3rd embodiment are shown in Table 5 and the aspheric surface data are shown in Table 6 below.

TABLE 5

3rd Embodiment f = 21.26 mm, Fno = 3.05, HFOV = 9.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 14.105 | (ASP) | 0.952 | Plastic | 1.545 | 56.1 | 18.70 |
| 2 | | −35.863 | (ASP) | 0.080 | | | | |
| 3 | Lens 2 | 9.675 | (ASP) | 1.051 | Plastic | 1.544 | 56.0 | 12.85 |
| 4 | | −24.238 | (ASP) | 0.030 | | | | |
| 5 | Ape. Stop | Plano | | 0.272 | | | | |
| 6 | Lens 3 | −27.457 | (ASP) | 1.516 | Plastic | 1.566 | 37.4 | −7.20 |
| 7 | | 4.883 | (ASP) | 2.000 | | | | |
| 8 | Lens 4 | −4.475 | (ASP) | 1.049 | Plastic | 1.566 | 37.4 | 15.32 |
| 9 | | −3.202 | (ASP) | 0.327 | | | | |
| 10 | Lens 5 | −59.329 | (ASP) | 2.100 | Plastic | 1.686 | 18.4 | −34.63 |
| 11 | | 40.205 | (ASP) | 12.000 | | | | |
| 12 | Filter | Plano | | 0.210 | Glass | 1.517 | 64.2 | — |
| 13 | | Plano | | 1.809 | | | | |
| 14 | Image | Plano | | — | | | | |

Note:
Reference wavelength is 587.6 nm (d-line).

TABLE 6

| Aspheric Coefficients | | | | | |
|---|---|---|---|---|---|
| Surface # | 1 | 2 | 3 | 4 | 6 |
| k = | −2.2743E+00 | 5.0000E+01 | −7.5906E+00 | −1.2524E+01 | 4.6676E+01 |
| A4 = | −4.9310E−04 | −1.6722E−04 | 3.0743E−04 | −3.4351E−03 | −3.4842E−03 |
| A6 = | 1.2912E−04 | 2.0184E−05 | −1.3268E−04 | 1.4005E−03 | 1.6773E−03 |
| A8 = | −2.1220E−05 | −9.3803E−06 | 3.5373E−05 | −2.1514E−04 | −3.5944E−04 |
| A10 = | 1.5949E−06 | 1.1614E−06 | −3.9217E−06 | 1.5822E−05 | 3.7255E−05 |
| A12 = | −5.5157E−08 | −4.9532E−08 | 1.8524E−07 | −5.9594E−07 | −1.8881E−06 |
| A14 = | 1.1914E−09 | 1.1524E−09 | −4.7763E−09 | 8.4187E−09 | 3.7745E−08 |

| Surface # | 7 | 8 | 9 | 10 | 11 |
|---|---|---|---|---|---|
| k = | −5.2456E−01 | −1.2527E−01 | −2.2704E+00 | −5.0000E+01 | 9.2549E+01 |
| A4 = | −2.5944E−04 | 8.8542E−03 | 2.1992E−03 | −7.7320E−04 | −4.2763E−03 |
| A6 = | −3.0950E−05 | −5.2381E−04 | −3.7652E−04 | −1.2503E−04 | 4.9828E−04 |
| A8 = | −1.0988E−04 | 1.0249E−04 | 8.1380E−05 | 2.0203E−05 | −7.0700E−05 |
| A10 = | 2.1685E−05 | −1.6088E−05 | −1.4495E−05 | −8.8079E−06 | 5.5635E−06 |
| A12 = | −1.2780E−06 | 1.4271E−06 | 1.1112E−06 | 9.5863E−07 | −2.1361E−07 |
| A14 = | 1.8710E−08 | −4.6454E−08 | −2.9740E−08 | −3.3054E−08 | 2.8652E−09 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | |
|---|---|
| f [mm] | 21.26 |
| Fno | 3.05 |
| HFOV [deg.] | 9.4 |
| Vdmin | 18.4 |
| V5 | 18.4 |
| V2/V3 | 1.50 |
| V2/V5 | 3.04 |
| V4/V5 | 2.03 |
| CT3/CT5 | 0.72 |
| (T12 + T23 + T45)/T34 | 0.35 |
| (R6 + R7)/(R6 − R7) | 0.04 |
| (R7 − R8)/(R7 + R8) | 0.17 |
| f/f1 | 1.14 |
| f/f2 | 1.65 |
| f/f3 | −2.95 |
| f/f4 | 1.39 |
| f/f5 | −0.61 |
| f3/f2 | −0.56 |
| f4/f5 | −0.44 |
| f/EPD | 3.05 |
| BL/TD | 1.50 |
| BL/ImgH | 3.97 |
| f/ImgH | 6.03 |
| Y11/ImgH | 1.08 |
| EPD/Y11 | 1.84 |
| Ymax/Ymin | 1.28 |
| TL/f | 1.10 |

4th Embodiment

Figure 7:
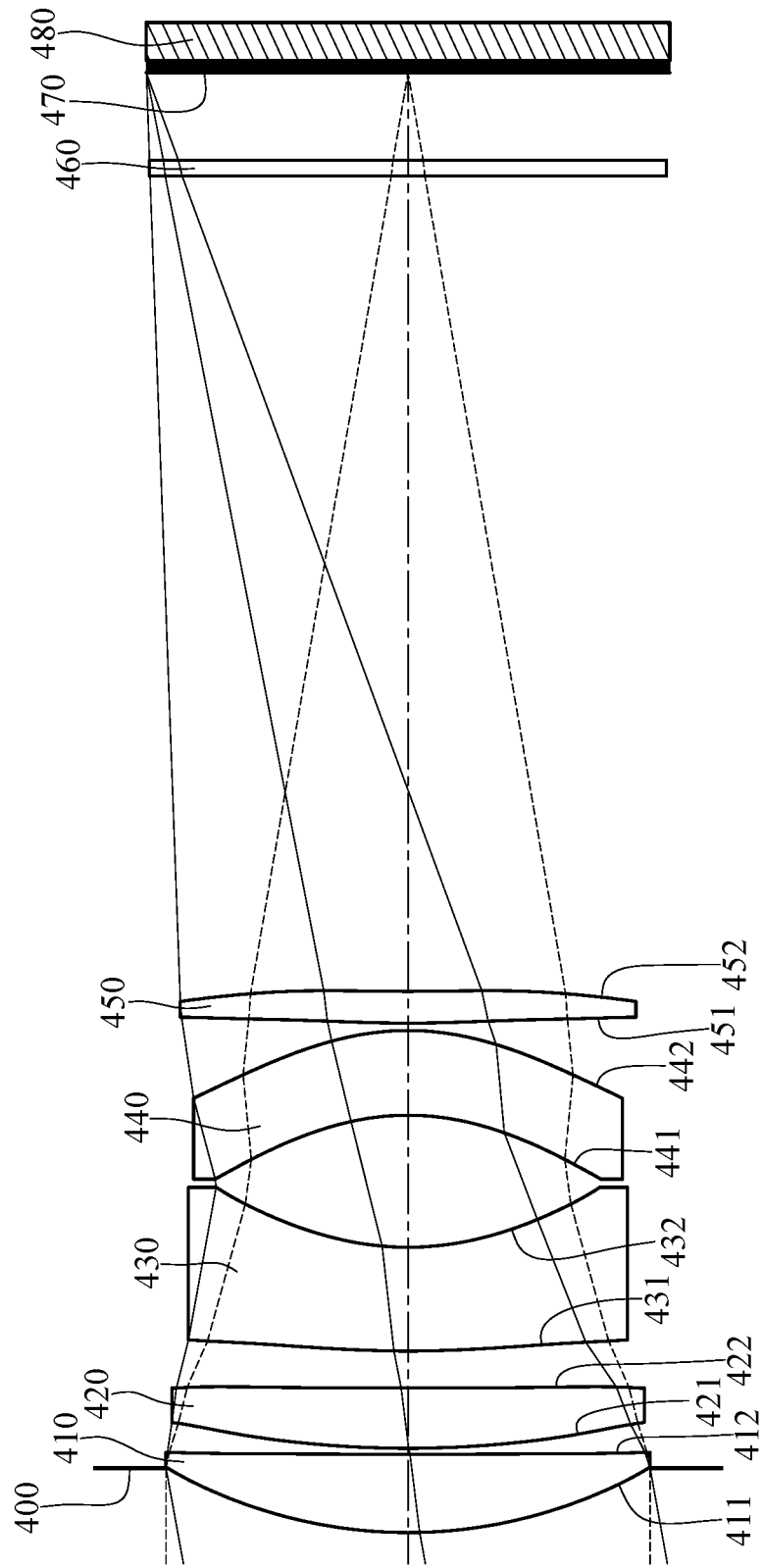
FIG. 7 is a schematic view of an image capturing unit according to the 4th embodiment of the present disclosure.
Figure 8:
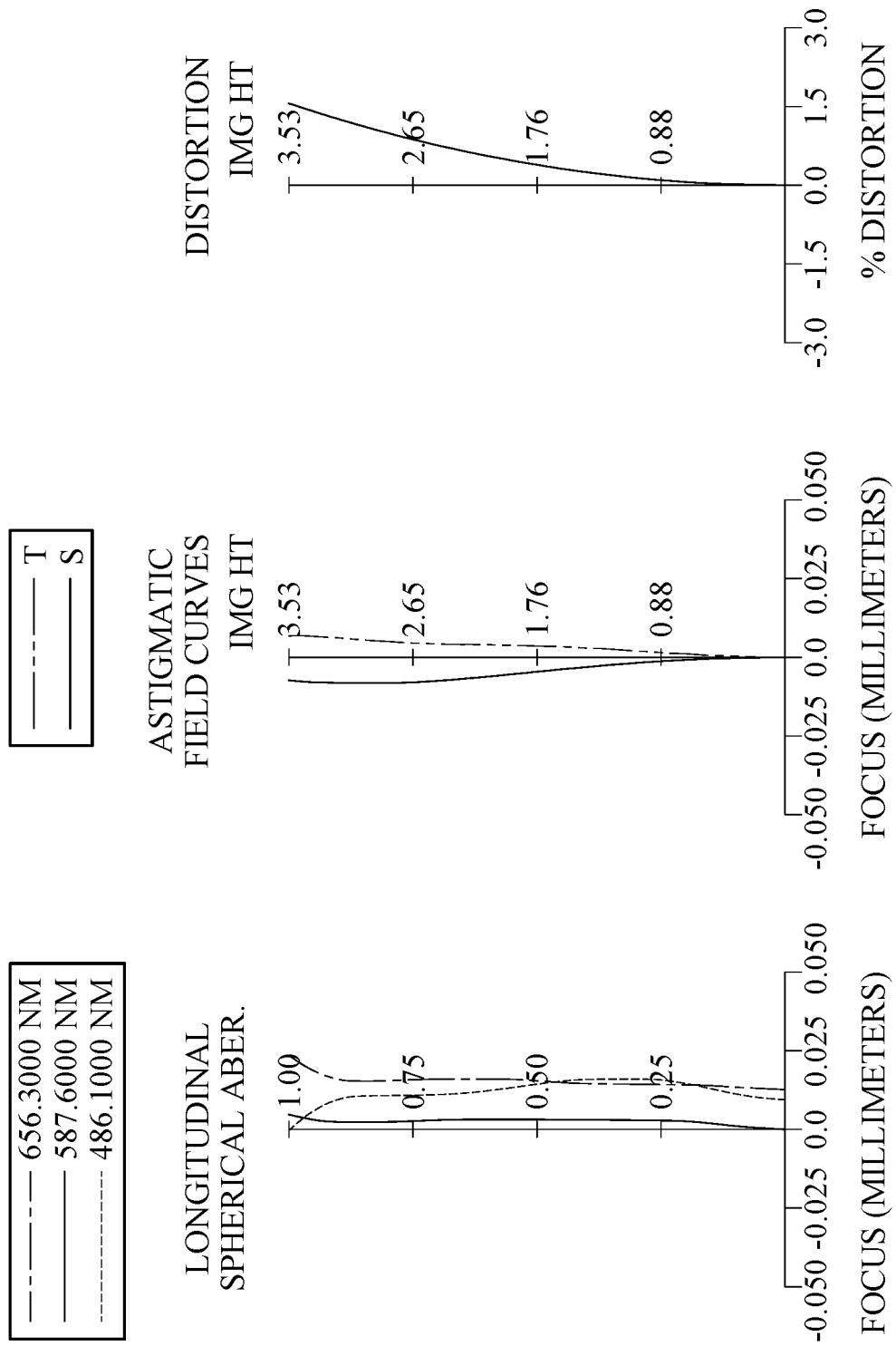
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the optical image lens assembly (its reference numeral is omitted) of the present disclosure and an image sensor 480. The optical image lens assembly includes, in order from an object side to an image side along an optical path, an aperture stop 400, a first lens element 410, a second lens element 420, a third lens element 430, a fourth lens element 440, a fifth lens element 450, a filter 460 and an image surface 470. The optical image lens assembly includes five lens elements (410, 420, 430, 440 and 450) with no additional lens element disposed between each of the adjacent five lens elements, wherein there is an air gap along an optical axis between each of all adjacent lens elements.

The first lens element 410 with positive refractive power has an object-side surface 411 being convex in a paraxial region thereof and an image-side surface 412 being concave in a paraxial region thereof. The first lens element 410 is made of plastic material and has the object-side surface 411 and the image-side surface 412 being both aspheric.

The second lens element 420 with positive refractive power has an object-side surface 421 being convex in a paraxial region thereof and an image-side surface 422 being concave in a paraxial region thereof. The second lens element 420 is made of plastic material and has the object-side surface 421 and the image-side surface 422 being both aspheric. The image-side surface 422 of the second lens element 420 has at least one inflection point.

The third lens element 430 with negative refractive power has an object-side surface 431 being convex in a paraxial region thereof and an image-side surface 432 being concave in a paraxial region thereof. The third lens element 430 is made of plastic material and has the object-side surface 431 and the image-side surface 432 being both aspheric. The object-side surface 431 of the third lens element 430 has at least one inflection point.

The fourth lens element 440 with positive refractive power has an object-side surface 441 being concave in a paraxial region thereof and an image-side surface 442 being convex in a paraxial region thereof. The fourth lens element 440 is made of plastic material and has the object-side surface 441 and the image-side surface 442 being both aspheric.

The fifth lens element 450 with positive refractive power has an object-side surface 451 being convex in a paraxial region thereof and an image-side surface 452 being concave in a paraxial region thereof. The fifth lens element 450 is made of plastic material and has the object-side surface 451 and the image-side surface 452 being both aspheric. The image-side surface 452 of the fifth lens element 450 has at least one inflection point. The image-side surface 452 of the fifth lens element 450 has at least one convex shape in an off-axial region thereof.

The filter 460 is made of glass material and located between the fifth lens element 450 and the image surface 470, and will not affect the focal length of the optical image lens assembly. The image sensor 480 is disposed on or near the image surface 470 of the optical image lens assembly.

The detailed optical data of the 4th embodiment are shown in Table 7 and the aspheric surface data are shown in Table 8 below.

TABLE 7

4th Embodiment
f = 19.24 mm, Fno = 2.95, HFOV = 10.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.868 | | | | |
| 2 | Lens 1 | 6.411 | (ASP) | 1.056 | Plastic | 1.545 | 56.1 | 12.23 |
| 3 | | 160.181 | (ASP) | 0.080 | | | | |
| 4 | Lens 2 | 13.949 | (ASP) | 0.814 | Plastic | 1.544 | 56.0 | 27.35 |
| 5 | | 219.007 | (ASP) | 0.498 | | | | |
| 6 | Lens 3 | 14.425 | (ASP) | 1.400 | Plastic | 1.639 | 23.5 | −8.66 |
| 7 | | 3.845 | (ASP) | 1.781 | | | | |
| 8 | Lens 4 | −3.394 | (ASP) | 1.143 | Plastic | 1.544 | 56.0 | 91.32 |
| 9 | | −3.554 | (ASP) | 0.100 | | | | |
| 10 | Lens 5 | 16.417 | (ASP) | 0.428 | Plastic | 1.660 | 20.4 | 60.22 |
| 11 | | 27.684 | (ASP) | 11.000 | | | | |
| 12 | Filter | Plano | | 0.210 | Glass | 1.517 | 64.2 | — |
| 13 | | Plano | | 1.183 | | | | |
| 14 | Image | Plano | | — | | | | |

Note:
Reference wavelength is 587.6 nm (d-line).

TABLE 8

Aspheric Coefficients

| Surface # | 2 | 3 | 4 | 5 | 6 |
|---|---|---|---|---|---|
| k = | −4.1530E−01 | −2.8651E+00 | −2.3291E+00 | −7.3077E+01 | −4.7380E+01 |
| A4 = | −1.4188E−04 | −4.8871E−04 | 5.6722E−04 | −3.1324E−04 | −2.9024E−03 |
| A6 = | 8.5933E−05 | −9.8867E−05 | −4.1412E−04 | 3.2941E−04 | 1.1734E−03 |
| A8 = | −2.0634E−05 | 5.1372E−05 | 1.3050E−04 | −7.2856E−05 | −3.2328E−04 |
| A10 = | 2.7273E−06 | −6.9734E−06 | −1.7419E−05 | 5.8973E−06 | 4.2856E−05 |
| A12 = | −1.8222E−07 | 4.2198E−07 | 1.0609E−06 | −1.8552E−07 | −2.6429E−06 |
| A14 = | 5.6955E−09 | −9.7872E−09 | −2.7333E−08 | −9.0669E−11 | 6.2810E−08 |

| Surface # | 7 | 8 | 9 | 10 | 11 |
|---|---|---|---|---|---|
| k = | −6.5037E−01 | −3.7084E−02 | −2.4486E+00 | 2.0050E+01 | −1.0063E+01 |
| A4 = | −5.0530E−03 | 6.2634E−03 | 5.6740E−04 | −8.1147E−03 | −9.9879E−03 |
| A6 = | 1.6560E−03 | 6.3183E−04 | 1.5827E−04 | 9.4797E−04 | 1.4485E−03 |
| A8 = | −5.2122E−04 | −2.9604E−04 | −7.8562E−05 | −2.2005E−05 | −1.2179E−04 |
| A10 = | 8.2463E−05 | 6.0724E−05 | 1.8110E−05 | −8.1191E−06 | 5.1039E−06 |
| A12 = | −5.7864E−06 | −5.1203E−06 | −1.6740E−06 | 8.6222E−07 | −2.1381E−08 |
| A14 = | 1.5143E−07 | 1.6424E−07 | 5.1814E−08 | −3.0132E−08 | −4.9797E−09 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | |
|---|---|
| f [mm] | 19.24 |
| Fno | 2.95 |
| HFOV [deg.] | 10.2 |
| Vdmin | 20.4 |
| V5 | 20.4 |
| V2/V3 | 2.38 |
| V2/V5 | 2.75 |
| V4/V5 | 2.75 |
| CT3/CT5 | 3.27 |
| (T12 + T23 + T45)/T34 | 0.38 |
| (R6 + R7)/(R6 − R7) | 0.06 |
| (R7 − R8)/(R7 + R8) | −0.02 |
| f/f1 | 1.57 |
| f/f2 | 0.70 |
| f/f3 | −2.22 |
| f/f4 | 0.21 |
| f/f5 | 0.32 |
| f3/f2 | −0.32 |
| f4/f5 | 1.52 |
| f/EPD | 2.95 |
| BL/TD | 1.70 |
| BL/ImgH | 3.51 |
| f/ImgH | 5.45 |
| Y11/ImgH | 0.92 |
| EPD/Y11 | 2.00 |
| Ymax/Ymin | 1.26 |
| TL/f | 1.02 |

5th Embodiment

Figure 9:
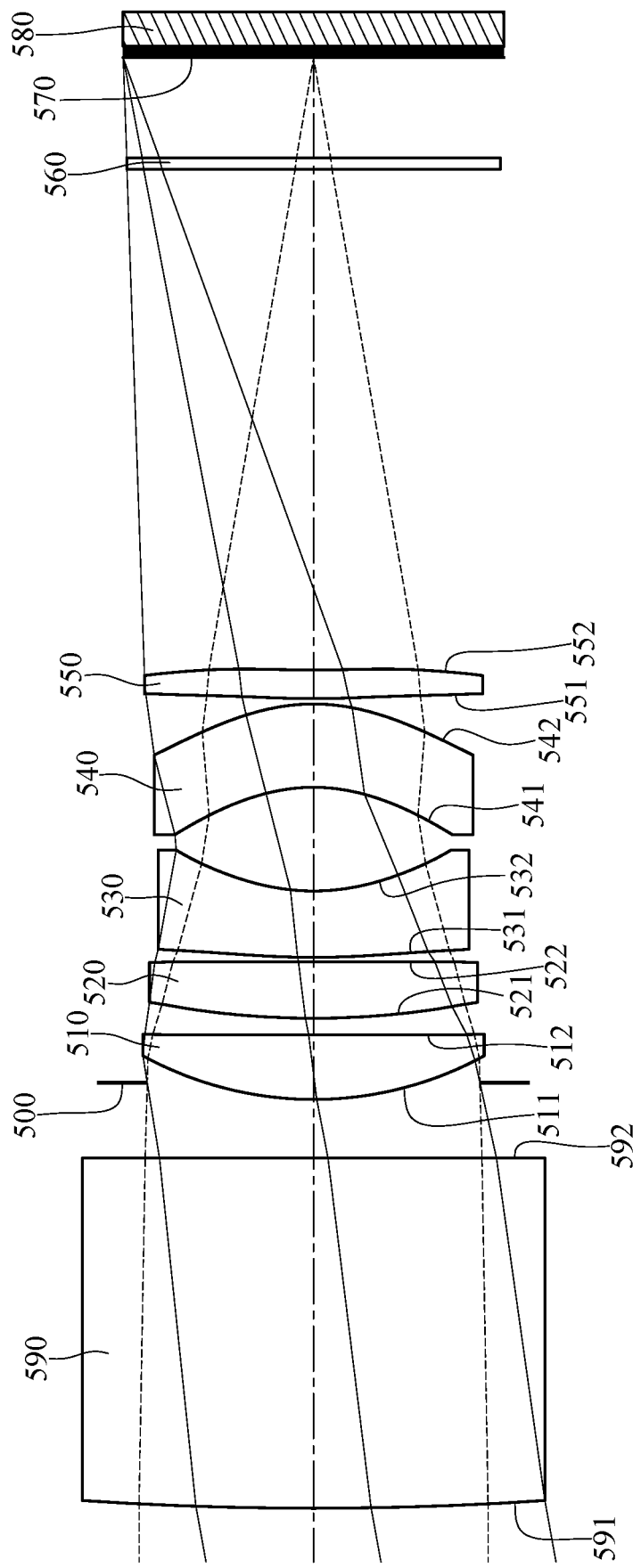
FIG. 9 is a schematic view of an image capturing unit according to the 5th embodiment of the present disclosure.
Figure 10:
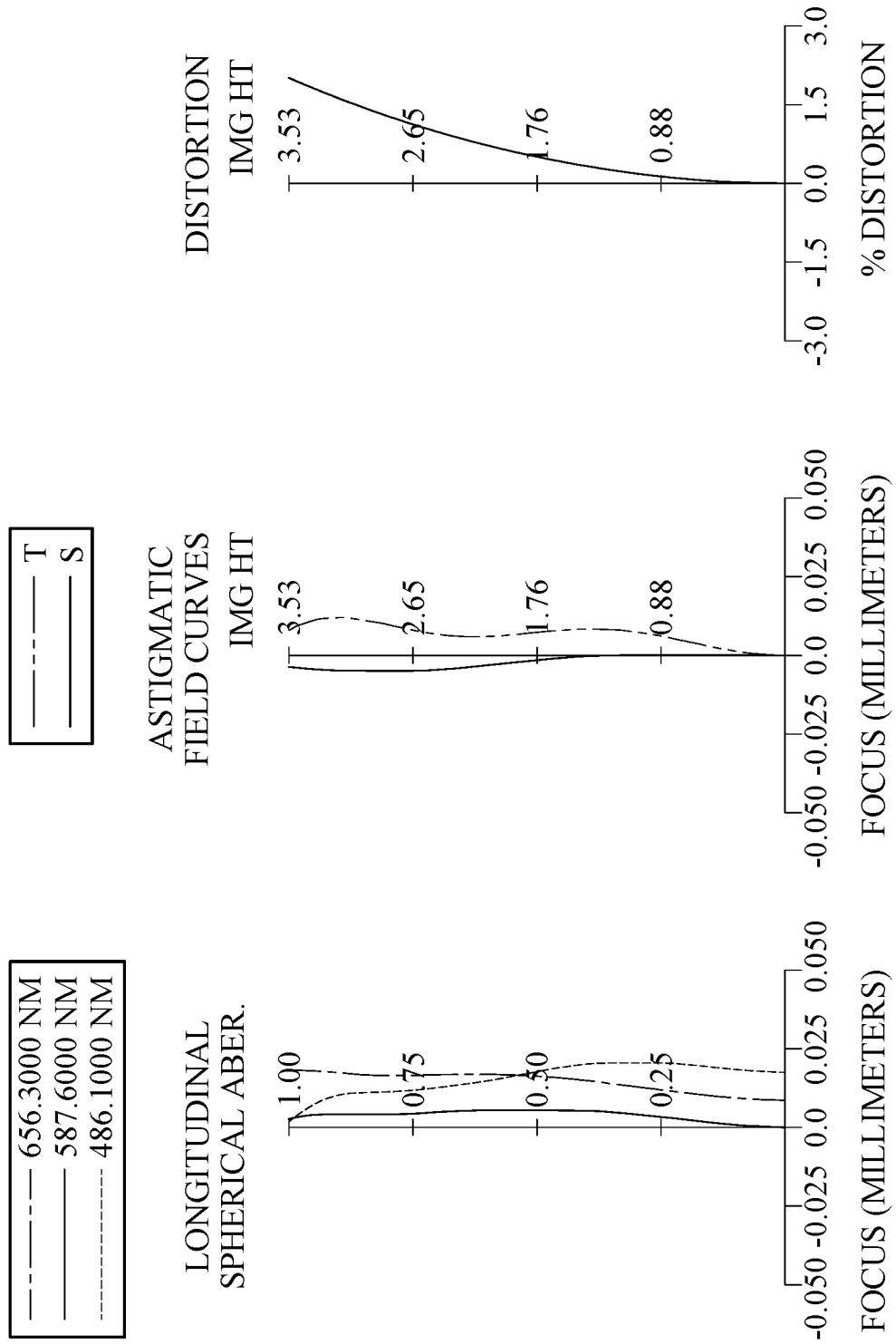
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the optical image lens assembly (its reference numeral is omitted) of the present disclosure and an image sensor 580. The optical image lens assembly includes, in order from an object side to an image side along an optical path, a prism 590, an aperture stop 500, a first lens element 510, a second lens element 520, a third lens element 530, a fourth lens element 540, a fifth lens element 550, a filter 560 and an image surface 570. The optical image lens assembly includes five lens elements (510, 520, 530, 540 and 550) with no additional lens element disposed between each of the adjacent five lens elements, wherein there is an air gap along an optical axis between each of all adjacent lens elements.

The prism 590 is a reflective element and made of plastic material. The prism 590 with positive refractive power has an object-side surface 591 being convex in a paraxial region thereof and an image-side surface 592 being planar in a paraxial region thereof.

The first lens element 510 with positive refractive power has an object-side surface 511 being convex in a paraxial region thereof and an image-side surface 512 being concave in a paraxial region thereof. The first lens element 510 is made of plastic material and has the object-side surface 511 and the image-side surface 512 being both aspheric. The image-side surface 512 of the first lens element 510 has at least one inflection point.

The second lens element 520 with positive refractive power has an object-side surface 521 being convex in a paraxial region thereof and an image-side surface 522 being convex in a paraxial region thereof. The second lens element 520 is made of plastic material and has the object-side surface 521 and the image-side surface 522 being both aspheric. The image-side surface 522 of the second lens element 520 has at least one inflection point.

The third lens element 530 with negative refractive power has an object-side surface 531 being convex in a paraxial region thereof and an image-side surface 532 being concave in a paraxial region thereof. The third lens element 530 is made of plastic material and has the object-side surface 531 and the image-side surface 532 being both aspheric.

The fourth lens element 540 with positive refractive power has an object-side surface 541 being concave in a paraxial region thereof and an image-side surface 542 being convex in a paraxial region thereof. The fourth lens element 540 is made of plastic material and has the object-side surface 541 and the image-side surface 542 being both aspheric.

The fifth lens element 550 with positive refractive power has an object-side surface 551 being convex in a paraxial region thereof and an image-side surface 552 being concave in a paraxial region thereof. The fifth lens element 550 is made of plastic material and has the object-side surface 551 and the image-side surface 552 being both aspheric. The object-side surface 551 of the fifth lens element 550 has at least one inflection point. The image-side surface 552 of the fifth lens element 550 has at least one inflection point. The image-side surface 552 of the fifth lens element 550 has at least one convex shape in an off-axial region thereof.

The filter 560 is made of glass material and located between the fifth lens element 550 and the image surface 570, and will not affect the focal length of the optical image lens assembly. The image sensor 580 is disposed on or near the image surface 570 of the optical image lens assembly.

When an Abbe number of the prism 590 (the reflective element) is Vr, and a refractive index of the prism 590 (the reflective element) is Nr, the following condition is satisfied: Vr/Nr=36.51.

The detailed optical data of the 5th embodiment are shown in Table 9 and the aspheric surface data are shown in Table 10 below.

TABLE 9

5th Embodiment
f = 19.08 mm, Fno = 2.95, HFOV = 10.3 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Prism | 63.613 | 6.500 | Plastic | 1.534 | 56.0 | 119.06 |
| 2 | | Plano | 1.400 | | | | |
| 3 | Ape. Stop | Plano | −0.312 | | | | |
| 4 | Lens 1 | 6.503 (ASP) | 1.196 | Plastic | 1.545 | 56.1 | 12.25 |

TABLE 9-continued

5th Embodiment
f = 19.08 mm, Fno = 2.95, HFOV = 10.3 deg.

| Surface # | | Curvature Radius | | Thickness | Material | Index | Abbe # | Focal Length |
|---|---|---|---|---|---|---|---|---|
| 5 | | 238.440 | (ASP) | 0.311 | | | | |
| 6 | Lens 2 | 15.460 | (ASP) | 1.047 | Plastic | 1.544 | 56.0 | 28.15 |
| 7 | | −1595.098 | (ASP) | 0.082 | | | | |
| 8 | Lens 3 | 14.078 | (ASP) | 1.232 | Plastic | 1.639 | 23.5 | −8.93 |
| 9 | | 3.919 | (ASP) | 1.925 | | | | |
| 10 | Lens 4 | −3.338 | (ASP) | 1.547 | Plastic | 1.544 | 56.0 | 68.88 |
| 11 | | −3.566 | (ASP) | 0.100 | | | | |
| 12 | Lens 5 | 16.231 | (ASP) | 0.531 | Plastic | 1.660 | 20.4 | 108.76 |
| 13 | | 20.701 | (ASP) | 9.295 | | | | |
| 14 | Filter | Plano | | 0.210 | Glass | 1.517 | 64.2 | — |
| 15 | | Plano | | 1.860 | | | | |
| 16 | Image | Plano | | — | | | | |

Note:
Reference wavelength is 587.6 nm (d-line).

TABLE 10

Aspheric Coefficients

| Surface # | 4 | 5 | 6 | 7 | 8 |
|---|---|---|---|---|---|
| k = | −4.0300E−01 | 2.4323E+01 | −2.7666E+00 | 9.9000E+01 | −4.6153E+01 |
| A4 = | −1.2551E−04 | −5.3884E−04 | 9.3962E−04 | 6.4693E−04 | −2.5917E−03 |
| A6 = | 5.5398E−05 | −7.9339E−05 | −7.0732E−04 | −2.3541E−04 | 1.0531E−03 |
| A8 = | −8.9933E−06 | 4.9742E−05 | 2.0438E−04 | 6.0923E−05 | −3.3516E−04 |
| A10 = | 9.0455E−07 | −7.0172E−06 | −2.4948E−05 | −9.1026E−06 | 5.1761E−05 |
| A12 = | −4.1388E−08 | 4.3128E−07 | 1.3154E−06 | 5.7370E−07 | −3.7267E−06 |
| A14 = | 1.1280E−09 | −1.0019E−08 | −2.6019E−08 | −1.3233E−08 | 1.0334E−07 |

| Surface # | 9 | 10 | 11 | 12 | 13 |
|---|---|---|---|---|---|
| k = | −6.6963E−01 | −3.3982E−02 | −2.4681E+00 | 1.9424E+01 | −1.3999E+01 |
| A4 = | −4.9599E−03 | 7.2763E−03 | 2.2431E−03 | −7.4115E−03 | −1.0704E−02 |
| A6 = | 1.5931E−03 | 1.7652E−04 | −5.4235E−04 | 8.9410E−04 | 1.9258E−03 |
| A8 = | −5.9486E−04 | −2.8134E−04 | 2.7979E−05 | −9.5519E−05 | −2.8674E−04 |
| A10 = | 1.1528E−04 | 8.3364E−05 | 1.2955E−05 | 1.2273E−05 | 3.2918E−05 |
| A12 = | −1.0144E−05 | −9.3557E−06 | −2.0166E−06 | −1.1376E−06 | −2.2422E−06 |
| A14 = | 3.3322E−07 | 3.9083E−07 | 8.4090E−08 | 3.8454E−08 | 6.2915E−08 |

In the 5th embodiment, the equation of the aspheric surface profiles of the aforementioned lens elements is the same as the equation of the 1st embodiment. Also, the definitions of these parameters shown in the following table, except for Vr/Nr described in this embodiment, are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | |
|---|---|
| f [mm] | 19.08 |
| Fno | 2.95 |
| HFOV [deg.] | 10.3 |
| Vdmin | 20.4 |
| V5 | 20.4 |
| V2/V3 | 2.38 |
| V2/V5 | 2.75 |
| V4/V5 | 2.75 |
| CT3/CT5 | 2.32 |
| (T12 + T23 + T45)/T34 | 0.26 |
| (R6 + R7)/(R6 − R7) | 0.08 |
| (R7 − R8)/(R7 + R8) | −0.03 |

-continued

| 5th Embodiment | |
|---|---|
| f/f1 | 1.56 |
| f/f2 | 0.68 |
| f/f3 | −2.14 |
| f/f4 | 0.28 |
| f/f5 | 0.18 |
| f3/f2 | −0.32 |
| f4/f5 | 0.63 |
| f/EPD | 2.95 |
| BL/TD | 1.43 |
| BL/ImgH | 3.22 |
| f/ImgH | 6.11 |
| Y11/ImgH | 0.90 |
| EPD/Y11 | 2.04 |
| Ymax/Ymin | 1.24 |
| TL/f | 0.90 |
| Vr/Nr | 36.51 |

6th Embodiment

Figure 11:
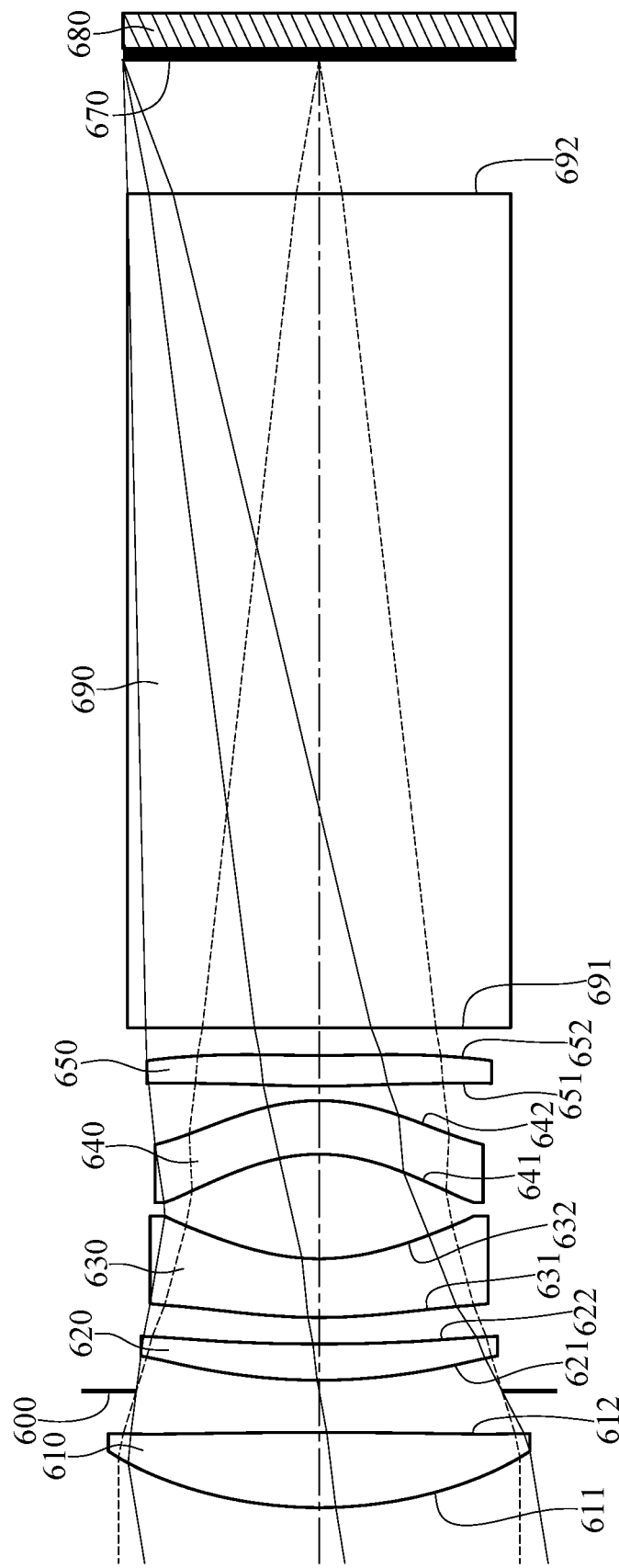
FIG. 11 is a schematic view of an image capturing unit according to the 6th embodiment of the present disclosure.
Figure 12:
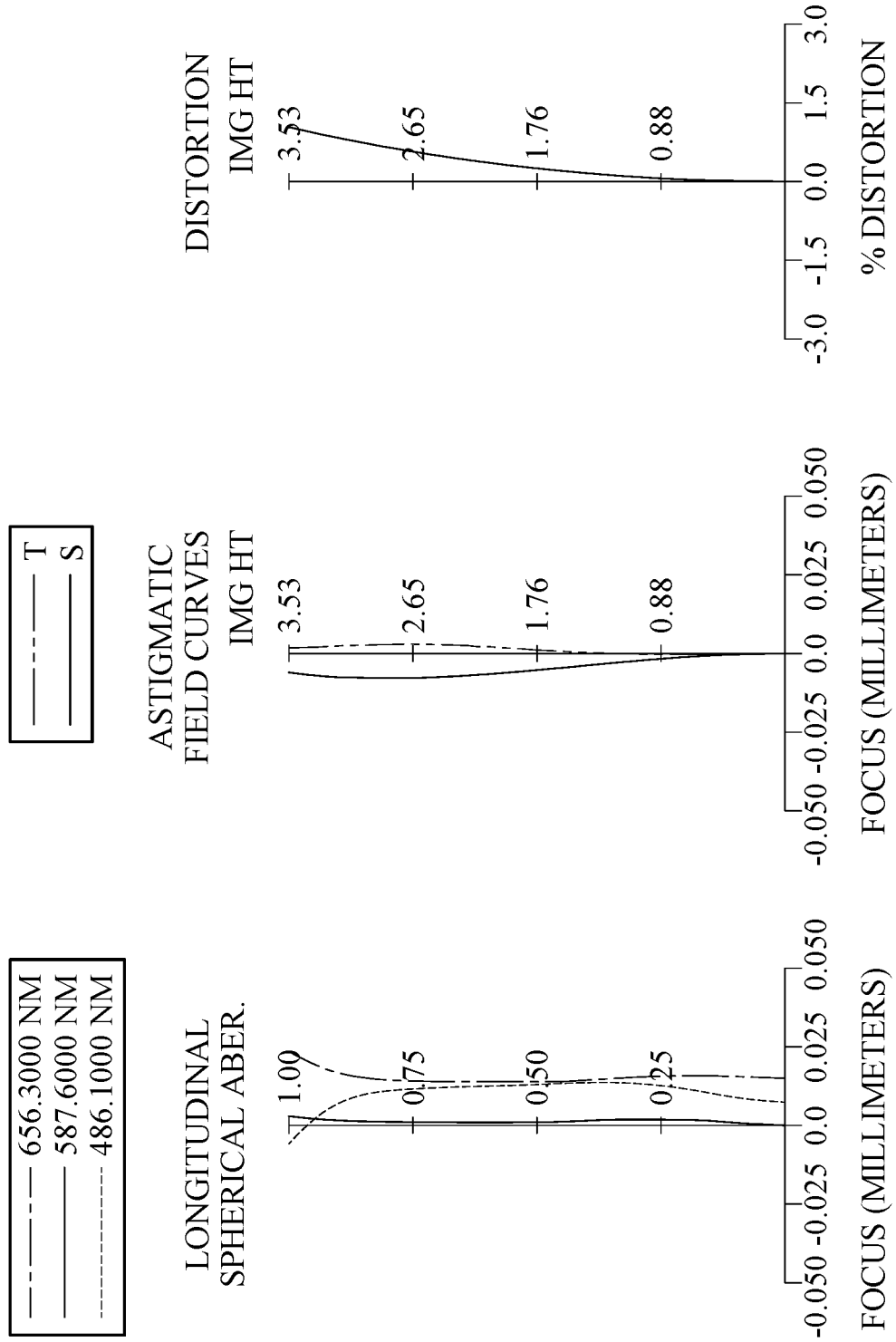
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the optical image lens assembly (its reference numeral is omitted) of the present disclosure and an image sensor 680. The optical image lens assembly includes, in order from an object side to an image side along an optical path, a first lens element 610, an aperture stop 600, a second lens element 620, a third lens element 630, a fourth lens element 640, a fifth lens element 650, a prism 690 and an image surface 670. The optical image lens assembly includes five lens elements (610, 620, 630, 640 and 650) with no additional lens element disposed between each of the adjacent five lens elements, wherein there is an air gap along an optical axis between each of all adjacent lens elements.

The first lens element 610 with positive refractive power has an object-side surface 611 being convex in a paraxial region thereof and an image-side surface 612 being convex in a paraxial region thereof. The first lens element 610 is made of plastic material and has the object-side surface 611 and the image-side surface 612 being both aspheric. The image-side surface 612 of the first lens element 610 has at least one inflection point.

The second lens element 620 with positive refractive power has an object-side surface 621 being convex in a paraxial region thereof and an image-side surface 622 being concave in a paraxial region thereof. The second lens element 620 is made of plastic material and has the object-side surface 621 and the image-side surface 622 being both aspheric. The image-side surface 622 of the second lens element 620 has at least one inflection point.

The third lens element 630 with negative refractive power has an object-side surface 631 being convex in a paraxial region thereof and an image-side surface 632 being concave in a paraxial region thereof. The third lens element 630 is made of plastic material and has the object-side surface 631 and the image-side surface 632 being both aspheric. The object-side surface 631 of the third lens element 630 has at least one inflection point.

The fourth lens element 640 with negative refractive power has an object-side surface 641 being concave in a paraxial region thereof and an image-side surface 642 being convex in a paraxial region thereof. The fourth lens element 640 is made of plastic material and has the object-side surface 641 and the image-side surface 642 being both aspheric. The image-side surface 642 of the fourth lens element 640 has at least one inflection point.

The fifth lens element 650 with positive refractive power has an object-side surface 651 being convex in a paraxial region thereof and an image-side surface 652 being concave in a paraxial region thereof. The fifth lens element 650 is made of plastic material and has the object-side surface 651 and the image-side surface 652 being both aspheric. The object-side surface 651 of the fifth lens element 650 has at least one inflection point. The image-side surface 652 of the fifth lens element 650 has at least one inflection point. The image-side surface 652 of the fifth lens element 650 has at least one convex shape in an off-axial region thereof.

The prism 690 is a reflective element and made of glass material. The prism 690 has an object-side surface 691 being planar in a paraxial region thereof and an image-side surface 692 being planar in a paraxial region thereof. The prism 690 is located between the fifth lens element 650 and the image surface 670, and will not affect the focal length of the optical image lens assembly. The image sensor 680 is disposed on or near the image surface 670 of the optical image lens assembly.

The detailed optical data of the 6th embodiment are shown in Table 11 and the aspheric surface data are shown in Table 12 below.

TABLE 11

6th Embodiment
f = 21.30 mm, Fno = 2.95, HFOV = 9.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 8.031 | (ASP) | 1.351 | Plastic | 1.545 | 56.1 | 14.23 |
| 2 | | −210.987 | (ASP) | 0.748 | | | | |
| 3 | Ape. Stop | Plano | | 0.193 | | | | |
| 4 | Lens 2 | 10.599 | (ASP) | 0.653 | Plastic | 1.566 | 37.4 | 25.14 |
| 5 | | 40.610 | (ASP) | 0.477 | | | | |
| 6 | Lens 3 | 10.246 | (ASP) | 1.056 | Plastic | 1.660 | 20.4 | −10.54 |
| 7 | | 3.973 | (ASP) | 1.881 | | | | |
| 8 | Lens 4 | −3.239 | (ASP) | 0.965 | Plastic | 1.544 | 56.0 | −1146.31 |
| 9 | | −3.598 | (ASP) | 0.259 | | | | |
| 10 | Lens 5 | 16.963 | (ASP) | 0.554 | Plastic | 1.660 | 20.4 | 76.09 |
| 11 | | 25.283 | (ASP) | 0.500 | | | | |
| 12 | Prism | Plano | | 15.000 | Glass | 1.517 | 64.2 | — |
| 13 | | Plano | | 2.408 | | | | |
| 14 | Image | Plano | | — | | | | |

Note:
Reference wavelength is 587.6 nm (d-line).

TABLE 12

Aspheric Coefficients

| Surface # | 1 | 2 | 4 | 5 | 6 |
|---|---|---|---|---|---|
| k = | −2.8143E−01 | −4.9493E+01 | −4.2147E+00 | 9.5248E+01 | −3.0778E+01 |
| A4 = | 3.9081E−05 | −5.0141E−04 | 9.2278E−04 | 1.8259E−03 | −1.1508E−03 |
| A6 = | 1.9875E−05 | −4.0391E−06 | −5.9876E−04 | −6.8478E−04 | 5.4664E−04 |

TABLE 12-continued

| Aspheric Coefficients | | | | | |
|---|---|---|---|---|---|
| A8 = | −2.9861E−06 | 1.4903E−05 | 1.4576E−04 | 1.5636E−04 | −1.6290E−04 |
| A10 = | 6.1408E−07 | −1.4553E−06 | −1.4586E−05 | −2.0109E−05 | 1.7482E−05 |
| A12 = | −3.9595E−08 | 5.4476E−08 | 5.0710E−07 | 1.1693E−06 | −6.6518E−07 |
| A14 = | 8.9695E−10 | −6.9868E−10 | −1.3403E−09 | −2.3180E−08 | 5.1139E−09 |

| Surface # | 7 | 8 | 9 | 10 | 11 |
|---|---|---|---|---|---|
| k = | −1.1712E+00 | −1.6970E−01 | −2.9909E+00 | 1.7342E+01 | 3.0994E+01 |
| A4 = | −6.9016E−03 | 7.5403E−03 | −1.3659E−03 | −7.5596E−03 | −7.9858E−03 |
| A6 = | 1.9416E−03 | 1.0116E−03 | 1.0660E−03 | 7.4992E−04 | 7.4109E−04 |
| A8 = | −5.1397E−04 | −2.8227E−04 | −1.8074E−04 | 8.6625E−06 | 7.5012E−06 |
| A10 = | 7.4756E−05 | 4.4669E−05 | 2.1351E−05 | −8.6675E−06 | −8.3601E−06 |
| A12 = | −5.8613E−06 | −3.8125E−06 | −1.4034E−06 | 6.0991E−07 | 6.6320E−07 |
| A14 = | 2.1502E−07 | 1.6541E−07 | 3.8105E−08 | −1.4569E−08 | −1.8387E−08 |

In the 6th embodiment, the equation of the aspheric surface profiles of the aforementioned lens elements is the same as the equation of the 1st embodiment. Also, the definitions of these parameters shown in the following table are the same as those stated in the 1st and the 5th embodiments with corresponding values for the 6th embodiment, so an explanation in this regard will not be provided again.

Moreover, these parameters can be calculated from Table 11 and Table 12 as the following values and satisfy the following conditions:

| 6th Embodiment | |
|---|---|
| f [mm] | 21.30 |
| Fno | 2.95 |
| HFOV [deg.] | 9.3 |
| Vdmin | 20.4 |
| V5 | 20.4 |
| V2/V3 | 1.83 |
| V2/V5 | 1.83 |
| V4/V5 | 2.75 |
| CT3/CT5 | 1.91 |
| (T12 + T23 + T45)/T34 | 0.89 |
| (R6 + R7)/(R6 − R7) | 0.10 |
| (R7 − R8)/(R7 + R8) | −0.05 |
| f/f1 | 1.50 |
| f/f2 | 0.85 |
| f/f3 | −2.02 |
| f/f4 | −0.02 |
| f/f5 | 0.28 |
| f3/f2 | −0.42 |
| f4/f5 | −15.06 |
| f/EPD | 2.95 |
| BL/TD | 2.20 |
| BL/ImgH | 5.08 |
| f/ImgH | 6.04 |
| Y11/ImgH | 1.07 |
| EPD/Y11 | 1.90 |
| Ymax/Ymin | 1.37 |
| TL/f | 1.22 |
| Vr/Nr | 42.32 |

7th Embodiment

Figure 13:
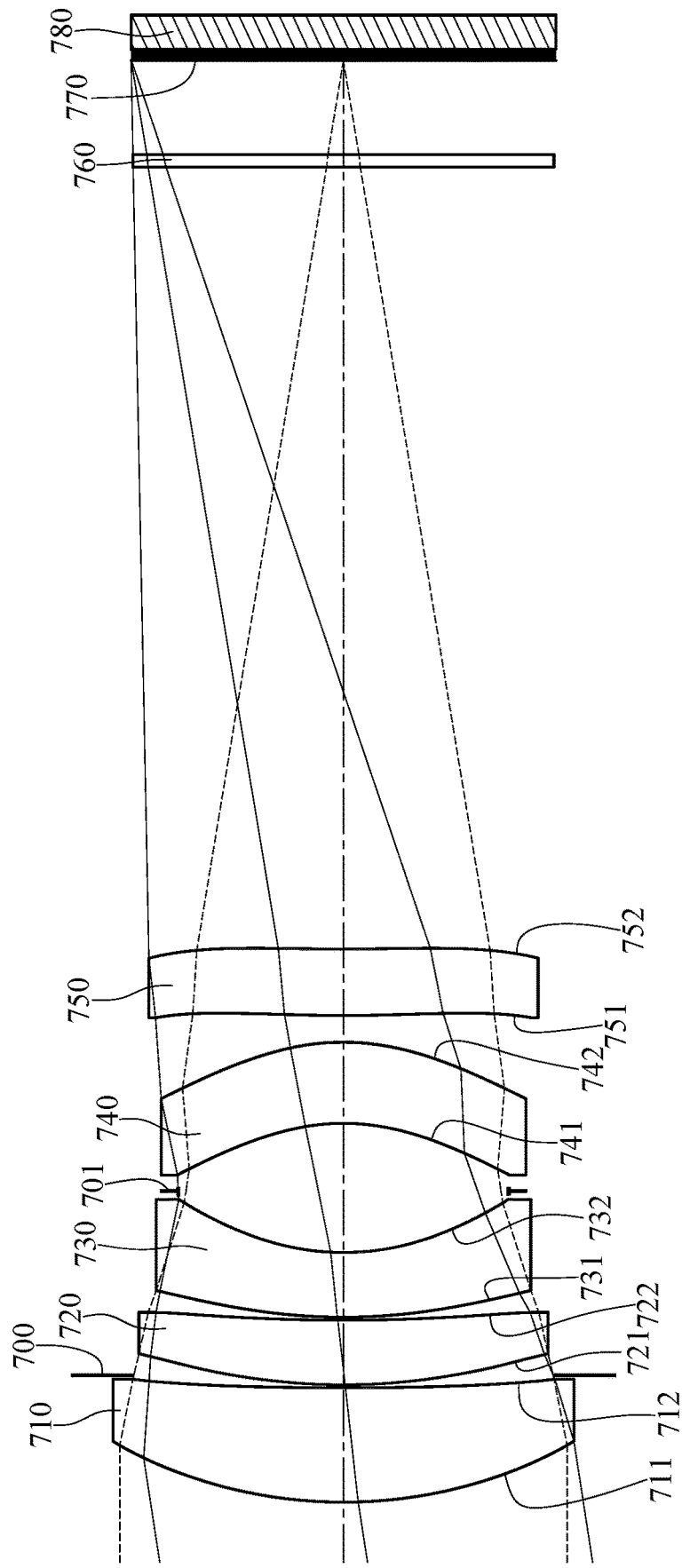
FIG. 13 is a schematic view of an image capturing unit according to the 7th embodiment of the present disclosure.
Figure 14:
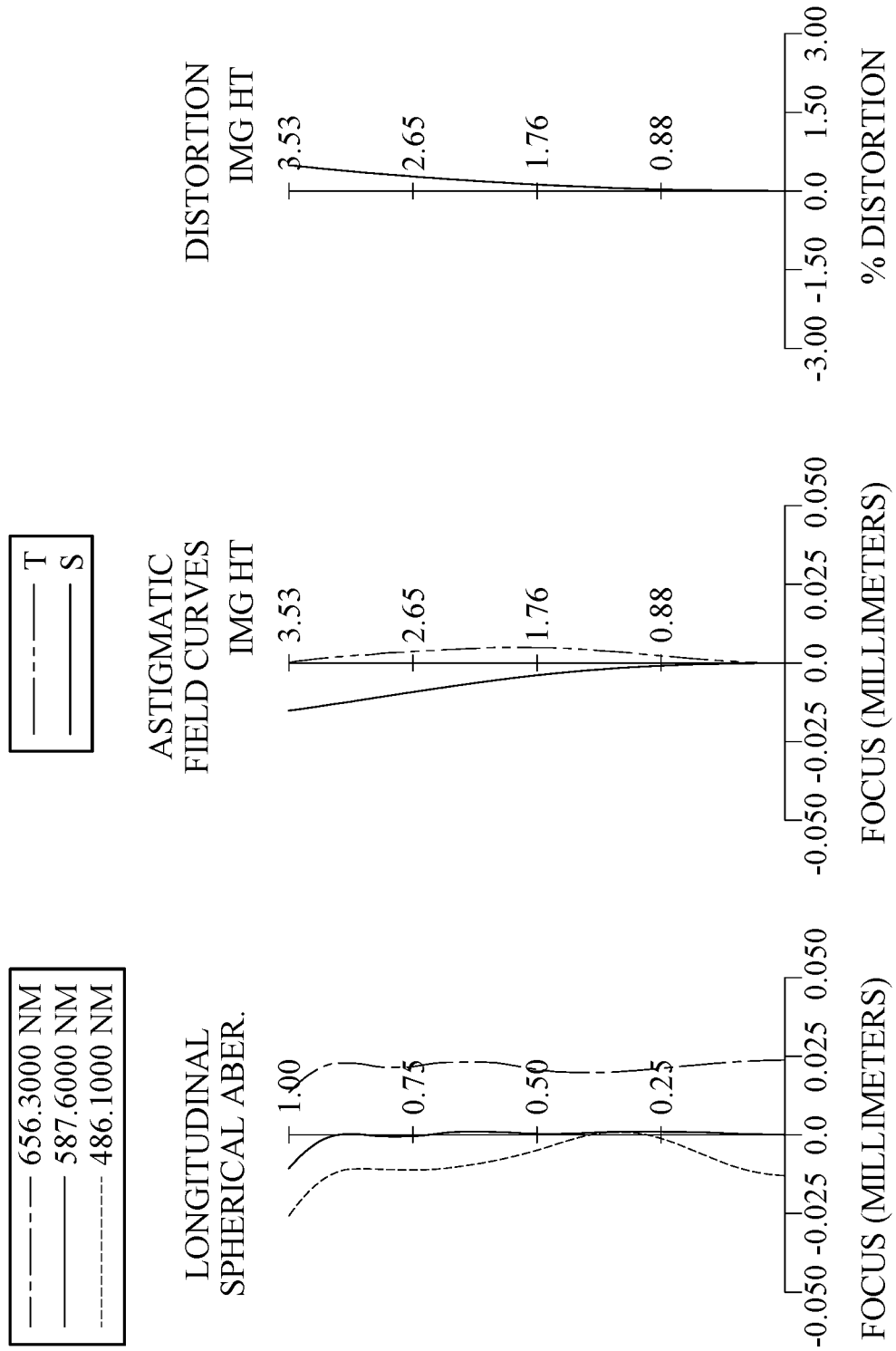
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the optical image lens assembly (its reference numeral is omitted) of the present disclosure and an image sensor 780. The optical image lens assembly includes, in order from an object side to an image side along an optical path, a first lens element 710, an aperture stop 700, a second lens element 720, a third lens element 730, a stop 701, a fourth lens element 740, a fifth lens element 750, a filter 760 and an image surface 770. The optical image lens assembly includes five lens elements (710, 720, 730, 740 and 750) with no additional lens element disposed between each of the adjacent five lens elements, wherein there is an air gap along an optical axis between each of all adjacent lens elements.

The first lens element 710 with positive refractive power has an object-side surface 711 being convex in a paraxial region thereof and an image-side surface 712 being concave in a paraxial region thereof. The first lens element 710 is made of plastic material and has the object-side surface 711 and the image-side surface 712 being both aspheric.

The second lens element 720 with positive refractive power has an object-side surface 721 being convex in a paraxial region thereof and an image-side surface 722 being concave in a paraxial region thereof. The second lens element 720 is made of plastic material and has the object-side surface 721 and the image-side surface 722 being both aspheric.

The third lens element 730 with negative refractive power has an object-side surface 731 being convex in a paraxial region thereof and an image-side surface 732 being concave in a paraxial region thereof. The third lens element 730 is made of plastic material and has the object-side surface 731 and the image-side surface 732 being both aspheric.

The fourth lens element 740 with positive refractive power has an object-side surface 741 being concave in a paraxial region thereof and an image-side surface 742 being convex in a paraxial region thereof. The fourth lens element 740 is made of plastic material and has the object-side surface 741 and the image-side surface 742 being both aspheric.

The fifth lens element 750 with positive refractive power has an object-side surface 751 being convex in a paraxial region thereof and an image-side surface 752 being concave in a paraxial region thereof. The fifth lens element 750 is made of plastic material and has the object-side surface 751 and the image-side surface 752 being both aspheric. The object-side surface 751 of the fifth lens element 750 has at least one inflection point. The image-side surface 752 of the fifth lens element 750 has at least one inflection point. The image-side surface 752 of the fifth lens element 750 has at least one convex shape in an off-axial region thereof.

The filter 760 is made of glass material and located between the fifth lens element 750 and the image surface 770, and will not affect the focal length of the optical image lens assembly. The image sensor 780 is disposed on or near the image surface 770 of the optical image lens assembly.

The detailed optical data of the 7th embodiment are shown in Table 13 and the aspheric surface data are shown in Table 14 below.

TABLE 13

7th Embodiment
f = 22.75 mm, Fno = 3.06, HFOV = 8.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 7.825 | (ASP) | 1.900 | Plastic | 1.545 | 56.1 | 15.96 |
| 2 | | 71.344 | (ASP) | 0.210 | | | | |
| 3 | Ape. Stop | Plano | | −0.160 | | | | |
| 4 | Lens 2 | 10.333 | (ASP) | 1.077 | Plastic | 1.544 | 56.0 | 29.86 |
| 5 | | 27.353 | (ASP) | 0.050 | | | | |
| 6 | Lens 3 | 9.672 | (ASP) | 1.071 | Plastic | 1.639 | 23.5 | −12.81 |
| 7 | | 4.241 | (ASP) | 1.025 | | | | |
| 8 | Stop | Plano | | 1.123 | | | | |
| 9 | Lens 4 | −3.628 | (ASP) | 1.350 | Plastic | 1.544 | 56.0 | 152.34 |
| 10 | | −3.931 | (ASP) | 0.445 | | | | |
| 11 | Lens 5 | 24.413 | (ASP) | 1.100 | Plastic | 1.660 | 20.4 | 129.16 |
| 12 | | 33.597 | (ASP) | 13.000 | | | | |
| 13 | Filter | Plano | | 0.210 | Glass | 1.517 | 64.2 | — |
| 14 | | Plano | | 1.563 | | | | |
| 15 | Image | Plano | | — | | | | |

Note:
Reference wavelength is 587.6 nm (d-line).
An effective radius of the stop 701 (Surface 8) is 2.745 mm.

TABLE 14

Aspheric Coefficients

| Surface # | 1 | 2 | 4 | 5 | 6 |
|---|---|---|---|---|---|
| k = | −3.8807E−01 | 0.0000E+00 | 0.0000E+00 | 0.0000E+00 | 0.0000E+00 |
| A4 = | −8.5438E−05 | −1.5856E−04 | −5.1948E−04 | −1.9101E−03 | −1.5774E−03 |
| A6 = | 4.3121E−05 | 2.3726E−04 | 3.9923E−06 | 5.4200E−05 | 6.7426E−04 |
| A8 = | −4.8752E−06 | −4.0210E−05 | 2.3191E−05 | −7.7373E−05 | −1.6814E−04 |
| A10 = | 3.1831E−07 | 3.0563E−06 | −4.3309E−06 | 5.3970E−06 | 1.8154E−05 |
| A12 = | −1.1102E−08 | −1.0675E−07 | 2.9184E−07 | −1.8205E−07 | −8.6942E−07 |
| A14 = | 2.9778E−10 | 1.6054E−09 | −7.6636E−09 | 1.1361E−09 | 1.4353E−08 |

| Surface # | 7 | 9 | 10 | 11 | 12 |
|---|---|---|---|---|---|
| k = | 0.0000E+00 | 0.0000E+00 | −2.5247E+00 | 0.0000E+00 | 0.0000E+00 |
| A4 = | −5.7337E−04 | 7.5788E−03 | −7.0393E−05 | −3.9724E−03 | −4.6918E−03 |
| A6 = | −5.6173E−05 | −4.4558E−04 | 8.2043E−05 | 4.6314E−04 | 4.8562E−04 |
| A8 = | −7.6940E−05 | 1.2394E−04 | 2.3272E−05 | −3.5766E−05 | −4.7434E−05 |
| A10 = | 1.0757E−05 | −1.8523E−05 | −6.8246E−06 | −2.4604E−06 | 1.5377E−06 |
| A12 = | −3.2489E−07 | 1.4494E−06 | 5.5045E−07 | 4.3558E−07 | 5.5010E−08 |
| A14 = | −1.1529E−08 | −3.6120E−08 | −1.2509E−08 | −1.4855E−08 | −3.4205E−09 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | |
|---|---|
| f [mm] | 22.75 |
| Fno | 3.06 |
| HFOV [deg.] | 8.8 |
| Vdmin | 20.4 |
| V5 | 20.4 |
| V2/V3 | 2.38 |
| V2/V5 | 2.75 |
| V4/V5 | 2.75 |

-continued

| 7th Embodiment | |
|---|---|
| CT3/CT5 | 0.97 |
| (T12 + T23 + T45)/T34 | 0.25 |
| (R6 + R7)/(R6 − R7) | 0.08 |
| (R7 − R8)/(R7 + R8) | −0.04 |
| f/f1 | 1.43 |
| f/f2 | 0.76 |
| f/f3 | −1.78 |
| f/f4 | 0.15 |
| f/f5 | 0.18 |
| f3/f2 | −0.43 |
| f4/f5 | 1.18 |
| f/EPD | 3.06 |
| BL/TD | 1.61 |
| BL/ImgH | 4.19 |
| f/ImgH | 6.45 |
| Y11/ImgH | 1.09 |
| EPD/Y11 | 1.94 |

-continued

7th Embodiment

| | |
|---|---|
| Ymax/Ymin | 1.40 |
| TL/f | 1.05 |

8th Embodiment

Figure 15:
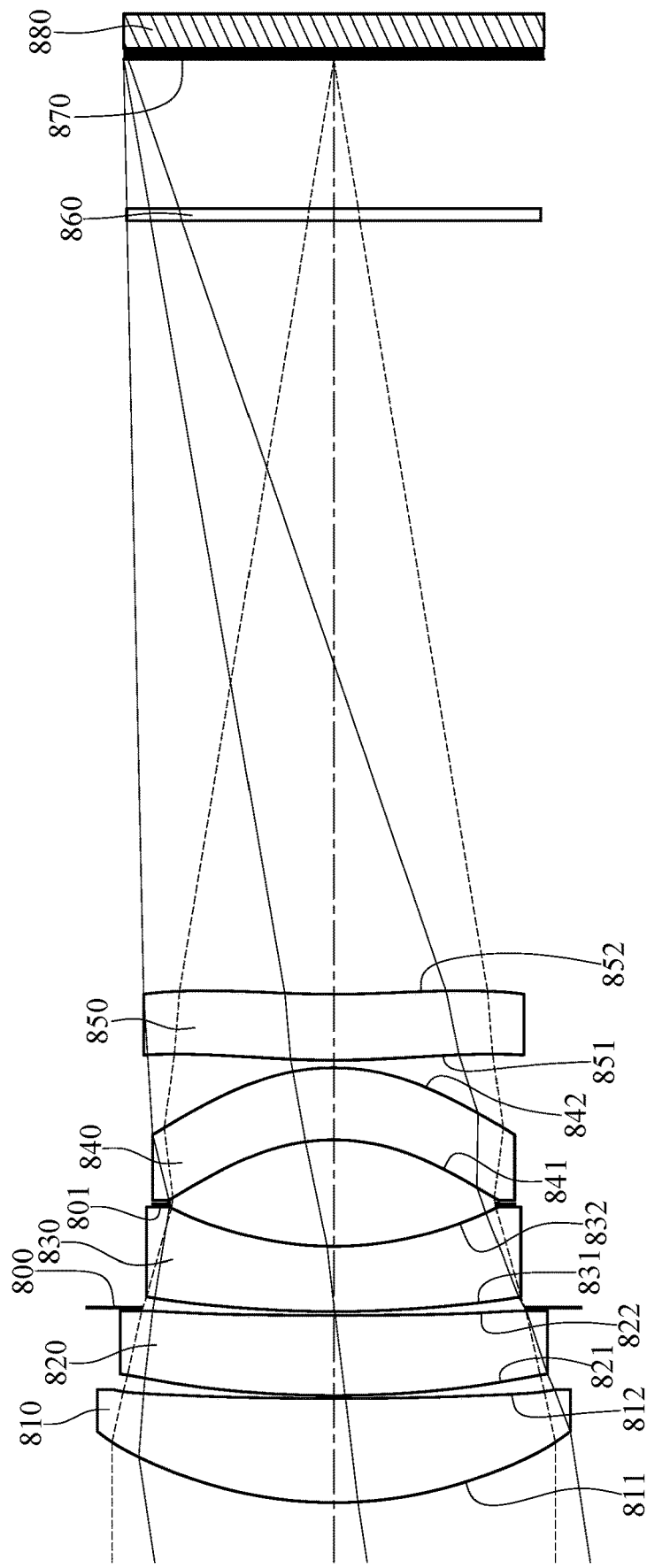
FIG. 15 is a schematic view of an image capturing unit according to the 8th embodiment of the present disclosure.
Figure 16:
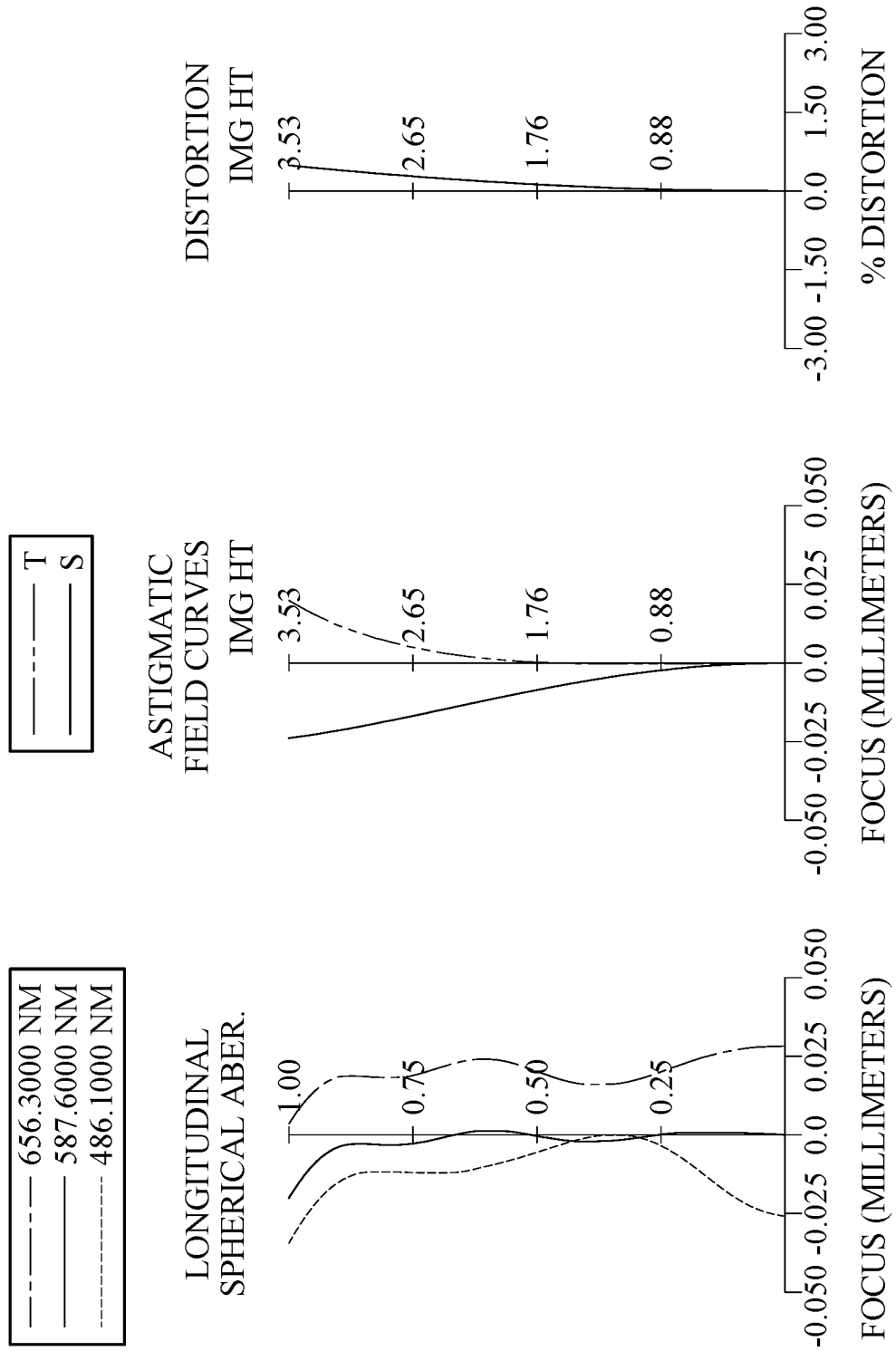
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the optical image lens assembly (its reference numeral is omitted) of the present disclosure and an image sensor 880. The optical image lens assembly includes, in order from an object side to an image side along an optical path, a first lens element 810, a second lens element 820, an aperture stop 800, a third lens element 830, a stop 801, a fourth lens element 840, a fifth lens element 850, a filter 860 and an image surface 870. The optical image lens assembly includes five lens elements (810, 820, 830, 840 and 850) with no additional lens element disposed between each of the adjacent five lens elements, wherein there is an air gap along an optical axis between each of all adjacent lens elements.

The first lens element 810 with positive refractive power has an object-side surface 811 being convex in a paraxial region thereof and an image-side surface 812 being concave in a paraxial region thereof. The first lens element 810 is made of plastic material and has the object-side surface 811 and the image-side surface 812 being both aspheric.

The second lens element 820 with positive refractive power has an object-side surface 821 being convex in a paraxial region thereof and an image-side surface 822 being concave in a paraxial region thereof. The second lens element 820 is made of plastic material and has the object-side surface 821 and the image-side surface 822 being both aspheric.

The third lens element 830 with negative refractive power has an object-side surface 831 being convex in a paraxial region thereof and an image-side surface 832 being concave in a paraxial region thereof. The third lens element 830 is made of plastic material and has the object-side surface 831 and the image-side surface 832 being both aspheric.

The fourth lens element 840 with positive refractive power has an object-side surface 841 being concave in a paraxial region thereof and an image-side surface 842 being convex in a paraxial region thereof. The fourth lens element 840 is made of plastic material and has the object-side surface 841 and the image-side surface 842 being both aspheric.

The fifth lens element 850 with positive refractive power has an object-side surface 851 being convex in a paraxial region thereof and an image-side surface 852 being concave in a paraxial region thereof. The fifth lens element 850 is made of plastic material and has the object-side surface 851 and the image-side surface 852 being both aspheric. The object-side surface 851 of the fifth lens element 850 has at least one inflection point. The image-side surface 852 of the fifth lens element 850 has at least one inflection point. The image-side surface 852 of the fifth lens element 850 has at least one convex shape in an off-axial region thereof.

The filter 860 is made of glass material and located between the fifth lens element 850 and the image surface 870, and will not affect the focal length of the optical image lens assembly. The image sensor 880 is disposed on or near the image surface 870 of the optical image lens assembly.

The detailed optical data of the 8th embodiment are shown in Table 15 and the aspheric surface data are shown in Table 16 below.

TABLE 15

8th Embodiment
f = 22.76 mm, Fno = 3.06, HFOV = 8.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 7.290 | (ASP) | 1.750 | Plastic | 1.545 | 56.1 | 15.02 |
| 2 | | 61.178 | (ASP) | 0.050 | | | | |
| 3 | Lens 2 | 16.748 | (ASP) | 1.351 | Plastic | 1.544 | 56.0 | 42.63 |
| 4 | | 58.554 | (ASP) | 0.130 | | | | |
| 5 | Ape. Stop | Plano | | −0.064 | | | | |
| 6 | Lens 3 | 17.042 | (ASP) | 1.087 | Plastic | 1.639 | 23.5 | −13.63 |
| 7 | | 5.620 | (ASP) | 0.710 | | | | |
| 8 | Stop | Plano | | 1.087 | | | | |
| 9 | Lens 4 | −3.342 | (ASP) | 1.213 | Plastic | 1.544 | 56.0 | 116.33 |
| 10 | | −3.581 | (ASP) | 0.127 | | | | |
| 11 | Lens 5 | 14.183 | (ASP) | 1.100 | Plastic | 1.660 | 20.4 | 114.78 |
| 12 | | 16.912 | (ASP) | 13.000 | | | | |
| 13 | Filter | Plano | | 0.210 | Glass | 1.517 | 64.2 | — |
| 14 | | Plano | | 2.514 | | | | |
| 15 | Image | Plano | | — | | | | |

Note:
Reference wavelength is 587.6 nm (d-line).
An effective radius of the stop 801 (Surface 8) is 2.760 mm.

TABLE 16

| Aspheric Coefficients | | | | | |
|---|---|---|---|---|---|
| Surface # | 1 | 2 | 3 | 4 | 6 |
| k = | −3.8967E−01 | 0.0000E+00 | 0.0000E+00 | 0.0000E+00 | 0.0000E+00 |
| A4 = | 1.0128E−04 | −6.4581E−04 | −1.0008E−03 | −3.9912E−03 | −5.0630E−03 |
| A6 = | 3.0904E−05 | 2.8794E−04 | 1.1705E−04 | 1.7678E−03 | 2.3997E−03 |
| A8 = | −9.9111E−06 | −4.4137E−05 | 3.1314E−05 | −3.4422E−04 | −5.5264E−04 |
| A10 = | 1.0662E−06 | 2.7463E−06 | −7.3732E−06 | 3.5950E−05 | 6.5092E−05 |
| A12 = | −5.9582E−08 | −6.3447E−08 | 5.3894E−07 | −1.9462E−06 | −3.7840E−06 |
| A14 = | 1.6836E−09 | 7.7039E−10 | −1.3878E−08 | 4.1653E−08 | 8.6597E−08 |
| Surface # | 7 | 9 | 10 | 11 | 12 |
| k = | 0.0000E+00 | 0.0000E+00 | −1.8754E+00 | 0.0000E+00 | 0.0000E+00 |
| A4 = | −3.7069E−03 | 2.2329E−03 | −2.7778E−03 | −4.0856E−03 | −4.2848E−03 |
| A6 = | 1.3480E−03 | 1.2619E−03 | 6.0994E−04 | 4.4433E−05 | −1.8802E−06 |
| A8 = | −3.3353E−04 | −1.6482E−04 | −3.8260E−05 | 5.9328E−05 | 6.0294E−05 |
| A10 = | 4.3475E−05 | 1.8702E−05 | −3.4376E−07 | −9.6862E−06 | −8.6675E−06 |
| A12 = | −2.7010E−06 | −1.3549E−06 | 1.1874E−07 | 6.0453E−07 | 5.1185E−07 |
| A14 = | 6.3462E−08 | 6.1907E−08 | −2.3659E−09 | −1.3530E−08 | −1.1243E−08 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | |
|---|---|
| f [mm] | 22.76 |
| Fno | 3.06 |
| HFOV [deg.] | 8.8 |
| Vdmin | 20.4 |
| V5 | 20.4 |
| V2/V3 | 2.38 |
| V2/V5 | 2.75 |
| V4/V5 | 2.75 |
| CT3/CT5 | 0.99 |
| (T12 + T23 + T45)/T34 | 0.14 |
| (R6 + R7)/(R6 − R7) | 0.25 |
| (R7 − R8)/(R7 + R8) | −0.03 |
| f/f1 | 1.52 |
| f/f2 | 0.53 |
| f/f3 | −1.67 |
| f/f4 | 0.20 |
| f/f5 | 0.20 |
| f3/f2 | −0.32 |
| f4/f5 | 1.01 |
| f/EPD | 3.06 |
| BL/TD | 1.84 |
| BL/ImgH | 4.46 |
| f/ImgH | 6.45 |
| Y11/ImgH | 1.12 |
| EPD/Y11 | 1.87 |
| Ymax/Ymin | 1.44 |
| TL/f | 1.07 |

9th Embodiment

Figure 17:
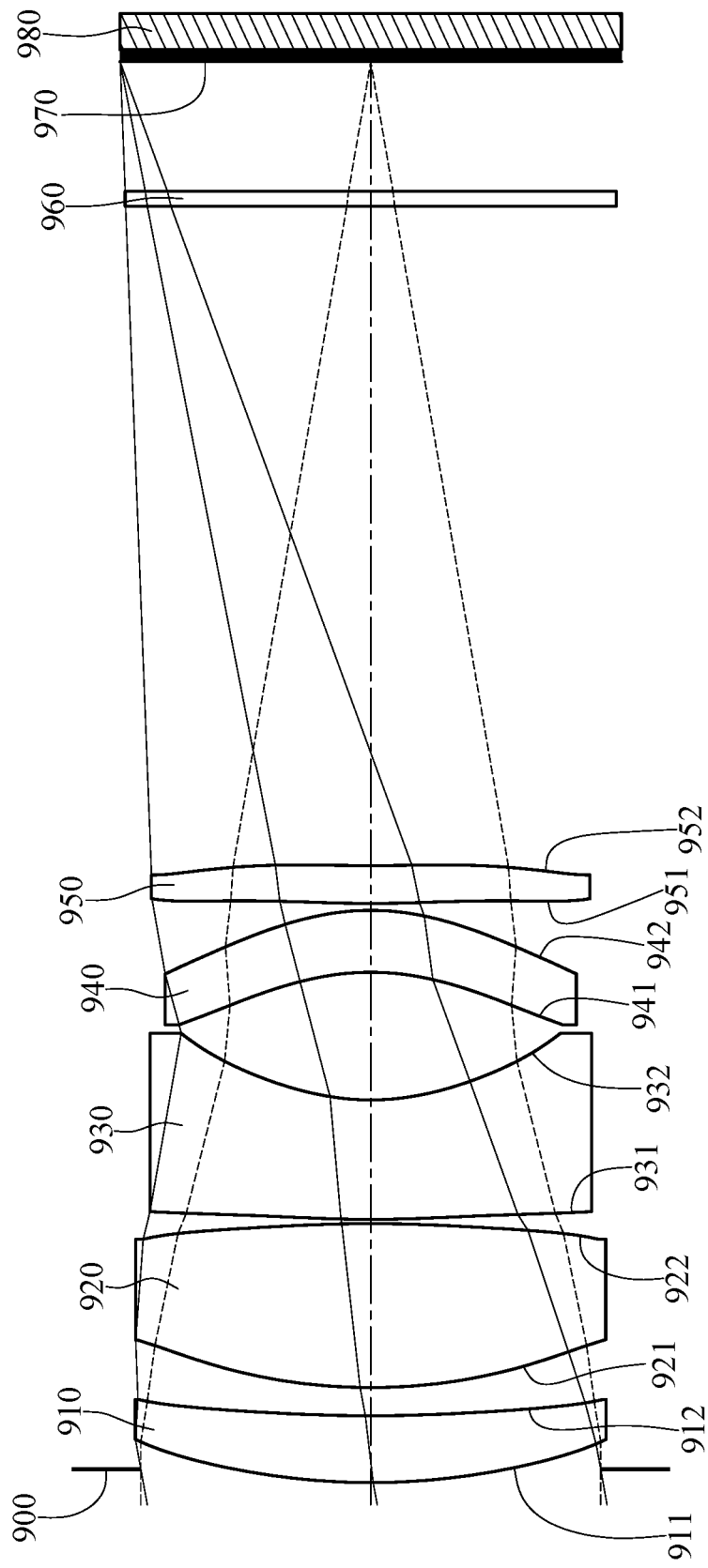
FIG. 17 is a schematic view of an image capturing unit according to the 9th embodiment of the present disclosure.
Figure 18:
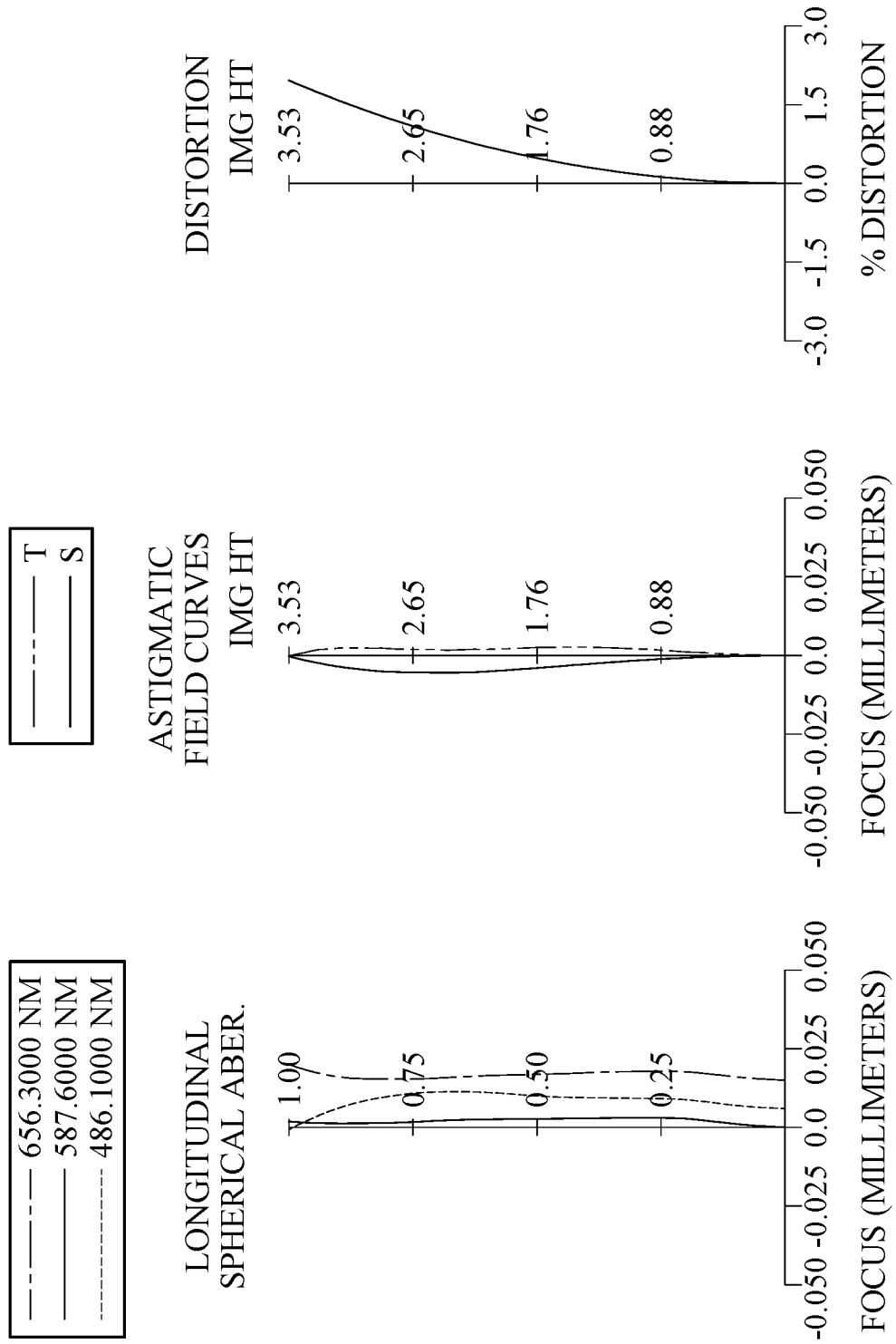
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit includes the optical image lens assembly (its reference numeral is omitted) of the present disclosure and an image sensor 980. The optical image lens assembly includes, in order from an object side to an image side along an optical path, an aperture stop 900, a first lens element 910, a second lens element 920, a third lens element 930, a fourth lens element 940, a fifth lens element 950, a filter 960 and an image surface 970. The optical image lens assembly includes five lens elements (910, 920, 930, 940 and 950) with no additional lens element disposed between each of the adjacent five lens elements, wherein there is an air gap along an optical axis between each of all adjacent lens elements.

The first lens element 910 with positive refractive power has an object-side surface 911 being convex in a paraxial region thereof and an image-side surface 912 being concave in a paraxial region thereof. The first lens element 910 is made of glass material and has the object-side surface 911 and the image-side surface 912 being both aspheric.

The second lens element 920 with positive refractive power has an object-side surface 921 being convex in a paraxial region thereof and an image-side surface 922 being convex in a paraxial region thereof. The second lens element 920 is made of plastic material and has the object-side surface 921 and the image-side surface 922 being both aspheric.

The third lens element 930 with negative refractive power has an object-side surface 931 being convex in a paraxial region thereof and an image-side surface 932 being concave in a paraxial region thereof. The third lens element 930 is made of plastic material and has the object-side surface 931 and the image-side surface 932 being both aspheric. The object-side surface 931 of the third lens element 930 has at least one inflection point.

The fourth lens element 940 with positive refractive power has an object-side surface 941 being concave in a paraxial region thereof and an image-side surface 942 being convex in a paraxial region thereof. The fourth lens element 940 is made of plastic material and has the object-side surface 941 and the image-side surface 942 being both aspheric.

The fifth lens element 950 with positive refractive power has an object-side surface 951 being convex in a paraxial region thereof and an image-side surface 952 being concave in a paraxial region thereof. The fifth lens element 950 is made of plastic material and has the object-side surface 951 and the image-side surface 952 being both aspheric. The object-side surface 951 of the fifth lens element 950 has at least one inflection point. The image-side surface 952 of the fifth lens element 950 has at least one inflection point. The image-side surface 952 of the fifth lens element 950 has at least one convex shape in an off-axial region thereof.

The filter 960 is made of glass material and located between the fifth lens element 950 and the image surface 970, and will not affect the focal length of the optical image lens assembly. The image sensor 980 is disposed on or near the image surface 970 of the optical image lens assembly.

The detailed optical data of the 9th embodiment are shown in Table 17 and the aspheric surface data are shown in Table 18 below.

TABLE 17

9th Embodiment
f = 19.09 mm, Fno = 2.95, HFOV = 10.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.190 | | | | |
| 2 | Lens 1 | 9.355 | (ASP) | 0.943 | Glass | 1.548 | 45.8 | 29.76 |
| 3 | | 21.151 | (ASP) | 0.398 | | | | |
| 4 | Lens 2 | 8.093 | (ASP) | 2.311 | Plastic | 1.544 | 56.0 | 10.54 |
| 5 | | −17.692 | (ASP) | 0.060 | | | | |
| 6 | Lens 3 | 16.803 | (ASP) | 1.683 | Plastic | 1.639 | 23.5 | −7.04 |
| 7 | | 3.410 | (ASP) | 1.801 | | | | |
| 8 | Lens 4 | −3.553 | (ASP) | 0.872 | Plastic | 1.544 | 56.0 | 56.33 |
| 9 | | −3.459 | (ASP) | 0.097 | | | | |
| 10 | Lens 5 | 16.442 | (ASP) | 0.534 | Plastic | 1.730 | 16.0 | 50.64 |
| 11 | | 29.207 | (ASP) | 9.295 | | | | |
| 12 | Filter | Plano | | 0.210 | Glass | 1.517 | 64.2 | — |
| 13 | | Plano | | 1.829 | | | | |
| 14 | Image | Plano | | — | | | | |

Note:
Reference wavelength is 587.6 nm (d-line).

TABLE 18

Aspheric Coefficients

| Surface # | 2 | 3 | 4 | 5 | 6 |
|---|---|---|---|---|---|
| k = | −9.8296E−01 | −4.1039E+01 | −7.0280E−01 | −9.2123E+01 | −5.0000E+01 |
| A4 = | −6.9035E−04 | −6.5006E−04 | 1.1136E−03 | 1.8360E−03 | −2.9241E−03 |
| A6 = | 6.5936E−05 | −3.6184E−05 | −2.1773E−04 | −5.2540E−04 | 1.1232E−04 |
| A8 = | −5.0275E−06 | 2.2985E−05 | 3.7036E−05 | 7.7166E−05 | −3.8454E−06 |
| A10 = | 1.4895E−06 | −1.4284E−06 | −3.5650E−06 | −5.2844E−06 | 6.8930E−06 |
| A12 = | −1.4240E−07 | −2.9182E−08 | 9.7656E−08 | −2.3164E−08 | −9.6200E−07 |
| A14 = | 5.4690E−09 | 5.0085E−09 | 1.6992E−10 | 1.0090E−08 | 3.7968E−08 |

| Surface # | 7 | 8 | 9 | 10 | 11 |
|---|---|---|---|---|---|
| k = | −8.4160E−01 | −1.4182E−01 | −2.5949E+00 | 1.9827E+01 | −7.0082E+00 |
| A4 = | −9.1710E−03 | 9.2451E−03 | 1.0420E−03 | −9.6140E−03 | −1.0404E−02 |
| A6 = | 1.7613E−03 | −2.1888E−04 | 1.8940E−04 | 1.2069E−03 | 1.5608E−03 |
| A8 = | −3.4776E−04 | −1.2660E−04 | −1.0640E−04 | −6.3863E−05 | −1.5623E−04 |
| A10 = | 6.1773E−05 | 5.3977E−05 | 3.0511E−05 | −6.9703E−06 | 8.3812E−06 |
| A12 = | −5.1586E−06 | −6.7663E−06 | −3.7284E−06 | 1.2386E−06 | −6.1185E−08 |
| A14 = | 1.4323E−07 | 2.8671E−07 | 1.5836E−07 | −4.7336E−08 | −3.3248E−09 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | |
|---|---|
| f [mm] | 19.09 |
| Fno | 2.95 |
| HFOV [deg.] | 10.3 |
| Vdmin | 16.0 |
| V5 | 16.0 |
| V2/V3 | 2.38 |
| V2/V5 | 3.50 |
| V4/V5 | 3.50 |
| CT3/CT5 | 3.15 |
| (T12 + T23 + T45)/T34 | 0.31 |
| (R6 + R7)/(R6 − R7) | −0.02 |
| (R7 − R8)/(R7 + R8) | 0.01 |
| f/f1 | 0.64 |
| f/f2 | 1.81 |
| f/f3 | −2.71 |
| f/f4 | 0.34 |
| f/f5 | 0.38 |
| f3/f2 | −0.67 |
| f4/f5 | 1.11 |
| f/EPD | 2.95 |
| BL/TD | 1.30 |
| BL/ImgH | 3.21 |
| f/ImgH | 5.41 |
| Y11/ImgH | 0.94 |
| EPD/Y11 | 1.95 |
| Ymax/Ymin | 1.24 |
| TL/f | 1.05 |

10th Embodiment

Figure 19:
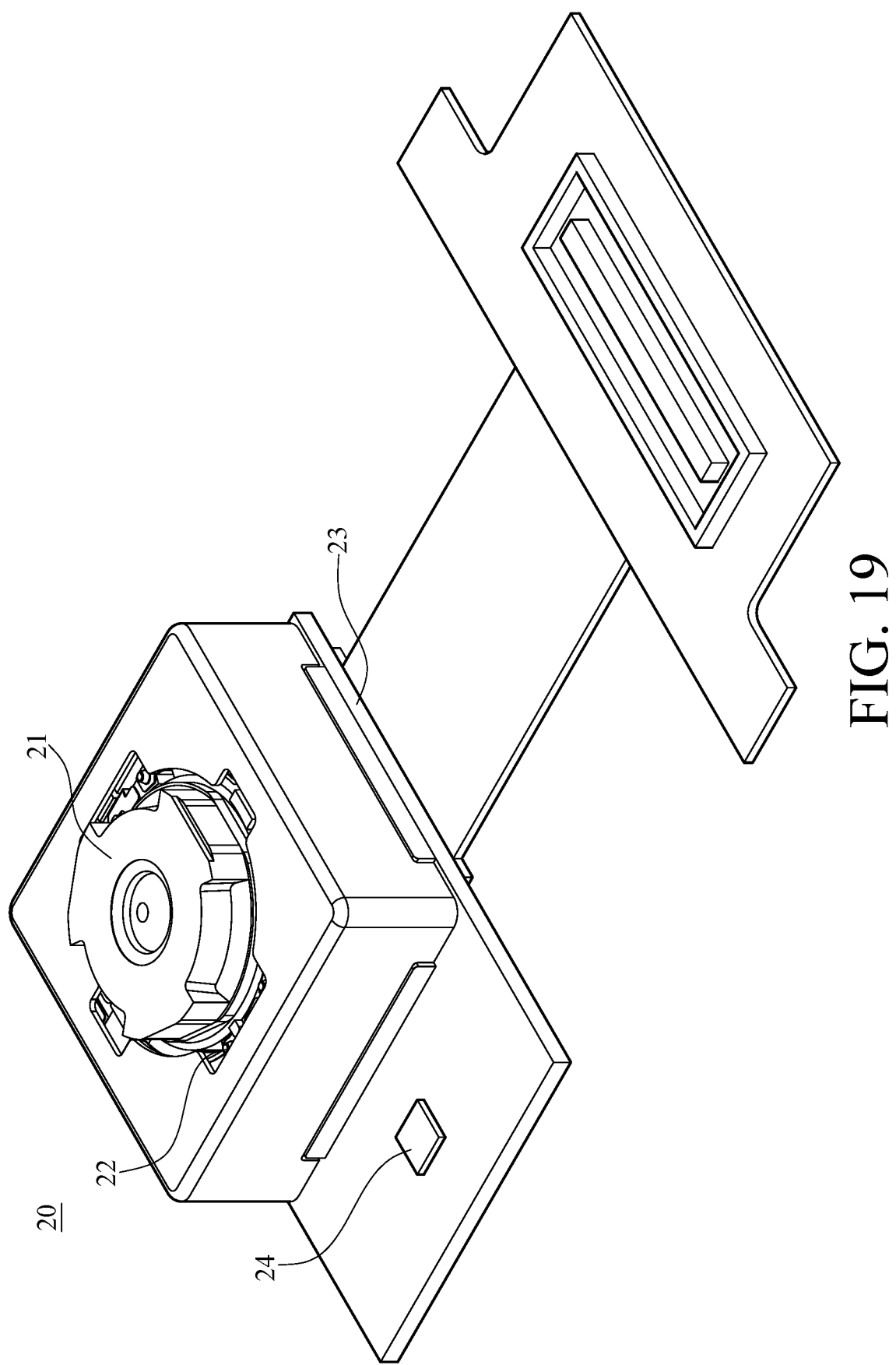
FIG. 19 is a perspective view of an image capturing unit according to the 10th embodiment of the present disclosure.

FIG. 19 is a perspective view of an image capturing unit according to the 10th embodiment of the present disclosure. In this embodiment, an image capturing unit 20 is a camera module including a lens unit 21, a driving device 22, an image sensor 23 and an image stabilizer 24. The lens unit 21 includes the optical image lens assembly disclosed in the 5th embodiment, a barrel and a holder member (their reference numerals are omitted) for holding the optical image lens assembly. However, the lens unit 21 may alternatively be provided with the optical image lens assembly disclosed in other abovementioned embodiments, and the present disclosure is not limited thereto. The imaging light converges in the lens unit 21 of the image capturing unit 20 to generate an image with the driving device 22 utilized for image focusing on the image sensor 23, and the generated image is then digitally transmitted to other electronic component for further processing.

The driving device 22 can have auto focusing functionality, and different driving configurations can be obtained through the usages of voice coil motors (VCM), micro electro-mechanical systems (MEMS), piezoelectric systems, or shape memory alloy materials. The driving device 22 is favorable for obtaining a better imaging position of the lens unit 21, so that a clear image of the imaged object can be captured by the lens unit 21 with different object distances. The image sensor 23 (for example, CCD or CMOS), which can feature high photosensitivity and low noise, is disposed on the image surface of the optical image lens assembly to provide higher image quality.

The image stabilizer 24, such as an accelerometer, a gyro sensor and a Hall Effect sensor, is configured to work with the driving device 22 to provide optical image stabilization (OIS). The driving device 22 working with the image stabilizer 24 is favorable for compensating for pan and tilt of the lens unit 21 to reduce blurring associated with motion during exposure. In some cases, the compensation can be provided by electronic image stabilization (EIS) with image processing software, thereby improving image quality while in motion or low-light conditions.

11th Embodiment

Figure 20:
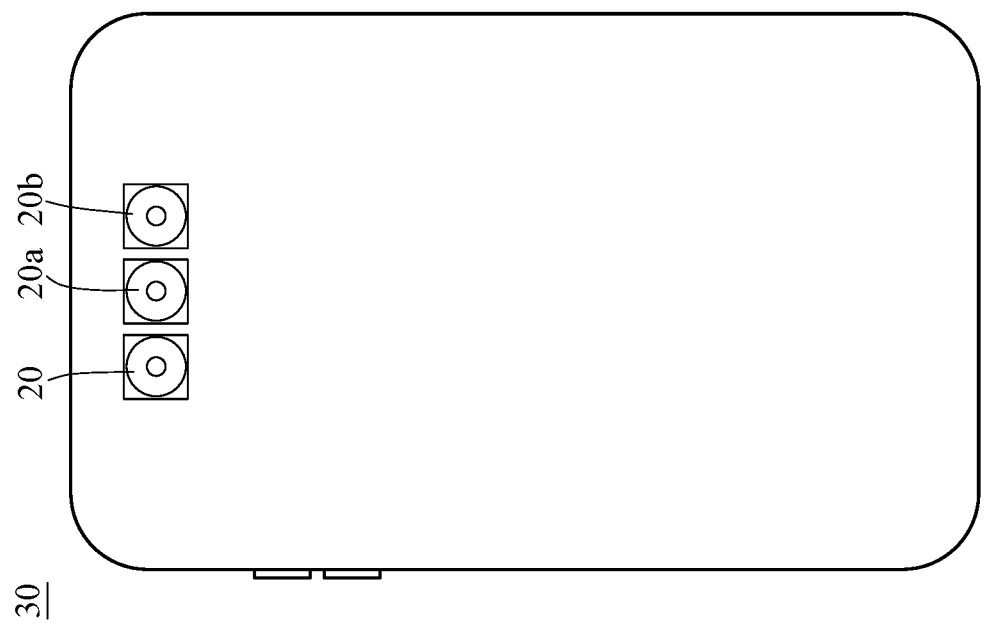
FIG. 20 is one perspective view of an electronic device according to the 11th embodiment of the present disclosure.
Figure 21:
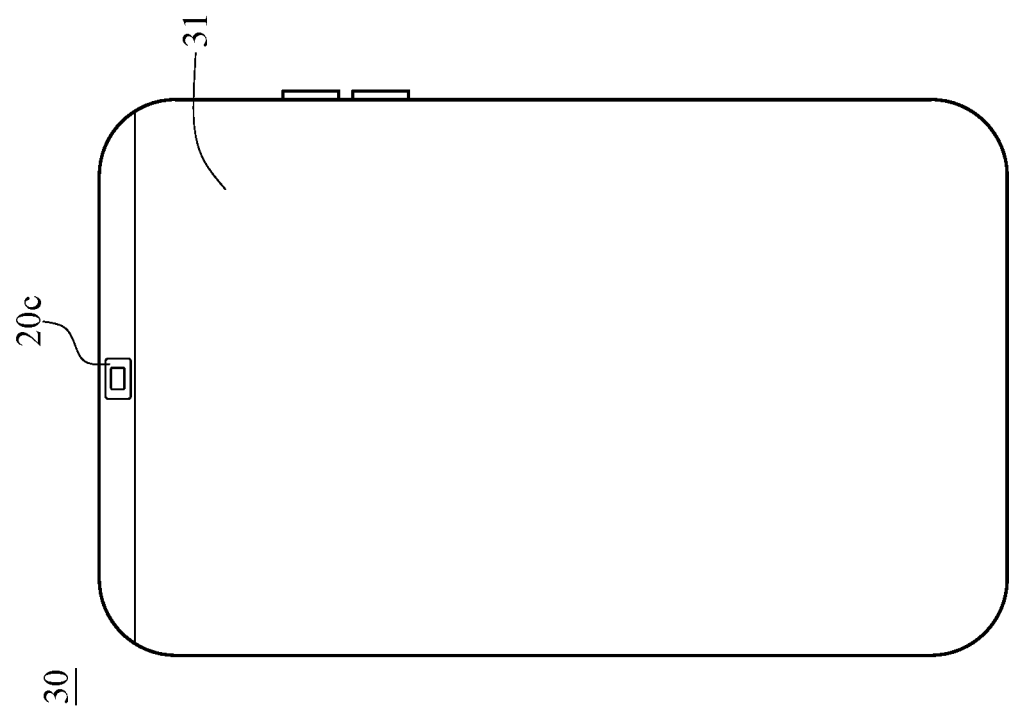
FIG. 21 is another perspective view of the electronic device in FIG. 20.

FIG. 20 is one perspective view of an electronic device according to the 11th embodiment of the present disclosure. FIG. 21 is another perspective view of the electronic device in FIG. 20.

In this embodiment, an electronic device 30 is a smartphone including the image capturing unit 20 disclosed in the 10th embodiment, an image capturing unit 20a, an image capturing unit 20b, an image capturing unit 20c and a display unit 31. As shown in FIG. 20, the image capturing unit 20, the image capturing unit 20a and the image capturing unit 20b are disposed on the same side of the electronic device 30 and face the same side, and each of the image capturing units 20, 20a and 20b has a single focal point. As shown in FIG. 21, the image capturing unit 20c and the display unit 31 are disposed on the opposite side of the electronic device 30, such that the image capturing unit 20c can be a front-facing camera of the electronic device 30 for taking selfies, but the present disclosure is not limited thereto. Furthermore, each of the image capturing units 20a, 20b and 20c can include the optical image lens assembly of the present disclosure and can have a configuration similar to that of the image capturing unit 20. In detail, each of the image capturing units 20a, 20b and 20c can include a lens unit, a driving device, an image sensor and an image stabilizer, and each of the lens unit can include an optical lens assembly such as the optical image lens assembly of the present disclosure, a barrel and a holder member for holding the optical lens assembly.

The image capturing unit 20 is a telephoto image capturing unit, the image capturing unit 20a is a wide-angle image capturing unit, the image capturing unit 20b is an ultra-wide-angle image capturing unit, and the image capturing unit 20c is a wide-angle image capturing unit. In this embodiment, the image capturing units 20, 20a and 20b have different fields of view, such that the electronic device 30 can have various magnification ratios so as to meet the requirement of optical zoom functionality. Moreover, a maximum field of view of the image capturing unit 20 and a maximum field of view of the image capturing unit 20a can differ by at least 35 degrees. Therefore, it is favorable for providing the electronic device 30 with different image capturing ranges, such that the electronic device 30 can perform zoom photographing, thereby increasing the application ranges. Moreover, the maximum field of view of the image capturing unit 20 and the maximum field of view of the image capturing unit 20a can also differ by at least 45 degrees. In this embodiment, the electronic device 30 includes multiple image capturing units 20, 20a, 20b and 20c, but the present disclosure is not limited to the number and arrangement of image capturing units.

12th Embodiment

Figure 22:
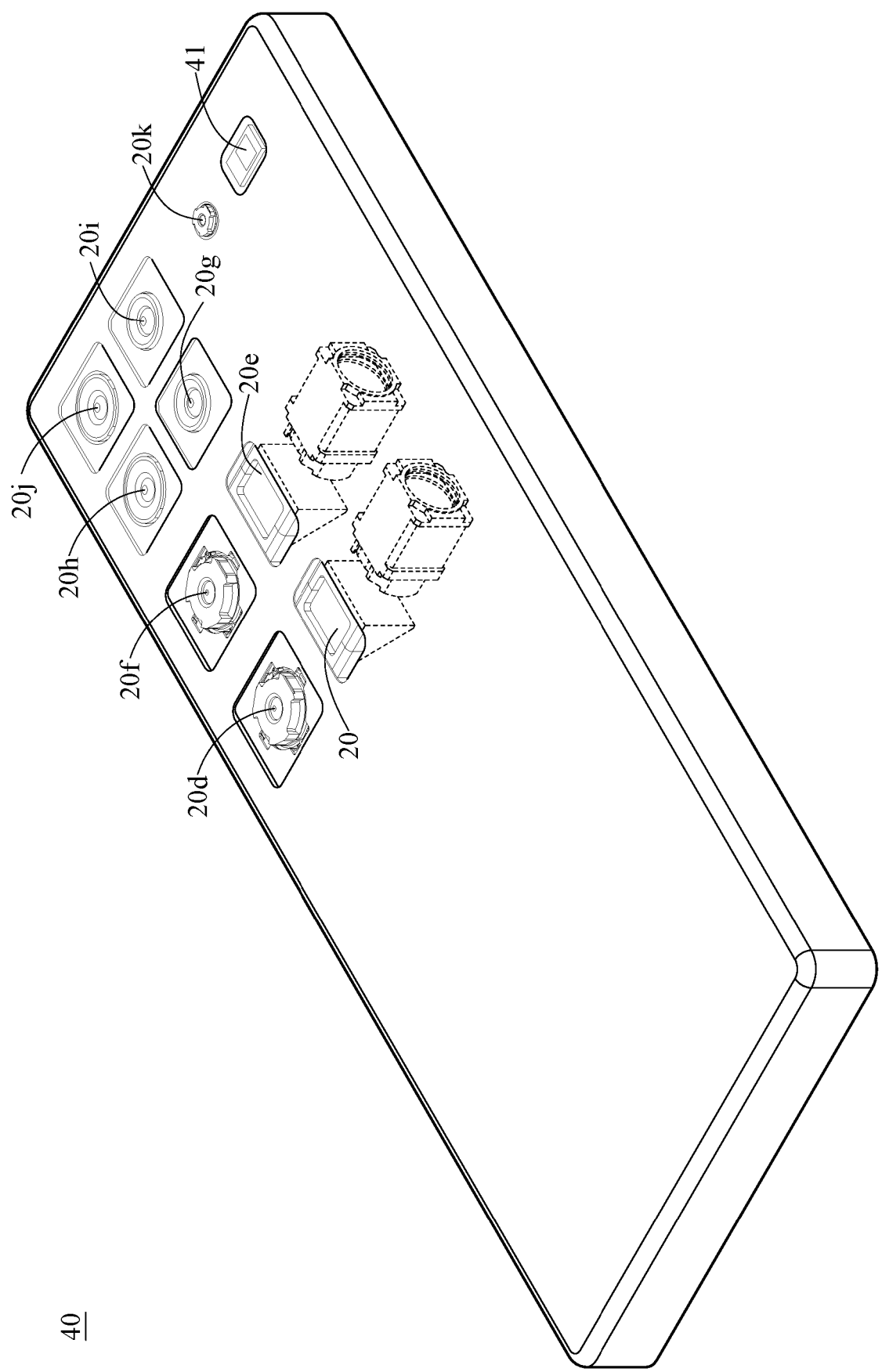
FIG. 22 is one perspective view of an electronic device according to the 12th embodiment of the present disclosure.
Figure 23:
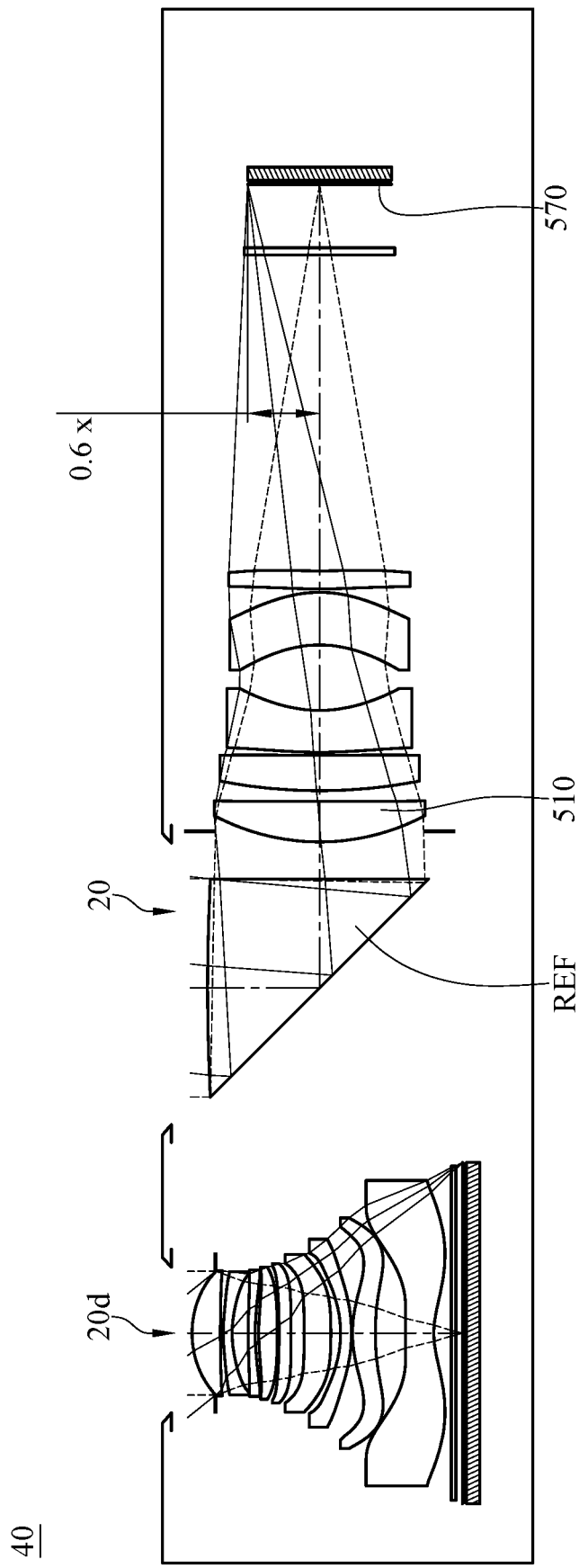
FIG. 23 shows a schematic view of a configuration of a reflective element in an optical image lens assembly of an electronic device in FIG. 22.
Figure 24:
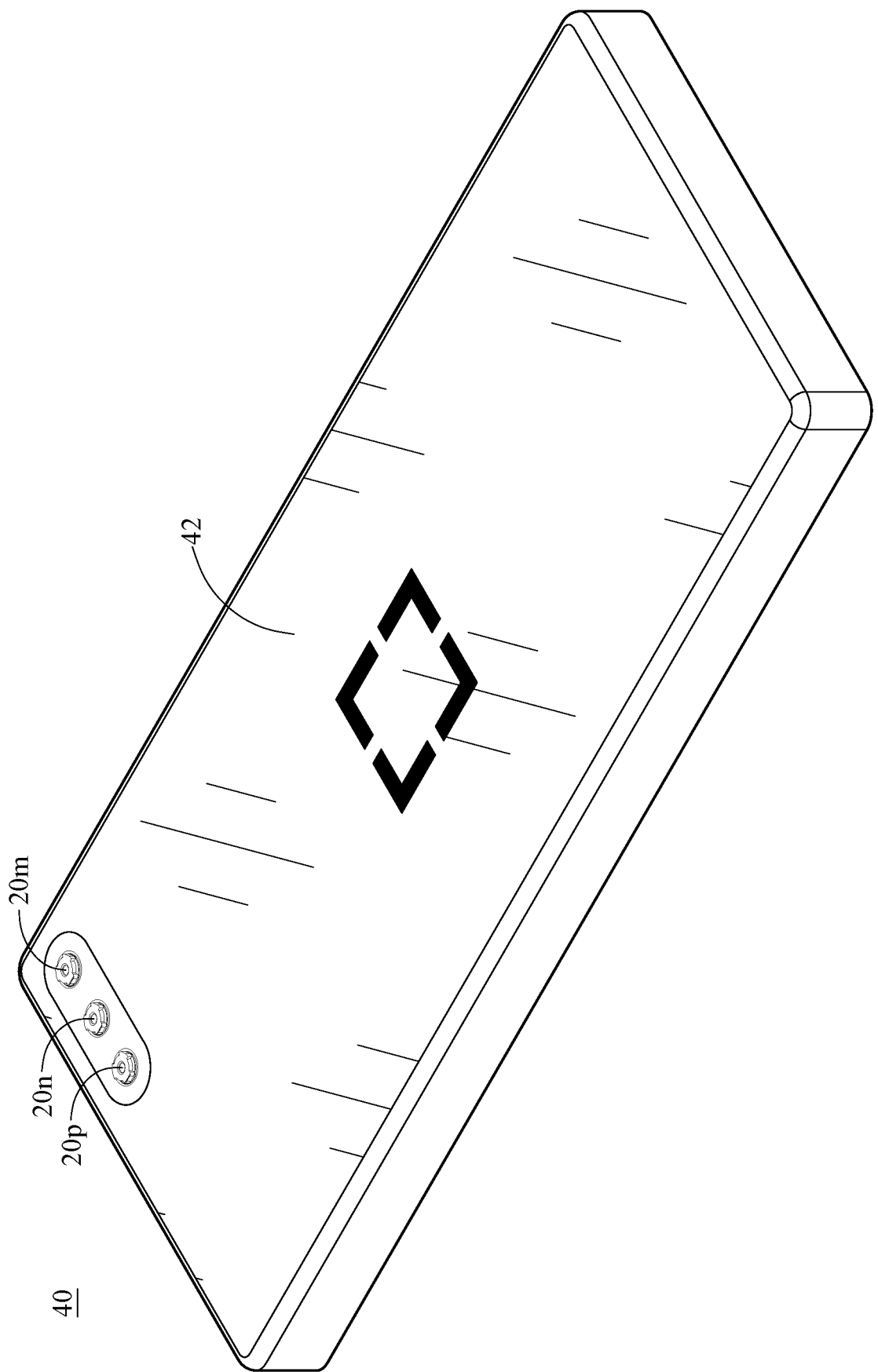
FIG. 24 is another perspective view of the electronic device in FIG. 22.

FIG. 22 is one perspective view of an electronic device according to the 12th embodiment of the present disclosure. FIG. 23 shows a schematic view of a configuration of a reflective element in an optical image lens assembly of an electronic device in FIG. 22. FIG. 24 is another perspective view of the electronic device in FIG. 22.

In this embodiment, an electronic device 40 is a smartphone including the image capturing unit 20 disclosed in the 10th embodiment, an image capturing unit 20d, an image capturing unit 20e, an image capturing unit 20f, an image capturing unit 20g, an image capturing unit 20h, an image capturing unit 20i, an image capturing unit 20j, an image capturing unit 20k, an image capturing unit 20m, an image capturing unit 20n, an image capturing unit 20p, a flash module 41 and a display unit 42. The image capturing unit 20, 20d, 20e, 20f, 20g, 20h, 20i, 20j and 20k are disposed on the same side of the electronic device 40 and face the same side, while the image capturing units 20m, 20n and 20p and the display unit 42 are disposed on the opposite side of the electronic device 40, such that the image capturing units 20m, 20n and 20p can be front-facing cameras of the electronic device 40 for taking selfies, but the present disclosure is not limited thereto. Furthermore, each of the image capturing units 20d, 20e, 20f, 20g, 20h, 20i, 20j, 20k, 20m, 20n and 20p can include the optical image lens assembly of the present disclosure and can have a configuration similar to that of the image capturing units 20a, 20b and 20c, so the details in this regard will not be provided again.

The image capturing unit 20 is a telephoto image capturing unit (with a folded optical path configuration), the image capturing unit 20d is a wide-angle image capturing unit, the image capturing unit 20e is a telephoto image capturing unit, the image capturing unit 20f is a wide-angle image capturing unit, the image capturing unit 20g is a telephoto image capturing unit, the image capturing unit 20h is an ultra-wide-angle image capturing unit, the image capturing unit 20i is a telephoto image capturing unit, the image capturing unit 20j is an ultra-wide-angle image capturing unit, the image capturing unit 20k is a ToF (time of flight) image capturing unit, the image capturing unit 20m is a wide-angle image capturing unit, the image capturing unit 20n is an ultra-wide-angle image capturing unit, and the image capturing unit 20p is a ToF image capturing unit. In this embodiment, the image capturing units 20, 20d, 20e, 20f, 20g, 20h, 20i, 20j, 20m and 20n have different fields of view, such that the electronic device 40 can have various magnification ratios so as to meet the requirement of optical zoom functionality. Moreover, a maximum field of view of the image capturing unit 20 and a maximum field of view of the image capturing unit 20d can differ by at least 35 degrees. Therefore, it is favorable for providing the electronic device 40 with different image capturing ranges, such that the electronic device 40 can perform zoom photographing, thereby increasing the application ranges. Moreover, the maximum field of view of the image capturing unit 20 and the maximum field of view of the image capturing unit 20d can also differ by at least 45 degrees.

Figure 27:
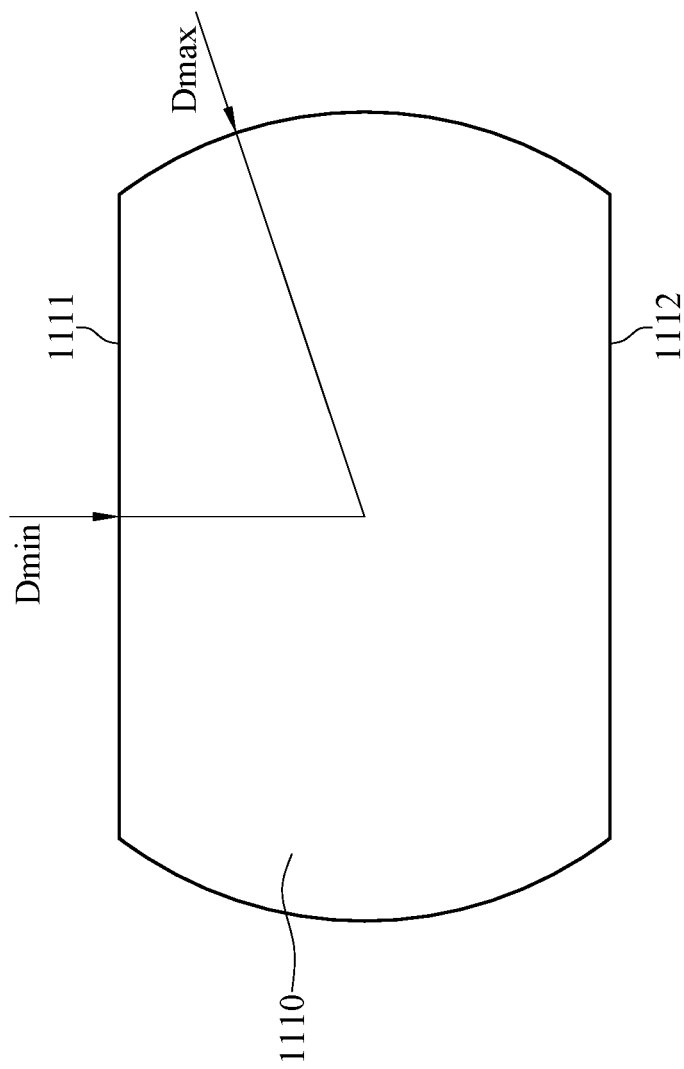
FIG. 27 shows a schematic view of a single lens element of an image capturing unit according to one embodiment of the present disclosure.

In this embodiment, the first lens element 510 of the optical image lens assembly of the image capturing unit 20 can be replaced by the first lens element 1110 shown in FIG. 27, but the present disclosure is not limited thereto. Each of all lens elements of the image capturing unit 20 can be replaced to have an appearance similar to that of the first lens element 1110. As shown in FIG. 27, the first lens element 1110 has two straight edges 1111 and 1112 at its outermost positions, such that the first lens element 1110 is a non-circular lens element while having non-circular maximum effective radii on an object-side surface and an image-side surface thereof, and distances between the center to outer edges of the first lens element 1110 would be different. Specifically, when a minimum distance from the center to the outer edge of the first lens element 1110 is Dmin, and a maximum distance from the center to the outer edge of the first lens element 1110 is Dmax, the following condition is satisfied: Dmin/Dmax<0.80. Therefore, it is favorable for reducing the size of the image capturing unit 20 in the direction parallel to Dmin so as to reduce the thickness of the electronic device 40. Furthermore, since the dimension of the first lens element 1110 in the direction parallel to Dmin is reduced, the maximum image height on the image surface 570, as shown in FIG. 23, is changed to 0.6 times (0.6×) the original.

Figure 28:
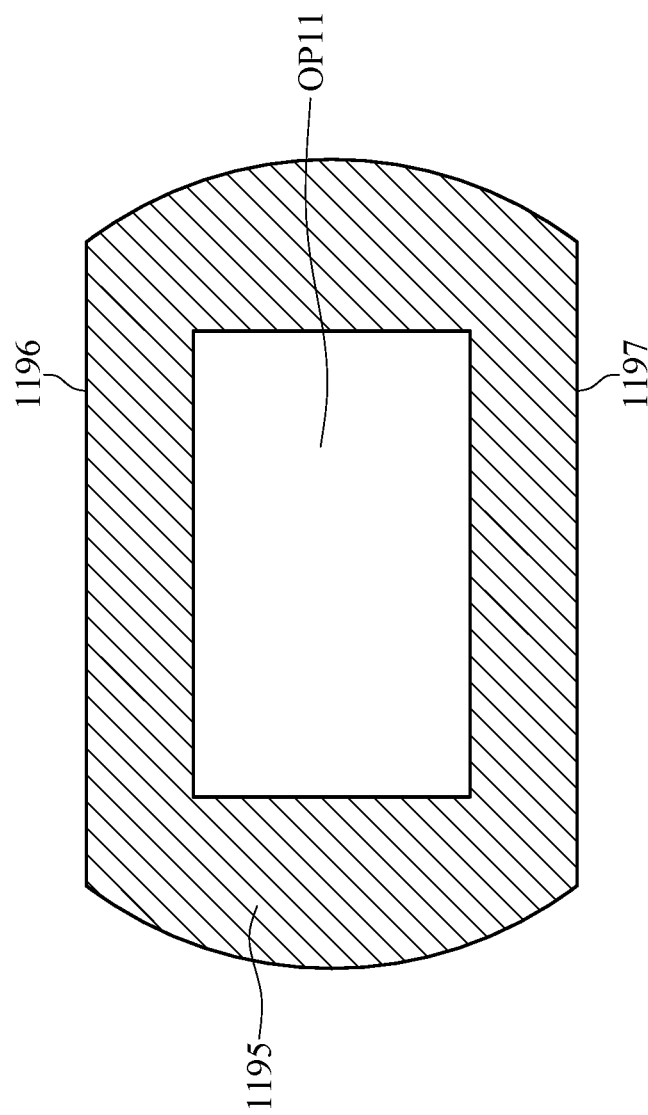
FIG. 28 shows a schematic view of a light-blocking element of an image capturing unit according to one embodiment of the present disclosure.
Figure 29:
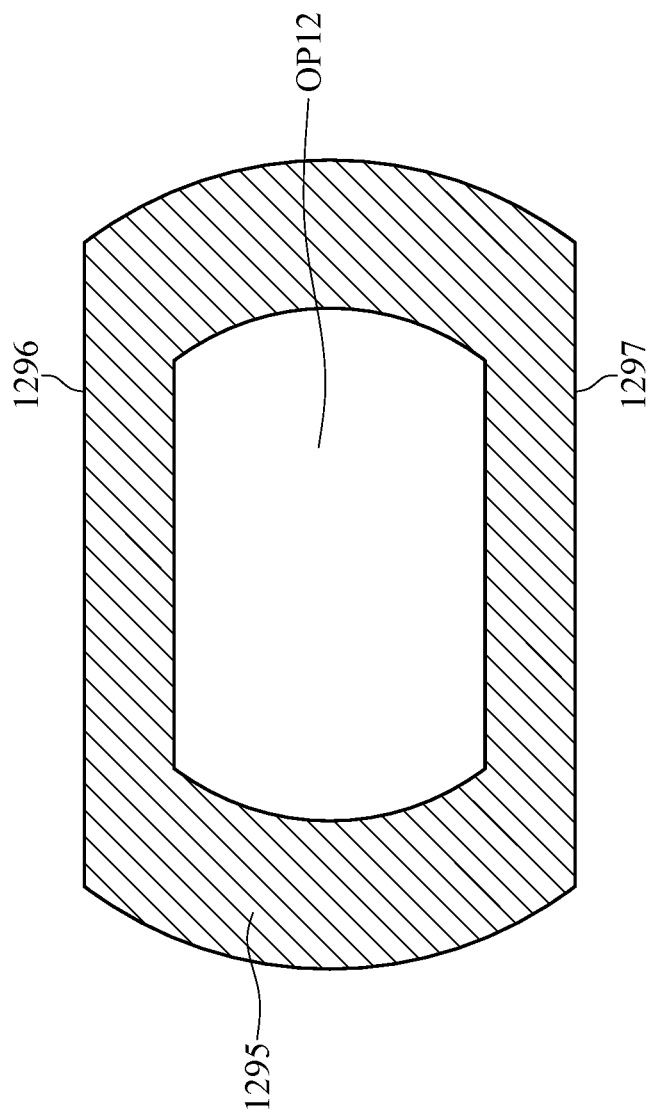
FIG. 29 shows a schematic view of another light-blocking element of an image capturing unit according to one embodiment of the present disclosure.

In this embodiment, the optical image lens assembly of the image capturing unit 20 can further include a light-blocking element 1195 shown in FIG. 28, and the light-blocking element 1195 can be disposed between any two of a lens surface, an aperture stop, a stop or an image surface. However, the present disclosure is not limited thereto. As shown in FIG. 28, the light-blocking element 1195 has a rectangular opening OP11, such that the optical path of the optical image lens assembly can pass through the opening OP11. Furthermore, the light-blocking element 1195 has two straight edges 1196 and 1197 at its outermost positions, such that the light-blocking element 1195 is a non-circular light-blocking element while having non-circular maximum effective radii on an object-side surface and an image-side surface thereof, and distances between the center to outer edges of the light-blocking element 1195, similar to the first lens element 1110, would be different. Therefore, it is favorable for coordinating with the first lens element 1110 to reduce the size of the image capturing unit 20 in the direction parallel to Dmin.

Moreover, the image capturing unit 20 can be a telephoto image capturing unit having a reflective element configuration. In detail, as shown in FIG. 23, the image capturing unit 20 further includes a reflective element REF, while the image capturing unit 20d includes no reflective element, such that the optical axis of the image capturing unit 20 is different from the optical axis of the image capturing unit 20d. Specifically, the optical axis of the image capturing unit 20 can be perpendicular to the optical axis of the image capturing unit 20d. Therefore, it is favorable for adjusting the optical axis according to different optical specifications so as to achieve compactness of the electronic device 40. The reflective element REF can be the prism 590 disposed on an object side of the first lens element 510 to fold the optical path once. Specifically, the reflective element REF is disposed in the electronic device 40 and located between an imaged object (not shown) and the first lens element 510 along the optical path, but the present disclosure is not limited to the type, number and position of the reflective element. For example, the reflective element REF may be a mirror. In this embodiment, the reflective element configuration of the image capturing unit 20 can be similar to, for example, one of the structures shown in FIG. 30 to FIG. 32 which can be referred to foregoing descriptions corresponding to FIG. 30 to FIG. 32 so the details in this regard will not be provided again. In addition, the image capturing units 20k and 20p can determine depth information of the imaged object. In this embodiment, the electronic device 40 includes multiple image capturing units 20, 20d, 20e, 20f, 20g, 20h, 20*i*, 20*j*, 20*k*, 20*m*, 20*n* and 20*p*, but the present disclosure is not limited to the number and arrangement of image capturing units. When a user captures images of an object, light rays converge in the image capturing unit 20, 20*d*, 20*e*, 20*f*, 20*g*, 20*h*, 20*i*, 20*j*, 20*k*, 20*m*, 20*n* or 20*p* to generate image(s), the flash module 41 is activated for light supplement, and the subsequent processing would be performed by an image processor, etc.

Figure 26:
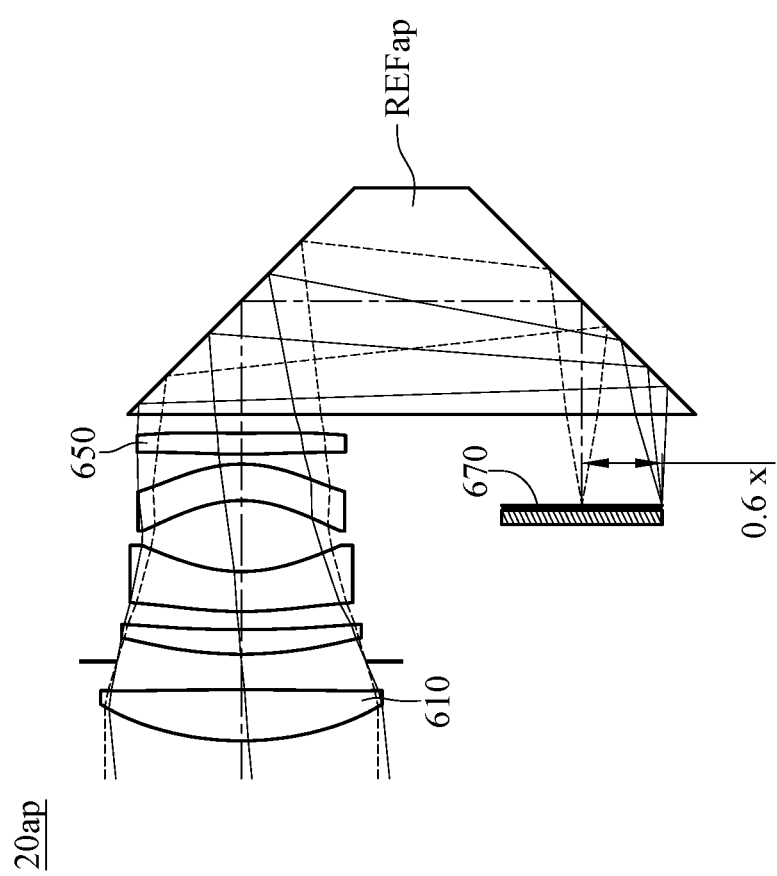
FIG. 26 shows a schematic view of a configuration of a reflective element in another optical image lens assembly of an electronic device according to one embodiment of the present disclosure.

The image capturing unit 20 including the optical image lens assembly disclosed in the 5th embodiment is only exemplary, and the present disclosure is not limited thereto. The image capturing unit 20 may be replaced by an image capturing unit 20*ap* including the optical image lens assembly disclosed in the 6th embodiment. The image capturing unit 20*ap* is shown in FIG. 26, which shows a schematic view of a configuration of a reflective element in another optical image lens assembly of an electronic device according to one embodiment of the present disclosure. The first lens element 610 of the optical image lens assembly of the image capturing unit 20*ap* can also be replaced by the first lens element 1110 shown in FIG. 27, and the maximum image height on the image surface 670, as shown in FIG. 26, is changed to 0.6 times (0.6×) the original. Furthermore, the optical image lens assembly of the image capturing unit 20*ap* can further include a light-blocking element 1295 shown in FIG. 29, and the light-blocking element 1295, similar to the light-blocking element 1195, has two straight edges 1296 and 1297 at its outermost positions. However, the light-blocking element 1296 has a non-circular opening OP12 for coordinating with the straight edges 1296 and 1297, which is different from the opening OP11. Therefore, it is favorable for sufficiently utilizing light passing through the optical image lens assembly.

Moreover, the image capturing unit 20*ap* can be a telephoto image capturing unit having a reflective element configuration. In detail, as shown in FIG. 26, the image capturing unit 20*ap* further includes a reflective element REFap. The reflective element REFap can be the prism 690 disposed between the fifth lens element 650 and the image surface 670 to fold the optical path twice. The configuration of the reflective element REFap of the image capturing unit 20*ap* can be referred to foregoing descriptions corresponding to FIG. 33 so the details in this regard will not be provided again.

The smartphone in this embodiment is only exemplary for showing the image capturing unit 20 of the present disclosure installed in an electronic device, and the present disclosure is not limited thereto. The image capturing unit 20 can be optionally applied to optical systems with a movable focus. Furthermore, the optical image lens assembly of the image capturing unit 20 features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1-18 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical image lens assembly comprising five lens elements, the five lens elements being, in order from an object side to an image side along an optical path, a first lens element, a second lens element, a third lens element, a fourth lens element and a fifth lens element, and each of the five lens elements having an object-side surface facing toward the object side and an image-side surface facing toward the image side;

wherein the first lens element has positive refractive power, the object-side surface of the first lens element is convex in a paraxial region thereof, the second lens element has positive refractive power, the third lens element has negative refractive power, the image-side surface of the third lens element is concave in a paraxial region thereof, the object-side surface of the fourth lens element is concave in a paraxial region thereof, and the image-side surface of the fourth lens element is convex in a paraxial region thereof; and wherein a distance along an optical axis between the image-side surface of the fifth lens element and an image surface is BL, a distance along the optical axis between the object-side surface of the first lens element and the image-side surface of the fifth lens element is TD, an Abbe number of the fifth lens element is V5, a focal length of the optical image lens assembly is f, a focal length of the first lens element is f1, a focal length of the second lens element is f2, and the following conditions are satisfied:

$0.85 < BL/TD < 5.0$;
$8.0 < V5 < 28.0$;
$0.50 < f/f1 < 2.50$; and
$0.42 \leq f/f2 < 1.85$.

2. The optical image lens assembly of claim 1, wherein the object-side surface of the second lens element is convex in a paraxial region thereof.

3. The optical image lens assembly of claim 1, wherein a minimum value among Abbe numbers of all lens elements of the optical image lens assembly is Vdmin, and the following condition is satisfied:

$10.0 < Vdmin < 21.0$.

4. The optical image lens assembly of claim 1, wherein an Abbe number of the second lens element is V2, the Abbe number of the fifth lens element is V5, and the following condition is satisfied:

$1.50 < V2/V5 < 5.0$.

5. The optical image lens assembly of claim 1, wherein the focal length of the optical image lens assembly is f, a focal length of the third lens element is f3, and the following condition is satisfied:

$-3.50 < f/f3 < -1.50$.

6. The optical image lens assembly of claim 1, wherein a focal length of the fourth lens element is f4, a focal length of the fifth lens element is f5, and the following condition is satisfied:

$0 < f4/f5$.

7. The optical image lens assembly of claim 1, wherein the focal length of the optical image lens assembly is f, the focal length of the first lens element is f1, a focal length of the fourth lens element is f4, and the following conditions are satisfied:

−0.30<f/f4<0.60; and
0.50<f/f1<2.0.

8. The optical image lens assembly of claim 1, wherein the focal length of the optical image lens assembly is f, a focal length of the fifth lens element is f5, and the following condition is satisfied:

−0.70<f/f5<0.60.

9. The optical image lens assembly of claim 1, wherein a curvature radius of the object-side surface of the fourth lens element is R7, a curvature radius of the image-side surface of the fourth lens element is R8, and the following condition is satisfied:

−0.30<(R7−R8)/(R7+R8)<0.30.

10. The optical image lens assembly of claim 1, wherein the distance along the optical axis between the image-side surface of the fifth lens element and the image surface is BL, a maximum image height of the optical image lens assembly is ImgH, the focal length of the optical image lens assembly is f, and the following conditions are satisfied:

3.0<BL/ImgH<5.5; and
4.0<f/ImgH<8.0.

11. The optical image lens assembly of claim 1, wherein at least one of the object-side surface and the image-side surface of at least one lens element of the optical image lens assembly has at least one inflection point; and wherein a distance along the optical axis between the object-side surface of the first lens element and the image surface is TL, the focal length of the optical image lens assembly is f, and the following condition is satisfied:
0.70<TL/f<1.30.

12. The optical image lens assembly of claim 1, wherein at least one of the object-side surface of the fifth lens element and the image-side surface of the fifth lens element has at least one inflection point; and wherein an entrance pupil diameter of the optical image lens assembly is EPD, a maximum effective radius of the object-side surface of the first lens element is Y11, and the following condition is satisfied:
1.60<EPD/Y11<2.10.

13. The optical image lens assembly of claim 1, further comprising a reflective element.

14. The optical image lens assembly of claim 13, wherein the reflective element is a plastic prism; and wherein an Abbe number of the reflective element is Vr, a refractive index of the reflective element is Nr, and the following condition is satisfied:
30.0<Vr/Nr<40.0.

15. The optical image lens assembly of claim 13, wherein the reflective element is a prism and has an object-side surface being convex in a paraxial region thereof.

16. An electronic device, comprising at least two image capturing units which face a same side, wherein the at least two image capturing units comprise:

a first image capturing unit, comprising the optical image lens assembly of claim 1 and an image sensor that is disposed on the image surface of the optical image lens assembly; and a second image capturing unit, comprising an optical lens assembly and an image sensor that is disposed on an image surface of the optical lens assembly;

wherein a maximum field of view of the first image capturing unit and a maximum field of view of the second image capturing unit differ by at least 35 degrees.

17. An optical image lens assembly comprising five lens elements, the five lens elements being, in order from an object side to an image side along an optical path, a first lens element, a second lens element, a third lens element, a fourth lens element and a fifth lens element, and each of the five lens elements having an object-side surface facing toward the object side and an image-side surface facing toward the image side;

wherein the first lens element has positive refractive power, the object-side surface of the first lens element is convex in a paraxial region thereof, the second lens element has positive refractive power, the third lens element has negative refractive power, the image-side surface of the fifth lens element is concave in a paraxial region thereof, and the image-side surface of the fifth lens element has at least one convex shape in an off-axial region thereof; and wherein a distance along an optical axis between the image-side surface of the fifth lens element and an image surface is BL, a distance along the optical axis between the object-side surface of the first lens element and the image-side surface of the fifth lens element is TD, an Abbe number of the fifth lens element is V5, a maximum value among maximum effective radii on the object-side surfaces and the image-side surfaces of all lens elements of the optical image lens assembly is Ymax, a minimum value among maximum effective radii on the object-side surfaces and the image-side surfaces of all lens elements of the optical image lens assembly is Ymin, and the following conditions are satisfied:

0.85<BL/TD<5.0;
8.0<V5<28.0; and
1.0<Ymax/Ymin<1.70.

18. The optical image lens assembly of claim 17, wherein the image-side surface of the third lens element is concave in a paraxial region thereof, the object-side surface of the fourth lens element is concave in a paraxial region thereof, and there is an air gap along the optical axis between each of all adjacent lens elements of the optical image lens assembly.

19. The optical image lens assembly of claim 17, wherein a thickness along the optical axis of the third lens element is CT3, a thickness along the optical axis of the fifth lens element is CT5, and the following condition is satisfied:

0.90<CT3/CT5<3.50.

20. The optical image lens assembly of claim 17, wherein a focal length of the second lens element is f2, a focal length of the third lens element is f3, and the following condition is satisfied:

−0.80<f3/f2<0.

21. The optical image lens assembly of claim 17, wherein a distance along the optical axis between the first lens element and the second lens element is T12, a distance along the optical axis between the second lens element and the third lens element is T23, a distance along the optical axis between the third lens element and the fourth lens element is T34, a distance along the optical axis between the fourth lens element and the fifth lens element is T45, and the following condition is satisfied:

0<(T12+T23+T45)/T34<1.0.

22. The optical image lens assembly of claim 17, wherein an Abbe number of the second lens element is V2, an Abbe number of the third lens element is V3, the distance along the optical axis between the image-side surface of the fifth lens element and the image surface is BL, the distance along the optical axis between the object-side surface of the first lens element and the image-side surface of the fifth lens element is TD, and the following conditions are satisfied:

1.10<V2/V3<3.50; and 1.0<BL/TD<4.0.

23. The optical image lens assembly of claim 17, wherein an absolute value of a focal length of the third lens element is a minimum value among absolute values of focal lengths of all lens elements of the optical image lens assembly.

24. The optical image lens assembly of claim 17, wherein at least one lens element of the optical image lens assembly is a non-circular lens element; and wherein a minimum distance from a center to an outer edge of the non-circular lens element is Dmin, a maximum distance from the center to the outer edge of the non-circular lens element is Dmax, and the following condition is satisfied:

Dmin/Dmax<0.80.

25. An optical image lens assembly comprising five lens elements, the five lens elements being, in order from an object side to an image side along an optical path, a first lens element, a second lens element, a third lens element, a fourth lens element and a fifth lens element, and each of the five lens elements having an object-side surface facing toward the object side and an image-side surface facing toward the image side;

wherein the first lens element has positive refractive power, the second lens element has positive refractive power, the third lens element has negative refractive power, the fourth lens element has positive refractive power, the fifth lens element has positive refractive power, the object-side surface of the fifth lens element is convex in a paraxial region thereof, the image-side surface of the fifth lens element is concave in a paraxial region thereof, and the image-side surface of the fifth lens element has at least one convex shape in an off-axial region thereof; and wherein a distance along an optical axis between the image-side surface of the fifth lens element and an image surface is BL, a distance along the optical axis between the object-side surface of the first lens element and the image-side surface of the fifth lens element is TD, a maximum effective radius of the object-side surface of the first lens element is Y11, a maximum image height of the optical image lens assembly is ImgH, and the following conditions are satisfied:

0.75<BL/TD<5.0; and 0.80<Y11/ImgH<1.50.

26. The optical image lens assembly of claim 25, wherein an Abbe number of the fourth lens element is V4, an Abbe number of the fifth lens element is V5, and the following condition is satisfied:

1.50<V4/V5<4.50.

27. The optical image lens assembly of claim 25, wherein the image-side surface of the third lens element is concave in a paraxial region thereof.

28. The optical image lens assembly of claim 25, wherein a curvature radius of the image-side surface of the third lens element is R6, a curvature radius of the object-side surface of the fourth lens element is R7, and the following condition is satisfied:

−0.50<(R6+R7)/(R6−R7)<0.50.

29. The optical image lens assembly of claim 25, wherein half of a maximum field of view of the optical image lens assembly is HFOV, a focal length of the optical image lens assembly is f, an entrance pupil diameter of the optical image lens assembly is EPD, and the following conditions are satisfied:

5.0 [deg.]<HFOV<15.0 [deg.];

2.40<f/EPD<4.50; and 18.0 [mm]<f<30.0 [mm].

30. The optical image lens assembly of claim 25, wherein the first lens element has a maximum effective radius of the object-side surface and a maximum effective radius of the image-side surface thereof, and one of the maximum effective radii of the first lens element is a maximum value among maximum effective radii on the object-side surfaces and the image-side surfaces of all lens elements of the optical image lens assembly.

* * * * *